Inventors
MARTINUS DEN HERTOG
CONSTANTINUS DE ZEEUW
By
Attorney

Nov. 16, 1954  M. DEN HERTOG ET AL  2,694,751
SELECTION SYSTEM FOR ELECTRICAL CIRCUITS OR EQUIPMENTS
Filed July 25, 1950  22 Sheets-Sheet 21

Inventors
MARTINUS DEN HERTOG
CONSTANTINUS DE ZEEUW

By Robert Hardingh
Attorney

Nov. 16, 1954  M. DEN HERTOG ET AL  2,694,751
SELECTION SYSTEM FOR ELECTRICAL CIRCUITS OR EQUIPMENTS
Filed July 25, 1950  22 Sheets-Sheet 22

FIG. 22

| COMB | Pa | Pb | Pc | TIME UNIT | COMB | Pa | Pb | Pc | TIME UNIT | COMB | Pa | Pb | Pc | TIME UNIT | COMB | Pa | Pb | Pc | TIME UNIT |
|---|---|---|---|---|---|---|---|---|---|---|---|---|---|---|---|---|---|---|---|
| 00 | 1 | 1 | 1 | 1 | 25 | 1 | 1 | 2 | 31 | 50 | 1 | 1 | 3 | 61 | 75 | 1 | 1 | 4 | 91 |
| 01 | 2 | 1 | 1 | 2 | 26 | 2 | 1 | 2 | 32 | 51 | 2 | 1 | 3 | 62 | 76 | 2 | 1 | 4 | 92 |
| 02 | 3 | 1 | 1 | 3 | 27 | 3 | 1 | 2 | 33 | 52 | 3 | 1 | 3 | 63 | 77 | 3 | 1 | 4 | 93 |
| 03 | 4 | 1 | 1 | 4 | 28 | 4 | 1 | 2 | 34 | 53 | 4 | 1 | 3 | 64 | 78 | 4 | 1 | 4 | 94 |
| 04 | 5 | 1 | 1 | 5 | 29 | 5 | 1 | 2 | 35 | 54 | 5 | 1 | 3 | 65 | 79 | 5 | 1 | 4 | 95 |
| 05 | 1 | 2 | 1 | 7 | 30 | 1 | 2 | 2 | 37 | 55 | 1 | 2 | 3 | 67 | 80 | 1 | 2 | 4 | 97 |
| 06 | 2 | 2 | 1 | 8 | 31 | 2 | 2 | 2 | 38 | 56 | 2 | 2 | 3 | 68 | 81 | 2 | 2 | 4 | 98 |
| 07 | 3 | 2 | 1 | 9 | 32 | 3 | 2 | 2 | 39 | 57 | 3 | 2 | 3 | 69 | 82 | 3 | 2 | 4 | 99 |
| 08 | 4 | 2 | 1 | 10 | 33 | 4 | 2 | 2 | 40 | 58 | 4 | 2 | 3 | 70 | 83 | 4 | 2 | 4 | 100 |
| 09 | 5 | 2 | 1 | 11 | 34 | 5 | 2 | 2 | 41 | 59 | 5 | 2 | 3 | 71 | 84 | 5 | 2 | 4 | 101 |
| 10 | 1 | 3 | 1 | 13 | 35 | 1 | 3 | 2 | 43 | 60 | 1 | 3 | 3 | 73 | 85 | 1 | 3 | 4 | 103 |
| 11 | 2 | 3 | 1 | 14 | 36 | 2 | 3 | 2 | 44 | 61 | 2 | 3 | 3 | 74 | 86 | 2 | 3 | 4 | 104 |
| 12 | 3 | 3 | 1 | 15 | 37 | 3 | 3 | 2 | 45 | 62 | 3 | 3 | 3 | 75 | 87 | 3 | 3 | 4 | 105 |
| 13 | 4 | 3 | 1 | 16 | 38 | 4 | 3 | 2 | 46 | 63 | 4 | 3 | 3 | 76 | 88 | 4 | 3 | 4 | 106 |
| 14 | 5 | 3 | 1 | 17 | 39 | 5 | 3 | 2 | 47 | 64 | 5 | 3 | 3 | 77 | 89 | 5 | 3 | 4 | 107 |
| 15 | 1 | 4 | 1 | 19 | 40 | 1 | 4 | 2 | 49 | 65 | 1 | 4 | 3 | 79 | 90 | 1 | 4 | 4 | 109 |
| 16 | 2 | 4 | 1 | 20 | 41 | 2 | 4 | 2 | 50 | 66 | 2 | 4 | 3 | 80 | 91 | 2 | 4 | 4 | 110 |
| 17 | 3 | 4 | 1 | 21 | 42 | 3 | 4 | 2 | 51 | 67 | 3 | 4 | 3 | 81 | 92 | 3 | 4 | 4 | 111 |
| 18 | 4 | 4 | 1 | 22 | 43 | 4 | 4 | 2 | 52 | 68 | 4 | 4 | 3 | 82 | 93 | 4 | 4 | 4 | 112 |
| 19 | 5 | 4 | 1 | 23 | 44 | 5 | 4 | 2 | 53 | 69 | 5 | 4 | 3 | 83 | 94 | 5 | 4 | 4 | 113 |
| 20 | 1 | 5 | 1 | 25 | 45 | 1 | 5 | 2 | 55 | 70 | 1 | 5 | 3 | 85 | 95 | 1 | 5 | 4 | 115 |
| 21 | 2 | 5 | 1 | 26 | 46 | 2 | 5 | 2 | 56 | 71 | 2 | 5 | 3 | 86 | 96 | 2 | 5 | 4 | 116 |
| 22 | 3 | 5 | 1 | 27 | 47 | 3 | 5 | 2 | 57 | 72 | 3 | 5 | 3 | 87 | 97 | 3 | 5 | 4 | 117 |
| 23 | 4 | 5 | 1 | 28 | 48 | 4 | 5 | 2 | 58 | 73 | 4 | 5 | 3 | 88 | 98 | 4 | 5 | 4 | 118 |
| 24 | 5 | 5 | 1 | 29 | 49 | 5 | 5 | 2 | 59 | 74 | 5 | 5 | 3 | 89 | 99 | 5 | 5 | 4 | 119 |

*Inventors*
MARTINUS DEN HERTOG
CONSTANTINUS DE ZEEUW

By Robert Harding Jr.
*Attorney*

United States Patent Office

2,694,751
Patented Nov. 16, 1954

2,694,751

SELECTION SYSTEM FOR ELECTRICAL CIRCUITS OR EQUIPMENTS

Martinus den Hertog and Constantinus De Zeeuw, Antwerp, Belgium, assignors to International Standard Electric Corporation, New York, N. Y., a corporation of Delaware Application July 25, 1950, Serial No. 175,704

Claims priority, application France August 17, 1949

18 Claims. (Cl. 179—18)

The present invention relates to a selection system for electrical circuits or equipments, particularly, but not exclusively, for automatic telephone exchanges.

One of the features of the invention consists of an automatic telecommunication system comprising several selection stages and register-controllers, arrangements being provided, in each selection stage, to transmit to a register controller an indication relating to the next operation to be carried out, each register controller comprising means for responding to the control signals from each selection stage, and other means, under the control of the first, for modifying, if necessary, the operation of the register controller in order to make the next selection or to carry out other operations, so that all the operations effected by the register-controller result from the indications received.

Another feature of the invention consists of an automatic telecommunication system comprising stages of line finders and selectors and also register controllers, arrangements being provided, in each line finder and selector stage, to transmit to a register-controller an indication of the next operation to be completed. Each register-controller comprising means for responding to the control signals from each line-finder stage and each selector stage, and other means, under the control of the first, for modifying, if necessary, the operation of the register-controller to effect the next selection or other operations, so that all the operations effected by the register-controller result from indications received.

Another feature of the invention is the fact that the indication as to the next operation to be effected by the register is composed of a class-of-outlet signal or class-of-line signal.

Another feature of the invention consists of an automatic telephone system comprising one or more line finder stages and in which the register controllers contribute to the operation of the line finders, arrangements being provided in each line-finder stage to send to a register-controller a class-of-outlet signal in order to check the operation of said register-controller.

Another characteristic of the invention consists of an automatic telecommunication system according to the previous features, in which the selection is controlled by electrical time impulses, of which the position identifies the various outlets, the control signals and the class-of-outlet signals also being composed of time impulses.

Another feature of the invention consists of an automatic telecommunication system in which each selector circuit or line-finder circuit comprises a group of common control wires or class-signalling wires, an individual control wire or class-signalling wire being provided for each outlet circuit or line and coming from said circuit or said line, arrangements being made to connect said circuit or line wires to the common wires, and to connect one or more individual wires to a common wire in order to determine the control or class signal to be sent for each outlet circuit or line.

Another feature of the invention consists of an automatic telecommunication system in which the line finders and selectors are made up of individual switches of multi-switches, each multi-switch having a common control circuit special thereto and common to all the individual switches of which it is composed, said common control circuit sending selective signals and control or class signals for all the outlets of the multi-switch.

Another feature of the invention consists of an automatic telecommunication system comprising multi-switches, in which certain individual switches act as line finders and others as selectors.

Another feature of the invention consists of an automatic telecommunication system comprising call-detector circuits, each being common to a certain number of incoming lines, said call detectors being adapted to co-operate with the register-controllers in setting the line-finders.

Another feature of the invention consists of an automatic telecommunication system in which each register-controller of a group comprises one individual switch of a multi-switch to effect the connection to a group of cord circuits, inserted between the line-finders and the selectors.

Another feature of the invention consists in an automatic telecommunication system in which each call detector circuit of a group comprises an individual switch of a multi-switch in order to make the connection to a group of cord circuits or registers.

Another feature of the invention consists in an automatic telecommunication system in which the test circuit from a call detector circuit to a cord circuit (or register) passes through the associated register circuits (or cord circuits) so that a circuit of this kind is only chosen if one of the test circuits is free.

Another feature of the invention consists in an automatic telecommunication system comprising means for engaging all the cord (or register) circuits which are associated with the cord circuit (or register) chosen until the selected cord (or register) circuit is individually connected to a free register (or cord circuit).

Various other characteristics will appear from the following description, given as a non-limitative example, with reference to the attached drawings in which.

Figure 7:
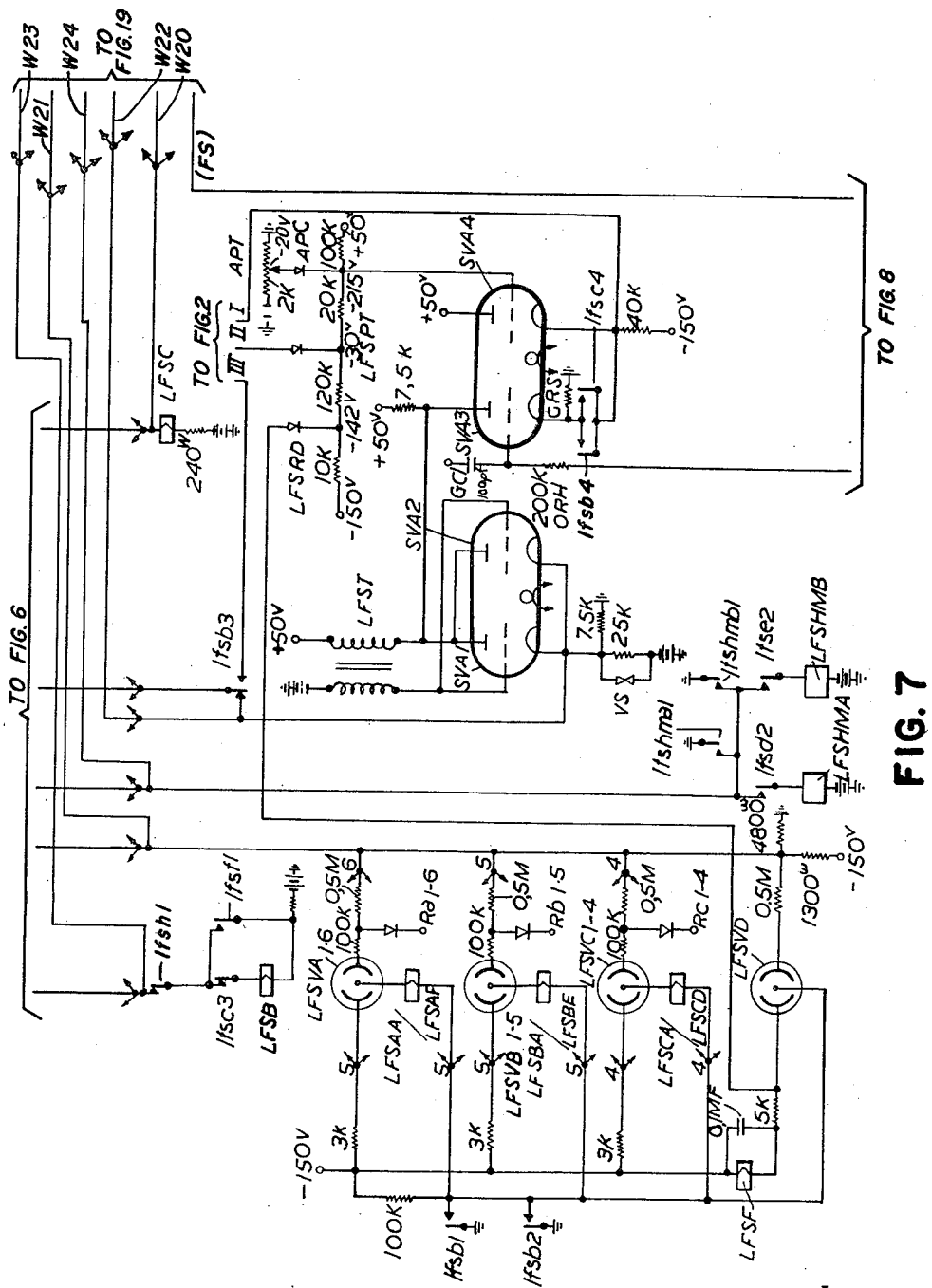
Figs. 7 and 8 show the common control circuit employed to check both the operation of the line finders and that of the final selectors. The inset to Fig. 8 shows tables which will be referred to in the course of the description.
Figure 8:
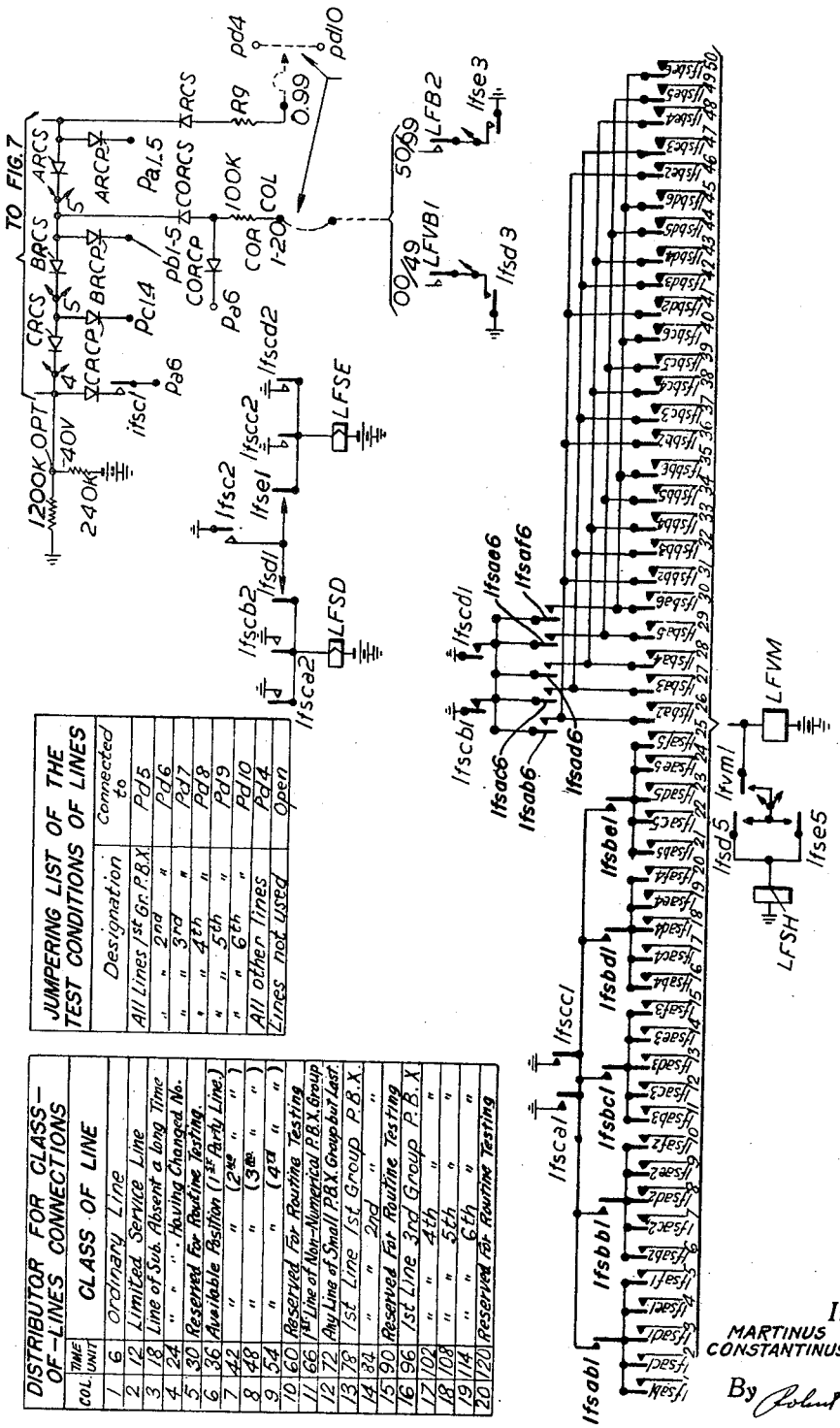
Figure 9:
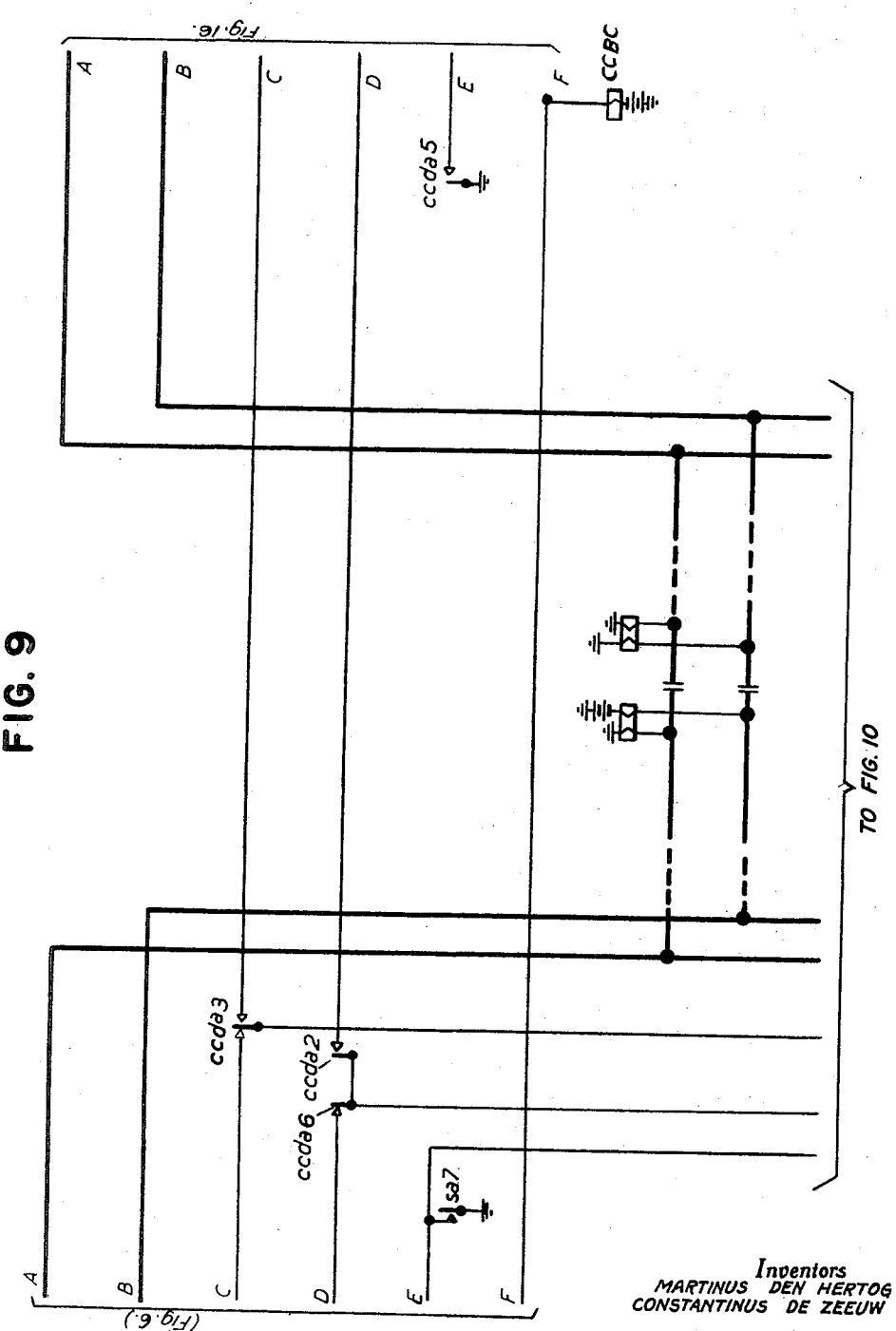
Figure 10:
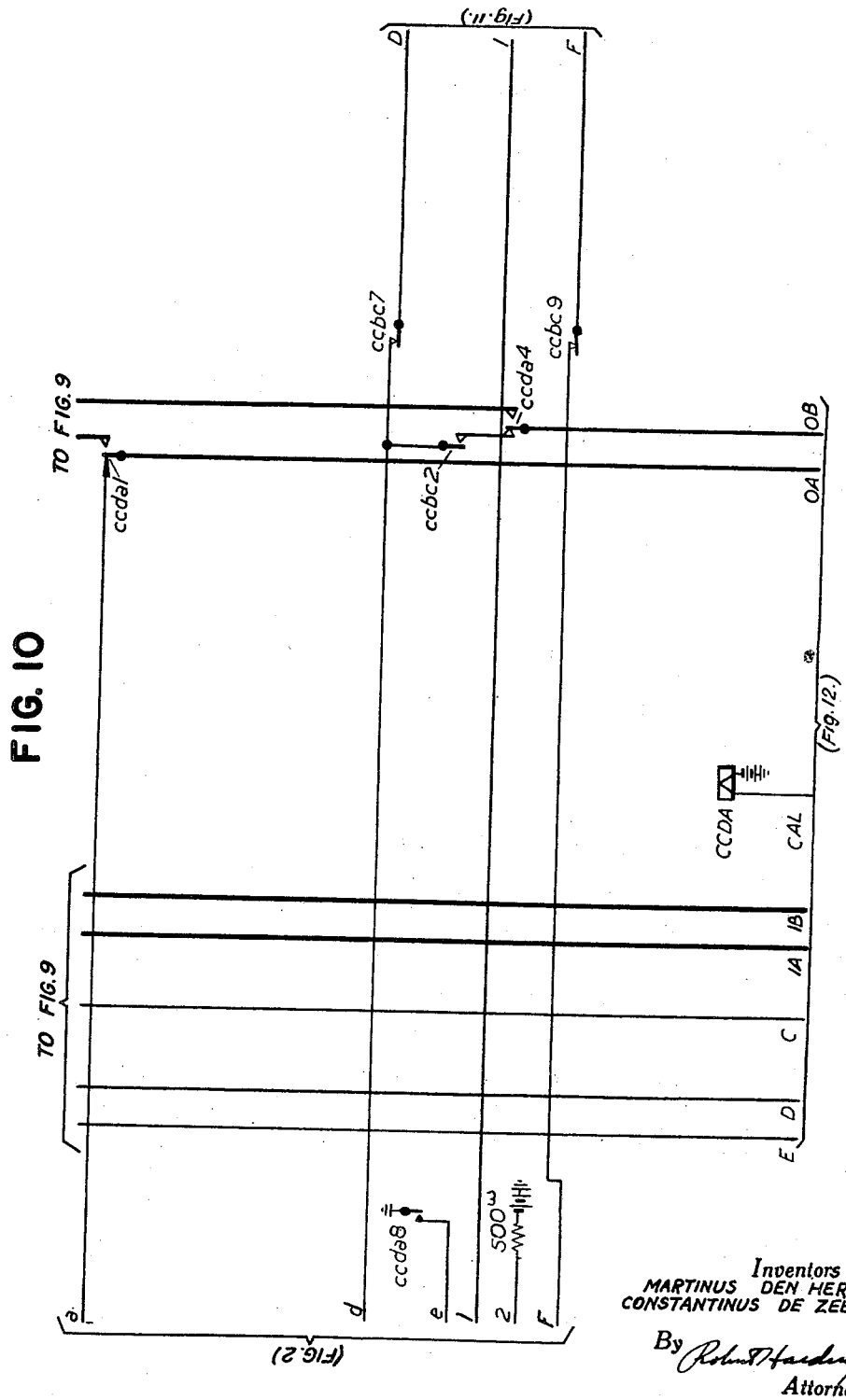
Figure 11:
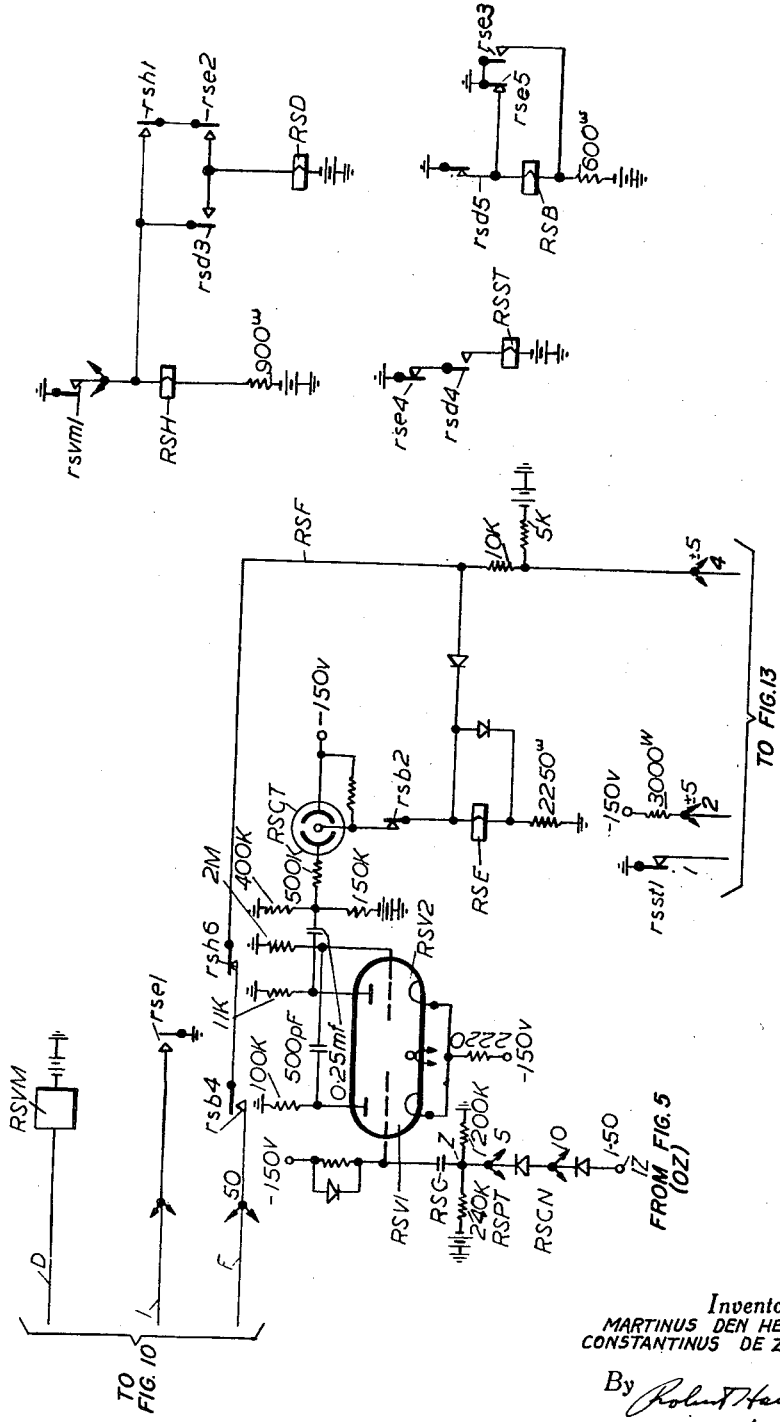
Figure 14:
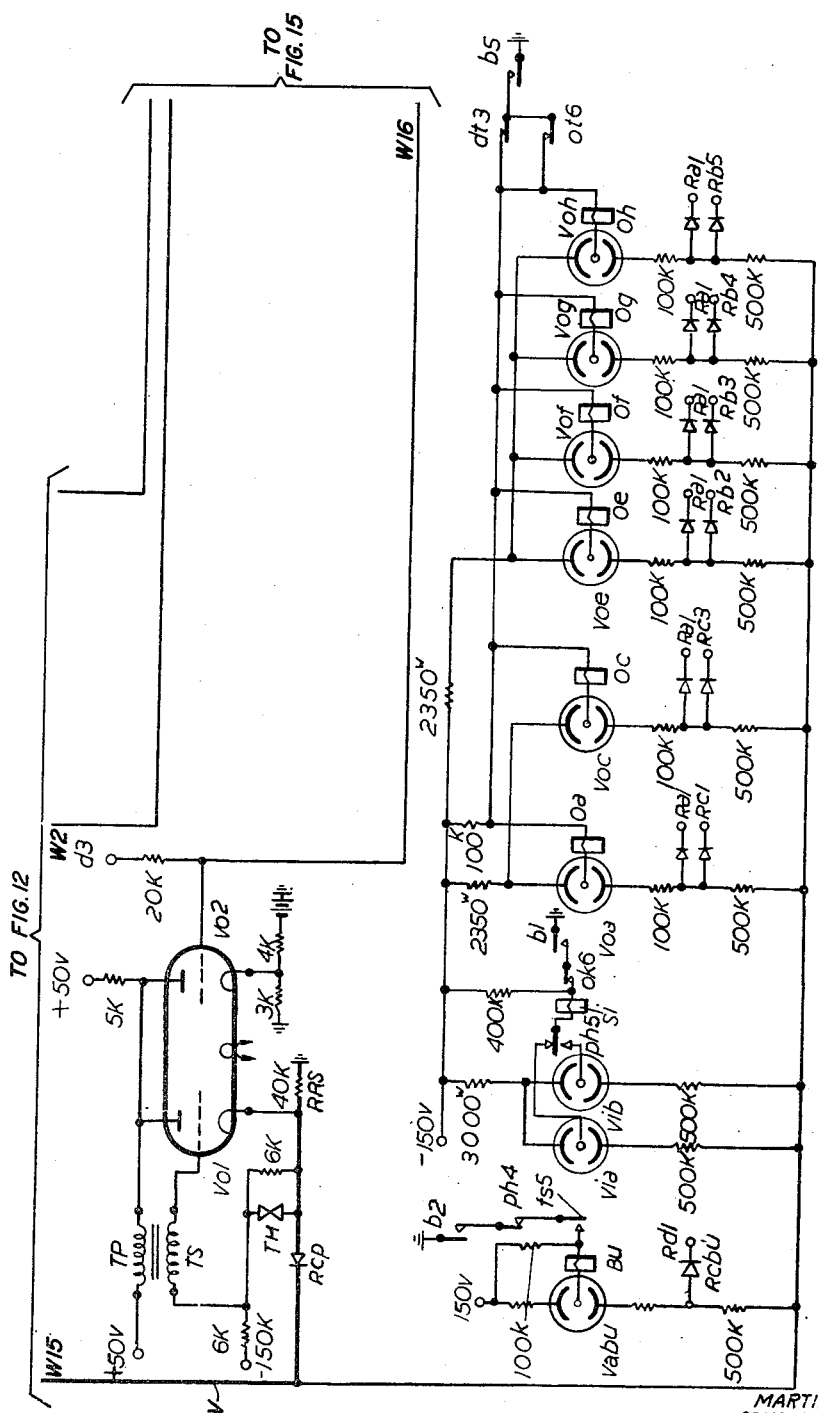
Figure 15:
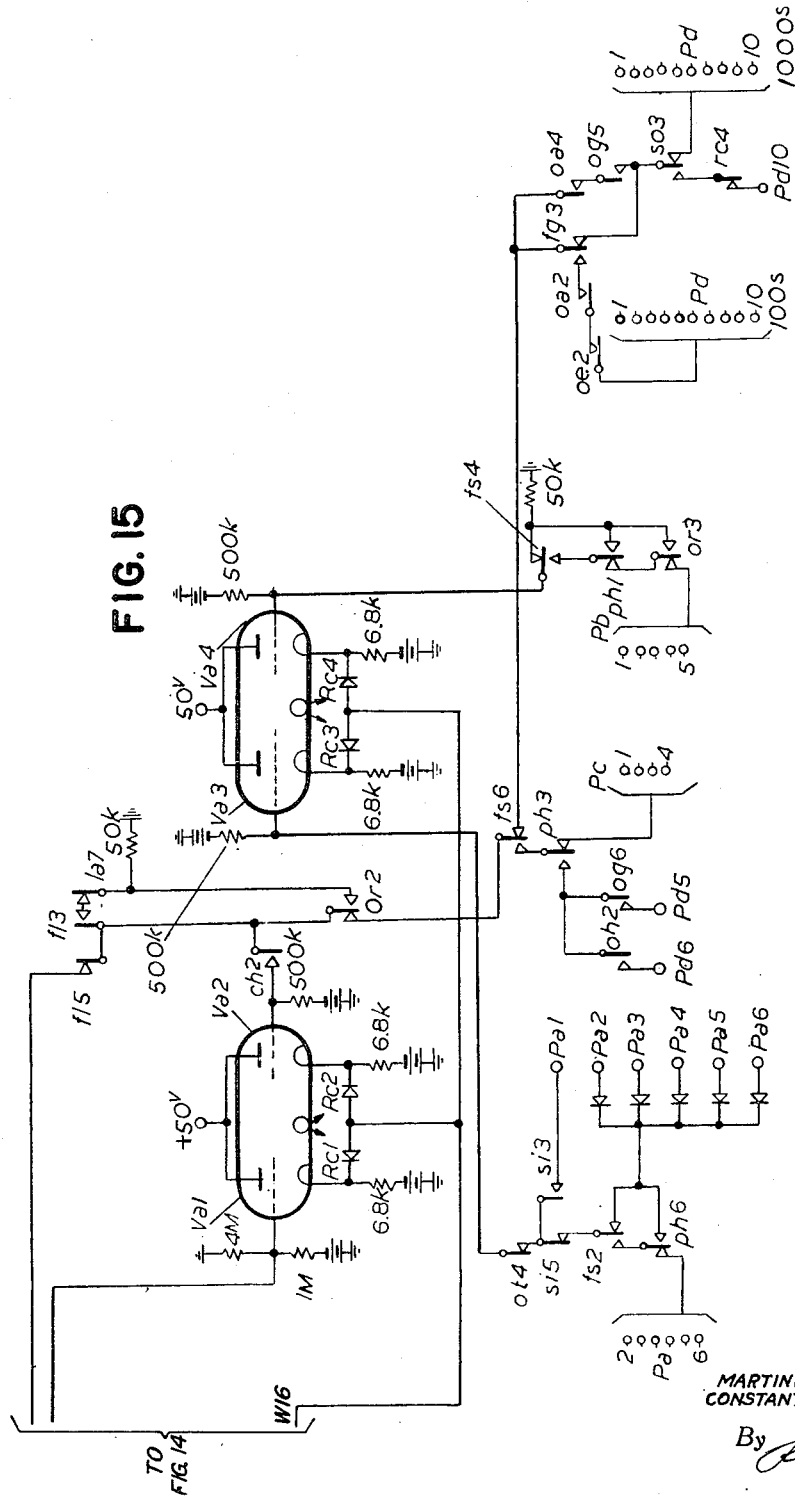
Figure 16:
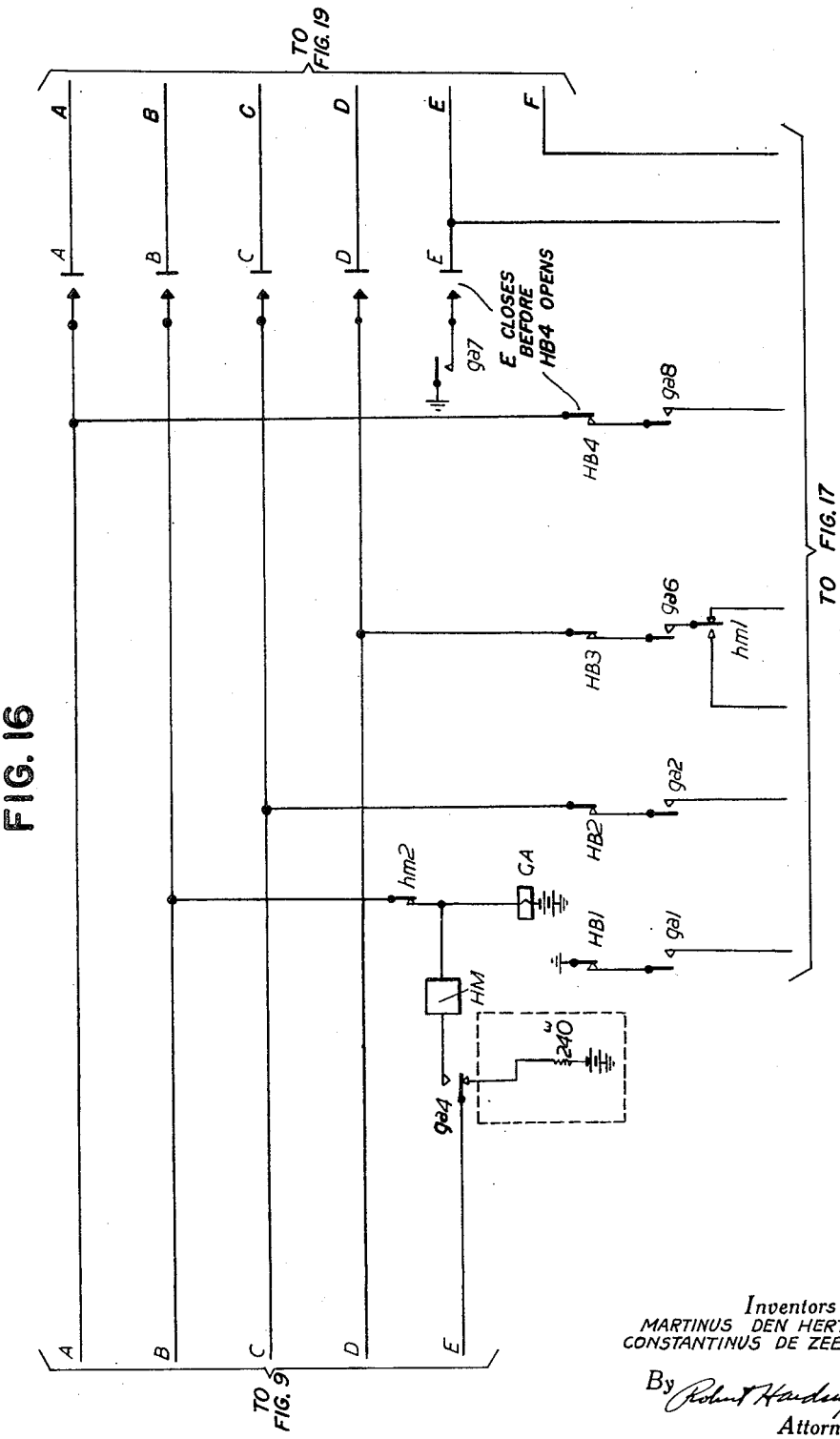
Figure 17:
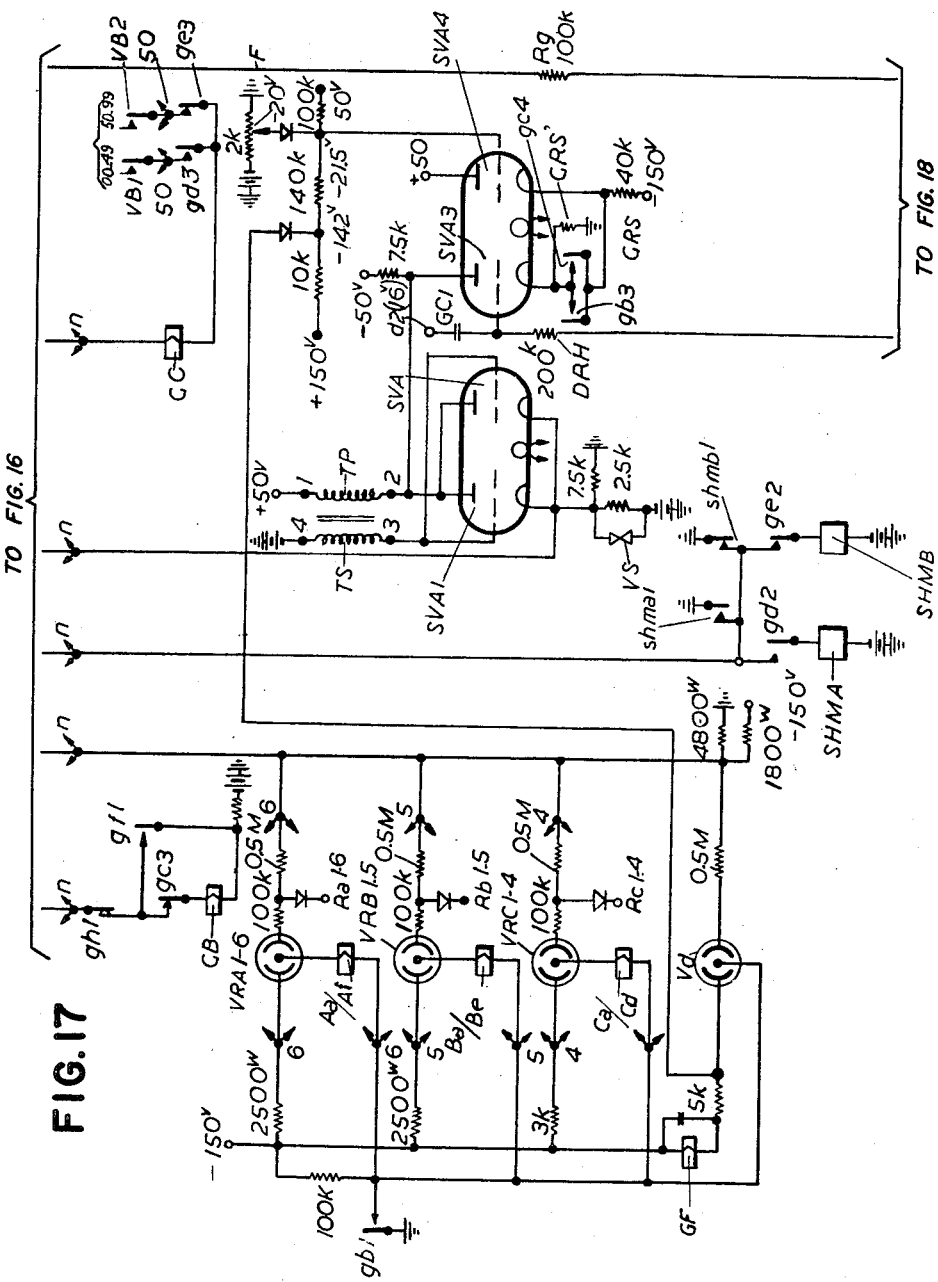
Figure 18:
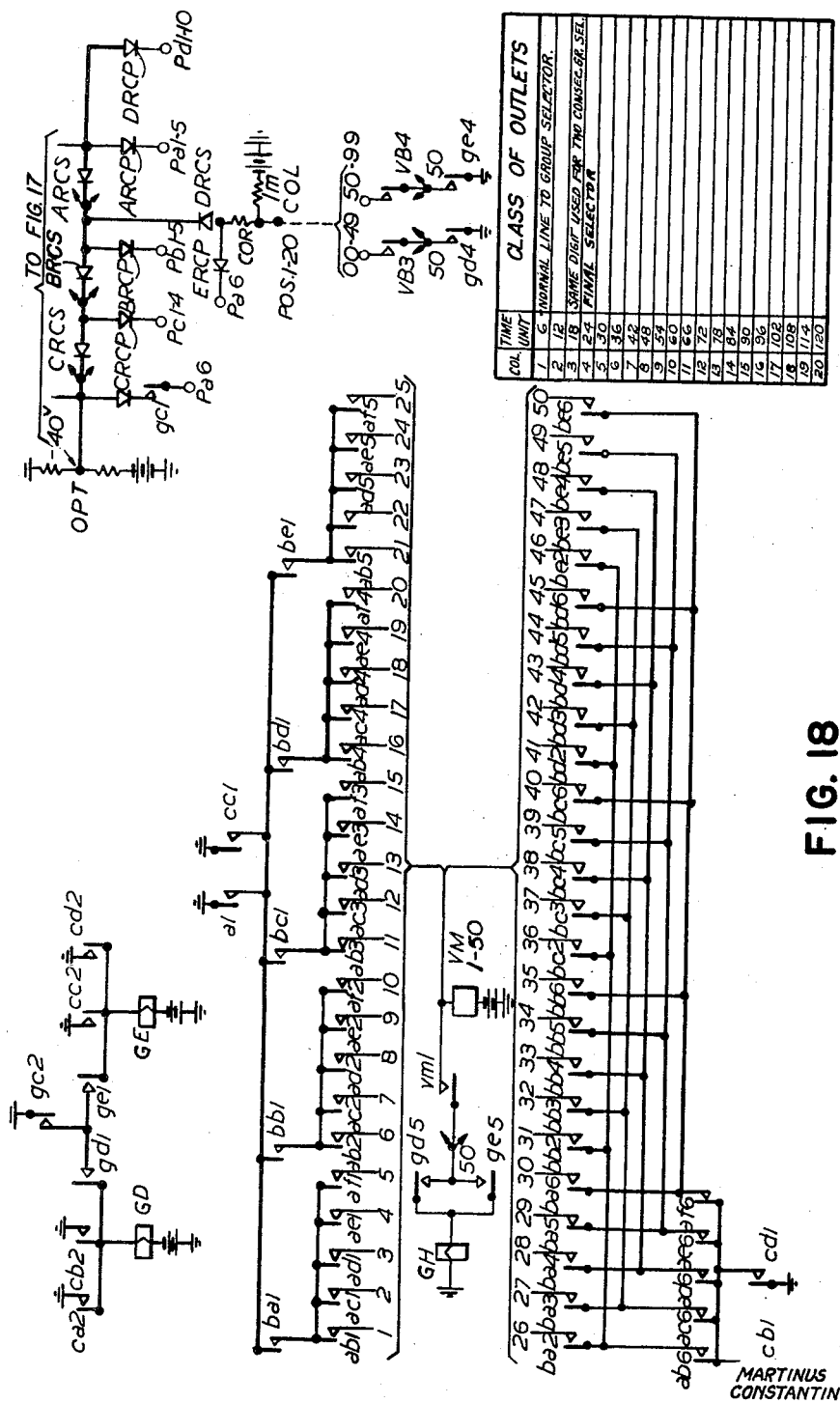
Figure 19:
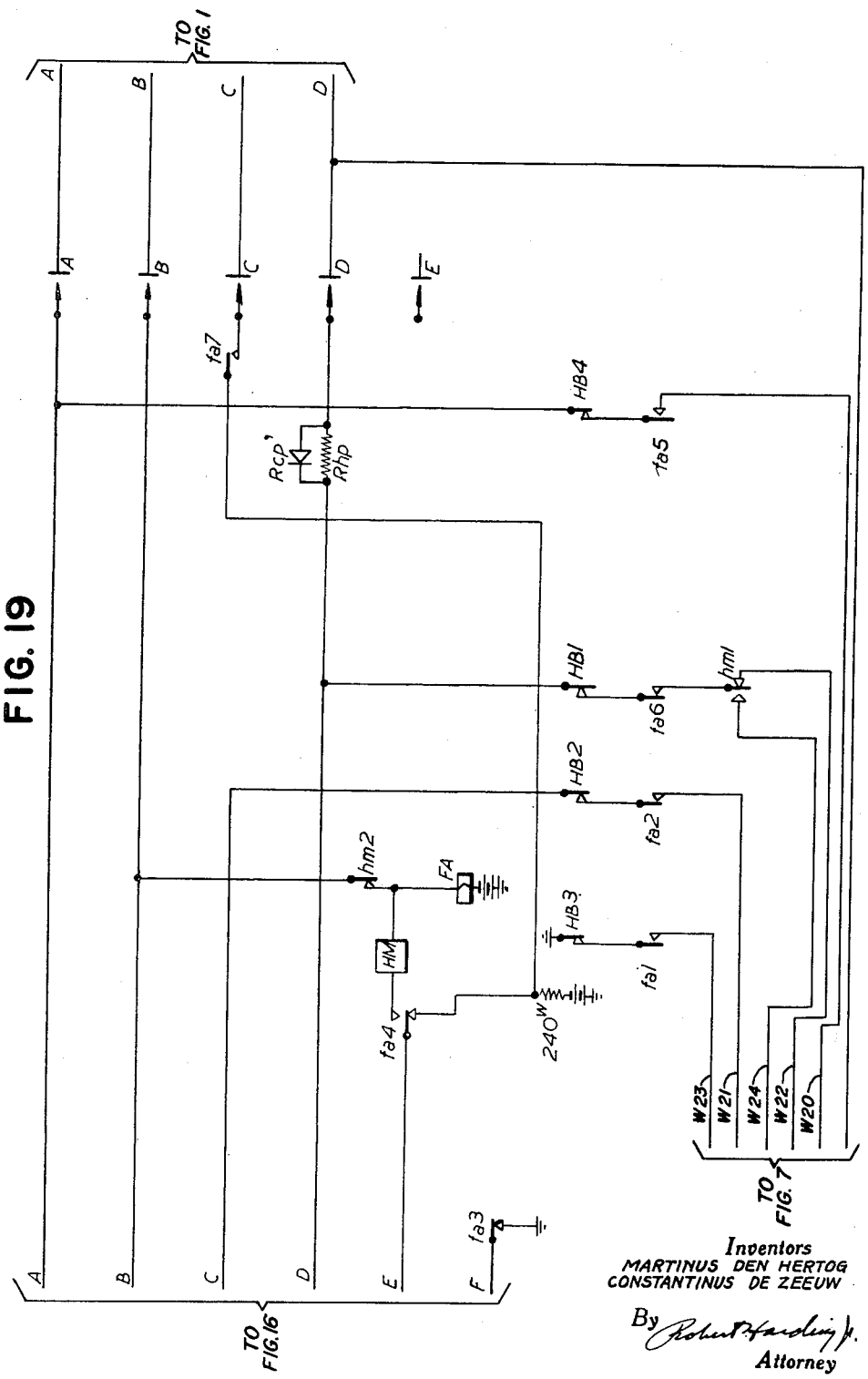

Figs. 9 and 10 show a cord circuit inserted between the line finders and the selection devices, Fig. 11 shows the common control circuit controlling the operation of a multi-switch provided in order to effect the connections between the register-controller and the cord circuit, Figs. 12, 13, 14 and 15 show the register-controller circuit, Fig. 16 shows the individual circuit of a group selector, Figs. 17 and 18 show the common control circuit for the group selector, Fig. 19 shows the individual circuit for a final selector, employing the same common control circuit as the line finder, i. e. that shown in Figs. 7 and 8.

Figure 20:
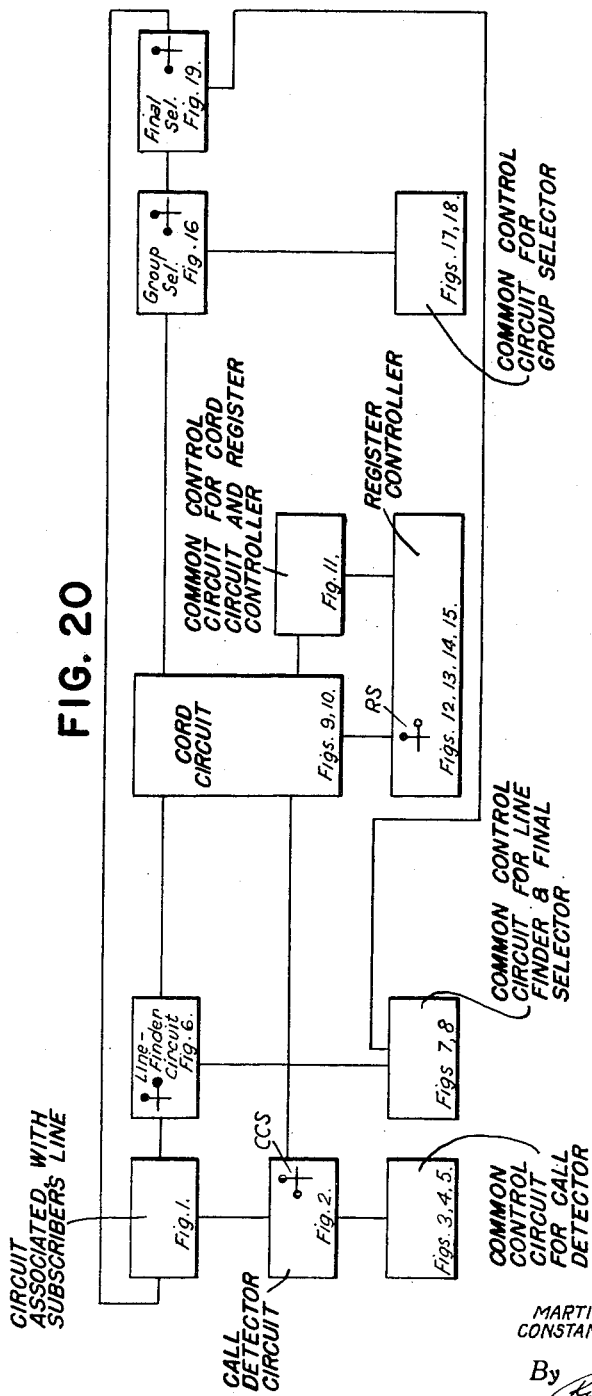

Fig. 20 shows the manner in which Figs. 1 to 19 must be arranged to make up the complete exchange.

Figure 21:
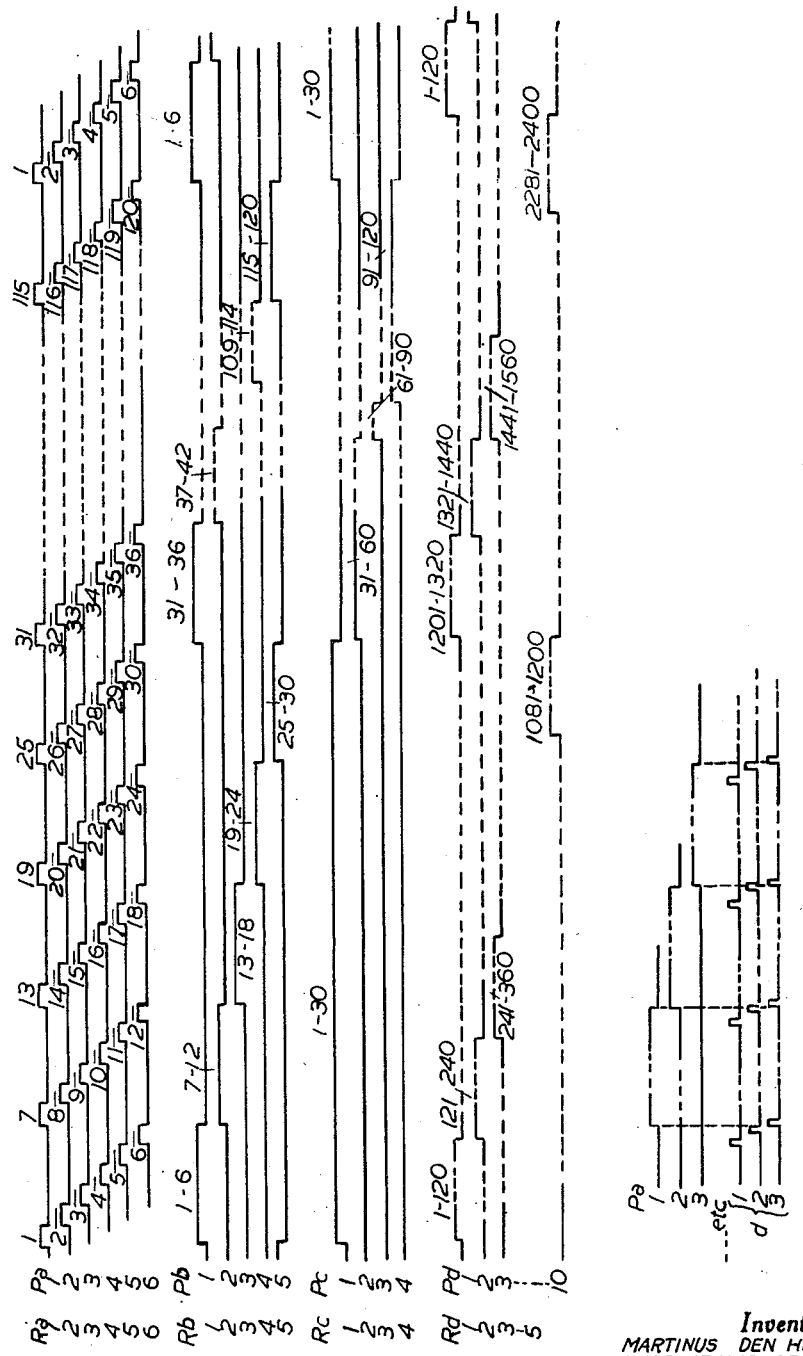

Fig. 21 shows a diagram of time impulses used to control the selection,

Fig. 22 shows a table indicating the method of employing the impulses of Fig. 21 to control the selection.

The system is arranged so that the final selectors operate under the control of similar members; thus the first line finders and the final selectors use the same common control circuit.

To further simplify the drawings the multi-switches which are of the crossbar type, used in the embodiment described are shown in a "detached contact" format. Thus the operating magnets for both horizontal and vertical bars are shown as integral parts of the circuits in which they occur, while the set of contacts which are closed when a particular pair of magnets are energized are shown detached from these magnets.

The line finders and the final selectors have a capacity of 100 lines and the subscriber's line circuits are accordingly divided into groups of 100 lines. The subscribers' lines of which the numbers only differ in the tens or units digits consequently belong to the same group of finders and final selectors which make up the switches of a multi-switch provided for 100 lines.

The subscribers' lines are served by call detectors associated with cord circuits. A certain number of these cord finders constitute a multi-switch and have access to a group of cord circuits multiplied on said multi-switch.

The number of cord finders, each associated with a call detector, and together forming a multi-switch, is a function of the traffic.

A certain number of register controllers are associated with the cord circuits by means of a multi-switch RS (Fig. 20). A common control switch is provided for a group of register-controllers using the same multi-switch. When a cord circuit is selected by a call detector circuit, it is possible to ensure that the selected cord circuit has access to a free register, by extending the test circuit of each cord circuit, through the common control circuit or circuits controlling the register circuits associated with the cord circuit, as far as the associated register-controllers.

All the selection and discrimination operations employed in the control of the switches and interconnections are controlled by means of electrical impulses situated in time in accordance with cycles of impulses. These impulses vary in duration according to the operation to be carried out, but all are obtained from several sources of electrical impulse cycles; the relation between said cycles is such that each impulse of a second cycle has a duration equal to the complete duration of a first cycle and each impulse of a third cycle has a duration equal to the complete duration of the second cycle and so on. By employing combinations of impulses belonging to a certain number of such sources, a cycle of resultant impulses is obtained made up of the impulses of the first cycle, said resultant cycle comprising a number of impulses equal to the product of the number of impulses contained in each of the cycles; thus, for example, cycles comprising 6, 5 and 4 impulses give a resultant cycle of 120 impulses.

Figure 1:
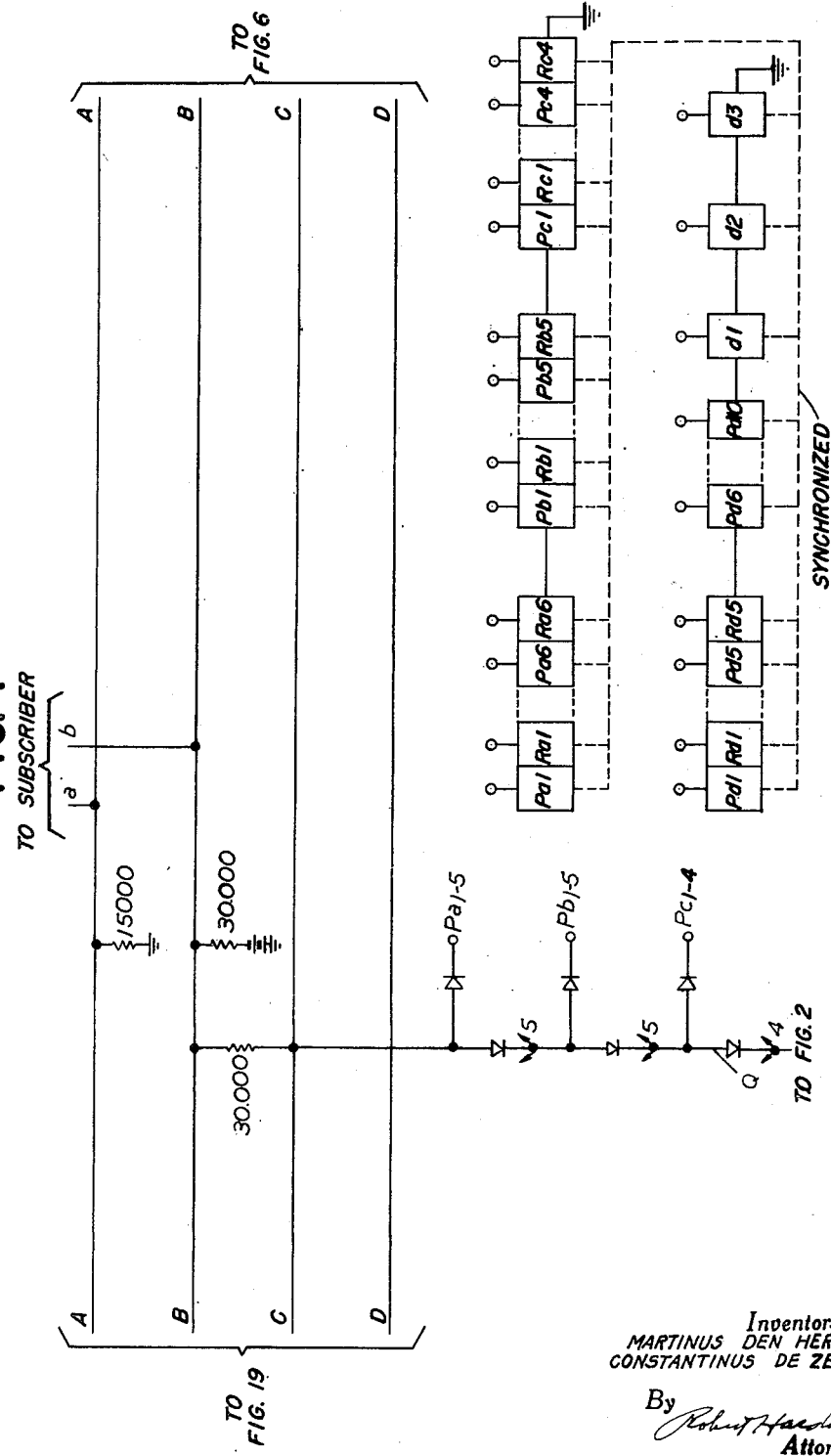
Fig. 1 shows a circuit associated with a subscriber's line.

Fig. 21 shows the diagram of the impulses produced by the different sources shown in Fig. 1, said impulses being employed as time basis in order to obtain a 12,000 element code.

Two main groups of impulse sources have been provided; the first are designated by the references Pa, Pb . . . and the others by Ra, Rb . . . ; the principal difference between these two groups of impulse sources lies in their difference of potential. The sources P are always intended to be inserted in the grid circuit of an amplifier tube, and their potentials have been determined accordingly. The sources R are always provided in order to be applied to the control electrode of the cold cathode tubes, and their potentials have been adapted to the operative conditions of said devices.

Each of the groups Pa . . . Ra comprises 6 sources supplying impulses displaced with respect to each other so that the impulse produced for each of the sources comes after that of the preceding source. Thus the 6 sources supply an impulse during 6 consecutive time units in a periodic cycle. The length of each of these impulses correspond to the duration of the time unit on which the whole system is based, and in the following will be taken as unit of time.

Each of the two groups Pb and Rb comprises 5 sources supplying an impulse for 5 consecutive time units in accordance with a periodic cycle. The length of each of these impulses corresponds to 6 time units of the sources Pa and Ra and their period to 30 time units of the same sources.

Each of the two groups Pc and Rc comprises 4 time impulse sources, the length and period of which respectively correspond to 30 and 120 time units of the sources Pa and Ra.

The group Pd comprises 10 sources of which the impulses correspond to 120 time units of the sources Pa and Ra and the period to 1200 time units. These 10 sources, like those of the other groups, produce time impulses displaced with respect to each other so that the impulse produced for each of the sources comes after that of the preceding source.

5 sources Rd have been provided which are identical with sources Pd1 . . . 5, with regard to the characteristics relating to time.

Fig. 21 also shows the relation between the source Pa and the three detector sources d1, d2 and d3. The detector sources d1 and d2 transmit impulses which are within the corresponding impulse Pa, even when said impulse is shortened. The detector source d3 which corresponds to d2 transmits an impulse at the beginning of the next transmission period of the basic source Pa. The sources of the three first types, that is, Pa, Pb and Pc are employed to control the transmission of a signal made up of a time impulse, and the detection of the signal made up in the same manner. The simultaneous use of any three sources of different types makes it possible to obtain $6 \times 5 \times 4 = 120$ different time signals. At the transmitting end, these 120 time signals are used to scan 100 outlets and 20 additional indications which may be associated temporarily with said circuits in any desired way. In order to permit the scanning of the 100 outlets, said circuits have been distributed over the 120 time units in such a way that the 5 first units only are used, for scanning the circuits, in each of the successive groups of 6 time units 1 . . . 6, 7 . . . 12, . . . , while the last time unit is not used for this operation. In other words, the sources of periodic impulses Pa1 . . . 5 are employed for scanning the 100 outlets, while the source of periodic impulses Pa6 is not used for this purpose. Consequently, the source Pa6 will be successively used to scan the 20 remaining electrical conditions during the 20 impulses sent by said source in a period of 120 time units.

At the receiving end, the impulses are received after having been displaced by one time unit, by reason of the successive use of the detector impulses d2, d3 for the transmission and reception of the impulses, an impulse transmitted in time unit No. 1 being received in time unit No. 2 etc., consequently, the impulses transmitted during the five first time units of each group of 6 time units will be received during the five last time units of each of said groups. The sources Ra2 . . . 6 will thus be employed when the impulses characterising the 100 outlets, and which are transmitted by means of sources Pa1 . . . 5, are received. The impulse source Ra1 is only used exclusively when the twenty special indications previously mentioned are received which are transmitted by means of source Pa6.

Sources Pd1 . . . 10 are used to associate a particular group indication with each of the outlets; thus in the case of outlets of a group selector, these sources are used to characterise the group of said outlets.

Fig. 22 shows the method of employing transmitting sources Pa . . . Pc in combination with three stages of gates supplying impulses to the register controllers. The table shows the sources which must be employed for the gates associated with each outlet. This table also indicates the time unit in which an impulse must be sent for each of the outlets.

The line finder circuits, group selector circuits and final selector circuits have been provided for use in a multi-switch having the following characteristics.

The multi-switch (Figs. 2, 6, 12, 19) comprises a certain number of horizontal bars, each of which may be regarded as representing an individual switch capable of handling a call, like a single-motion switch of a well known type.

100 outlets have been provided, accessible to all the individual switches and common to said switches.

When a vertical bar and a horizontal bar have operated successively, a certain number of contacts placed at the points of intersection of these bars are closed, the individual switch being connected through said contacts to the circuit concerned. In the switch shown in Fig. 6, for example, these contacts are five in number and have been given the references A, B, C, D, E. To the left of these contacts, are shown the connections terminating in the outlets which can be reached through the vertical bar concerned; on the right of these contacts are shown the connections associated with the individual switches. The $10^0$ outlets are divided up into two groups of 50, 50 co-ordinate points being provided between each horizontal bar and the vertical bars and comprising two series each of five contacts. Each vertical bar is associated with an individual operating magnet, the energisation of said magnet actuating the bar upwards. One horizontal bar is provided for each of the $x$ individual switches making up the multi-switch; there is one individual horizontal magnet for each switch and two horizontal servo-magnets common to all the switches. The operation of an individual horizontal magnet does not actuate the corresponding horizontal bar, but the operation of a horizontal magnet followed by one of the horizontal servo-magnets actuates the corresponding horizontal bar to the left or to the right to close one or other of the series of contacts at the co-ordinate point determined by the vertical bar and the horizontal bar which have operated.

Similar arrangements have been provided for the group selector (Fig. 16) and for the final selector (Fig. 19); it should only be noted that the connections terminating in the outlets have been shown on the right of contacts A, B, C, D, and E, while the connections associated with the individual switches have been shown on the left of said contacts.

The line finder, the group selector and the final selector are, as has previously been indicated, 100 points switches employing horizontal servo-magnets to select between two sets of 50 outlets; the multi-switches CCS (Fig. 2) and RS (Fig. 12) respectively provided between the call detector circuits and the cord circuits on the one hand and between the register controllers and the cord circuits on the other hand, do not require so large a number of outlets. In these small multi-switches there are no horizontal servo-magnets; the individual horizontal magnets directly controlling the horizontal bars.

A call detector, common to 100 subscribers' lines, can regenerate the impulses produced by a call on any number of these lines, so that an impulse characterising the identity of each of the calling lines is regenerated.

When two or more lines are calling at the same time, the call detector seizes a free cord circuit and a free register circuit by means of the associated common control circuit, and causes their connection to one of the calling lines, after which it seizes another free cord and another free register and connects them to the next calling line etc. The calling lines are connected haphazard in the order of arrival of the impulses characterising the identity of each line; the line whose impulse first reaches the common control circuit of the line finder, after connection to a register, is the first to be connected.

The common control circuit which is common to a certain number of call detector circuits associated with a group of cords can, by electronic means, simultaneously accomplish the hunting of a free cord circuit for any number of call detectors served by it.

If we assume that two or more call detectors in a group are simultaneously hunting a free cord, the common control circuit, after having found a cord circuit, will allocate it to one of the calling call-detectors. This allocation of free cords to the call-detector circuits takes place haphazard and by electronic means.

As soon as one of the call detectors has been connected to a free cord, as has just been described, the common control circuit hunts for another free cord for another call detector which is waiting.

When the subscriber's loop is opened, the negative terminal of a 48 v. battery is connected on the one hand to wire B (Fig. 1) through a 30,000 ohm resistance and on the other hand to the wire C through said 30,000 ohm resistance and another 30,000 ohm resistance in series. Wire C is also connected to three rectifier cells, the other ends of which are applied to such a potential that these rectifier cells are rendered non-conductive when the line is not busy, no current then flowing through the rectifier cell system to the call detector.

These rectifier cells are arranged to act as gating circuits. The positive pole or terminal of a controlled rectifier cell is normally connected over a low resistance to a relatively negative potential when it is in its low resistance condition, but at the appropriate time position for it to assume its high resistance condition it is connected to a relatively positive potential. These potentials are obtained from the timed pulse sources, and in the circuit shown the relatively negative potential is —40 volts and the relatively positive potential is —16 volts. Each individual subscriber's line is connected via an assembly including three such rectifier cells to the call detector. The arrangement is such that all three rectifier cells individual to a particular subscriber's line have their positive ends brought to the relatively positive potential at a time position individual to that line. Then and only then can the subscriber's line influence the call detector.

When the line loop is closed when the subscriber removes his receiver, a current flows in the following circuit: earth, 15,000-ohm resistance, wire A, subscriber's line loop, wire B, 30,000-ohm resistance, battery. The potential of the wire B is then brought to about —16 v. The exact value of the potential on the wire B depends upon the resistance of the subscriber's loop.

Figure 2:
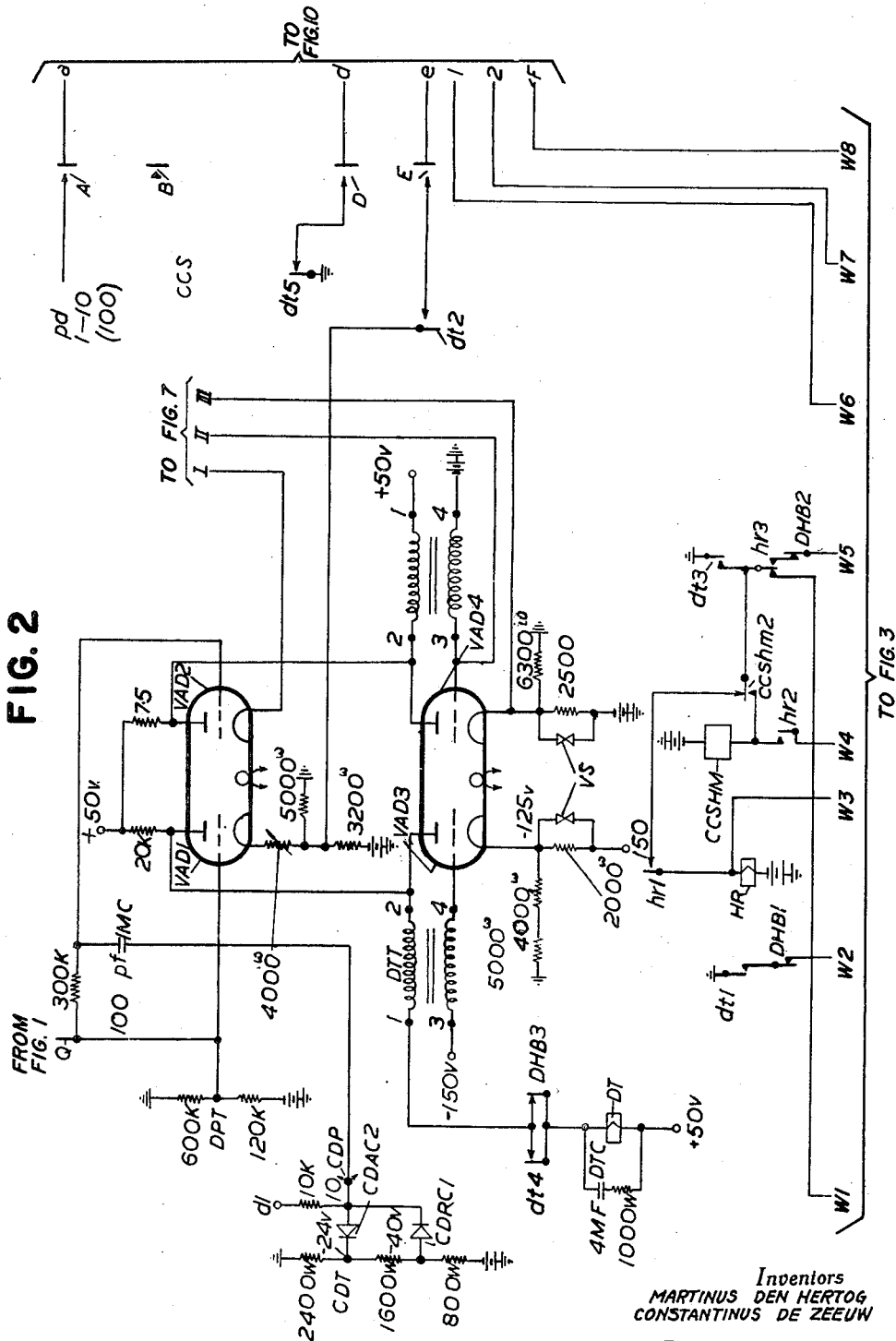
Fig. 2 shows a call detector circuit common to several subscribers' lines, and also a multi-switch composed of several switches for connecting the call detector circuits to the cord circuits.

The potential of the wire B now makes it possible, on principle, for a current to be established from the wire B, through the rectifier cells connected in series with the wire Q terminating on the grid circuit of the tube VAD1 (Fig. 2). Said grid circuit is held at a potential of —40 v. by means of potentiometer DPT, so that the required cells are then conductive. Moreover, by means of three successive stages of rectifier cells connected on the one hand to the wire terminating in the call detector (Fig. 2) and on the other hand, to the sources of current $Pa1 \ldots 5$, $Pb1 \ldots 5$, $Pc1 \ldots 4$, this current is prevented from being established in certain time units between the wire B and the call detector circuit.

These sources are normally at the potential of —40 v., but this potential may be raised in different time units, to —16 v. The current can only be established and maintained to the call detector when said sources are all brought to the potential of —16 v.; on the other hand, when one of said sources of potential is maintained at —40 v., it is the last potential which is effectively connected through the rectifier cells to the wire Q terminating on the call detector; thus, this cell, maintained at —40 v., does not pass any current to the call detector, the difference of potential between the wire B and the wire Q, terminating in the call detector, is absorbed in the 30,000 ohm resistances connected to the wire B. The mounting of the rectifier cells which has just been described acts as a gate by means of which the current flowing on the wire Q terminating in the call detector can be suppressed.

The first rectifier system is special to each line and is connected to one of the five sources $Pa1 \ldots 5$. These sources are each maintained at a potential of —16 v. during one of the five consecutive time intervals of each source during a different time interval, while the impulses of each source are reproduced, with five time intervals between them, during which, the potential of the source is —40 v.

The period of the impulses of each source corresponds to 6 time units, source $Pa1$ being maintained at —16 v., during time unit No. 1, source $Pa2$ during time unit No. 2, etc., until source $Pa5$ is maintained at the potential of —16 v. in the time unit No. 5 for a group of 6 time units. During the 6th time unit of each recurring interval, none of the sources $Pa1 \ldots 5$ is maintained at —16 v., but a 6th source $Pa6$, which is not shown in this circuit, is maintained at —16 v.

The 100 lines of a group are divided into 20 groups of five lines; in each group of five lines the systems of rectifier cells are connected to the various sources $Pa$, that is: those of the first line of each group to source $Pa1$, those of the 2nd line to source $Pa2$, etc., and those of the 5th line of each group to source $Pa5$.

The five lines of each group are connected through a first rectifier system special to each line, with a second rectifier system connected in series, said rectifier system being common to each group of five lines. Twenty rectifier systems such as the preceding are thus provided for 100 lines.

These 20 rectifier systems are divided into 4 groups of 5. In each group of 5, rectifier systems are connected to one of the sources $Pb1 \ldots 5$, that is, the first of each group to source $Pb1$, the second of each group to source $Pb2$, etc., and the 5th of each group to source $Pb5$.

The sources $Pb1 \ldots 5$ are maintained at a potential of —16 v. during one of the five consecutive time units, each of these time units corresponding to 6 time units of the sources $Pa$, and coinciding with one of the cycles $Pa1 \ldots 6$. This occurs for each source in different time units, that is: for source $Pb1$ during time units $1 \ldots 6$, for source P$b$2 during time units 7 ... 12, etc., and for source P$b$5 during time units 25 ... 30. During the time intervals elapsing between every two impulses of each source, which correspond to 24 time units, the sources of potential are at −40 v., and it is easy to see that the period of recurrence of the impulses of the sources of potential P$b$ is 30 time units.

Each of the second groups of rectifier systems is connected to a common point, which itself is connected to a third system of rectifiers. Said system of rectifiers is common to one of the four preceding groups, that is, to a group of 25 lines.

There are thus 4 rectifier systems such as the foregoing, which are each respectively connected to one of the four sources P$c$1 ... 4.

Sources P$c$1 ... 4 are brought to the potential of −16 v., each during a different time interval among four consecutive time intervals; each of these time intervals corresponds to 30 time units and coincides with one of the cycles of the sources P$b$1 ... 5, that is: for source P$c$1 during the time intervals 1 ... 30, for the source P$c$2 during the time intervals 31 ... 60, for the source P$c$3 during the time intervals 61 ... 90, for the source P$c$4 during the time intervals 91 ... 120. Each of the sources is at a potential of −40 v. during an interval corresponding to 90 time units. The period of recurrence of the impulses from sources P$c$ correspond to 120 time units. The four rectifier systems which have just been described are connected by means of a single wire Q, to the call detector circuit.

The operation of the system will now be explained. When one line is calling, the wire Q terminating on the call-detector, is maintained at −40 v., except during that time unit which is characteristic of the identity of the calling line; during this time unit the potential of the wire Q terminating on the call detector is about −16 v. During this time unit all the branch rectifiers associated with the calling line are rendered non-conductive, owing to the fact that the sources of potential connected thereto are at the potential of −16 v. This occurs for each of the 100 lines forming the same group, during a different time interval, so that by determining the time unit in which the impulse of −16 v. is transmitted to the call detector, the identity of the calling line is determined.

As has previously been explained, a call on one of the lines of the group is characterised by an impulse on the common wire Q connecting the 100 subscribers' lines to the call detector, this impulse being repeated once every 120 time units, during the particular unit permitting the identification of the tens digit and the units digit of the calling subscriber's number.

These impulses are applied to the grids of two amplifier tubes VAD1 and VAD2, in the call detector circuit (Fig. 2). The grids of the two amplifier tubes are normally maintained at the potential of −40 v., by a potentiometer DPT made up of two resistances of 600 K and of 120 K. Each of these amplifier tubes, which are combined to form a double triode, controls an impulse regenerator tube VAD3, VAD4, said tubes forming a second double triode.

The first of these impulse regenerators VAD3 is used to energise the relay DT, each time that a line is calling. This relay prepares all the subsequent operations necessary to connect a free cord circuit and a free register circuit to the calling line. Relay DT is, moreover, employed as a line relay for a group of 100 lines served by a call detector.

The second impulse regenerator VAD4 transmits for each impulse received from the calling line a fresh impulse which is a little shorter than the original impulse and a little retarded in relation to the normal time unit of the original impulse. These impulses are used for the selection of the calling line by a line finder, as will be described later.

An impulse from a calling line through the common wire Q is directly transmitted to the left hand amplifier tube VAD1, the grid of which is normally biassed in such a way that this tube is blocked, in the absence of impulses. The grid of the left hand regenerator tube VAD3 is also biassed so that no current flows to either of the two windings of the transformer DTT, or through said tube. The impulse brings the grid of amplifier tube VAD1 to a more positive potential; current then flows in the anode circuit and the potential of the anode becomes more negative on account of the relative values of the resistances connected in series in the cathode and anode circuits. This potential variation is transmitted to the anode of the regenerator tube VAD3, thus causing the flow of current in the primary winding of transformer DTT. Current then flows in the secondary winding of said transformer DTT and the grid of the regenerator tube is brought to a more positive potential. If the difference of potential is of sufficient amplitude to cancel the effect of the grid bias, the generator is triggered off. The anode current begins to flow through the anode winding of transformer DTT thus making the grid more positive; the process is cumulative and the anode current increases. Thus, almost immediately, the grid potential is brought above the cathode potential; a relatively powerful grid current begins to flow, restricting a subsequent increase of the grid potential. At this moment, the anode and grid current begin to decrease, the latter more quickly than the former, so that the difference between the number of the ampere-turns in the winding of the transformer inserted in the grid circuit and the number of ampere-turns in the winding inserted in the anode circuit continue to increase.

After a period, the duration of which to a great extent depends on the self-inductance of the windings of the transformer and the anode resistance of the tube, the grid current is again brought to O. From this moment any decrease of anode current produces by induction a reduction of the grid potential, which in turn produces a fresh reduction of the anode current. The tube is thus rapidly blocked and thus remains in a stable condition until a fresh trigger impulse is received.

In this way, a rectangular impulse is produced, the amplitude and duration of this impulse depending neither on the amplitude nor shape of the triggered impulse.

The type of transformer used and the value of the other elements of the circuit are such that in accordance with the method described an impulse lasting approximately 10 milliseconds is applied to the winding of the relay DT which is connected in series with the anode winding.

With a time basis giving 5,000 impulses per second, a time unit has a duration of .2 millisecond, and the impulses produced by the calling line are reproduced every 24 milliseconds corresponding to 120 time units. Relay DT is maintained operative for each period of 24 milliseconds by the discharge of the 4 mf. condenser DTC, which is charged during each impulse of 10 milliseconds; thus, relay DT remains operative as long as impulses are arriving from the calling line, provided that its energizing circuit is closed.

The impulses arriving through the wire Q of any calling line are not directly transmitted to the grid of the right hand amplifier tube VAD2; they are transmitted through a 300 K resistance. This grid is connected through a low capacity condenser IMC to a point CDP common to a group of call detectors; said common point is connected by means of two rectifier cells CDRC1, CDRC2, to a potential divider device CDT, in such a way that said common point can neither become more negative than −40 v. nor more positive than −24 v.; its potential is determined by a source $d$1, which is connected to the common point through a 10 K resistance, the characteristics of which are shown in Fig. 21. Normally, this source is relatively negative, and supplies short, relatively positive impulses towards the end of each impulse P$a$. The potential limiter prevents the variations of potential, produced on account of the connection of this impulse source to the grid amplifier tube VAD2, through condenser IMC, from exceeding 16 v. in amplitude; under these conditions the amplifier tube remains blocked. This is due to the fact that normally the grid potential is about −20 v. with respect to the cathode potential, the potential of the cathode being maintained at approximately −20 v. under the control of suppressor tube SVA4 (Fig. 7), which is located in the common control circuit for the line finders and final selectors, and which is connected by means of the wire I shown in both Fig. 2 and Fig. 7.

We will now consider a time unit during which an impulse arrives from a calling line circuit; during the beginning of this time unit the source $d$1 will be at the potential of −40 v. and the impulse, which is positive with respect to −40 v., will progressively charge the condenser IMC via the 300 K resistance so that the grid potential becomes approximately —32 v. It is obvious that, under these conditions, amplifier tube VAD2 remains blocked.

While the grid is brought to the potential of —32 v., source d1 is transmitting a relatively positive impulse of which the amplitude is —16 v.; owing to this; the grid of the amplifier tube is brought to the potential of —16 v. Owing to the fact that the cathode is at a potential of —20 v., the combination of effects produced on the one hand by the calling impulse and on the other hand by the impulse transmitted by the source d1, causes the unblocking of the tube VAD2, a single impulse being insufficient to produce such a result.

This releases the operation of the right hand regenerator tube VAD4 in accordance with a method identical with that already described for the left-hand regenerator tube VAD3. The type of transformer employed and the values of the other circuit elements are such that the duration of the impulses transmitted in this case corresponds to about half a time unit of the basic sources Pa and Ra, that is, 0.1 millisecond, so that the transmitted impulse carries over into the next time unit. When the call impulse and coincidence impulse transmitted by the source d1 terminate, the condenser IMC is progressively discharged; when the next impulse is transmitted by source d1, the condenser is discharged, so that the impulse transmitted by source d1 cannot release the amplification stage, provided that no call has appeared on the line corresponding to the next time unit; if the latter eventuality arises, condenser IMC will not be discharged due to the arrival of another call impulse, and the amplification and regeneration stage would again be released by the positive impulse from d1. An impulse will thus be transmitted for each calling line, but this impulse will be one time unit later. Thus, although the impulses from the calling lines occur at the time units corresponding to Pa1 to Pa5, the transmitted impulses will correspond respectively to impulses Pa2 to Pa6.

The cathode resistance of regenerator tube VAD4 transforms the current impulses into potential impulses, and, owing to the presence of the varistor VS connected in the cathode circuit, the potential of this impulse is maintained substantially constant for the whole duration of the impulse.

The impulses of the regenerator tube may be seized either in the cathode circuit or in the grid circuit, which in practice gives impulses of the same amplitude as the cathode circuit.

The impulses obtained from the cathode circuit are employed to transmit through wire III the identity of the calling line to the common control circuit of the line finders and final selectors (Fig. 7); the common control circuit employs this indication to start the hunting of the calling line by the line finder, under the control of the register circuit, as described later.

The impulses obtained from the grid circuit are sent by the wire II to the common control circuit of the line finders and the final selectors (Fig. 7), where they act on the suppressor tube SVA4, so that the impulse regenerator SVA1—SVA2 employed in the common control circuit for the selection of the desired line by a final selector, cannot operate, so as thus to engage the line in call position. A line cannot therefore be selected by a final selector, starting from the time unit in which it is calling; priority is thus given in this manner to the outgoing calls.

A call detector which finds a calling line may be connected to a common control circuit (Figs. 3, 4, 5) serving a group of call detectors, in any time unit, irrespective of the fact that one or more call detectors of the group are already employing the common control circuit.

The connection of the common control circuit is made by the operation of relay DT, which applies an earth, through the closed make contact dt3, back contact hr3, lead W1, back contact dek4 (Fig. 3), to the operative circuit of the relay DES of the common control circuit.

Relay DT further applies another earth through make contact dt1 and back contact DHB1, lead W2, to the common control circuit, but without immediate effect.

The operation of relay DES (Fig. 3) energises relay DEB through make contact des1, back contact deh2, back contact dec4, causing selection for a free cord by the common control circuit.

Figure 3:
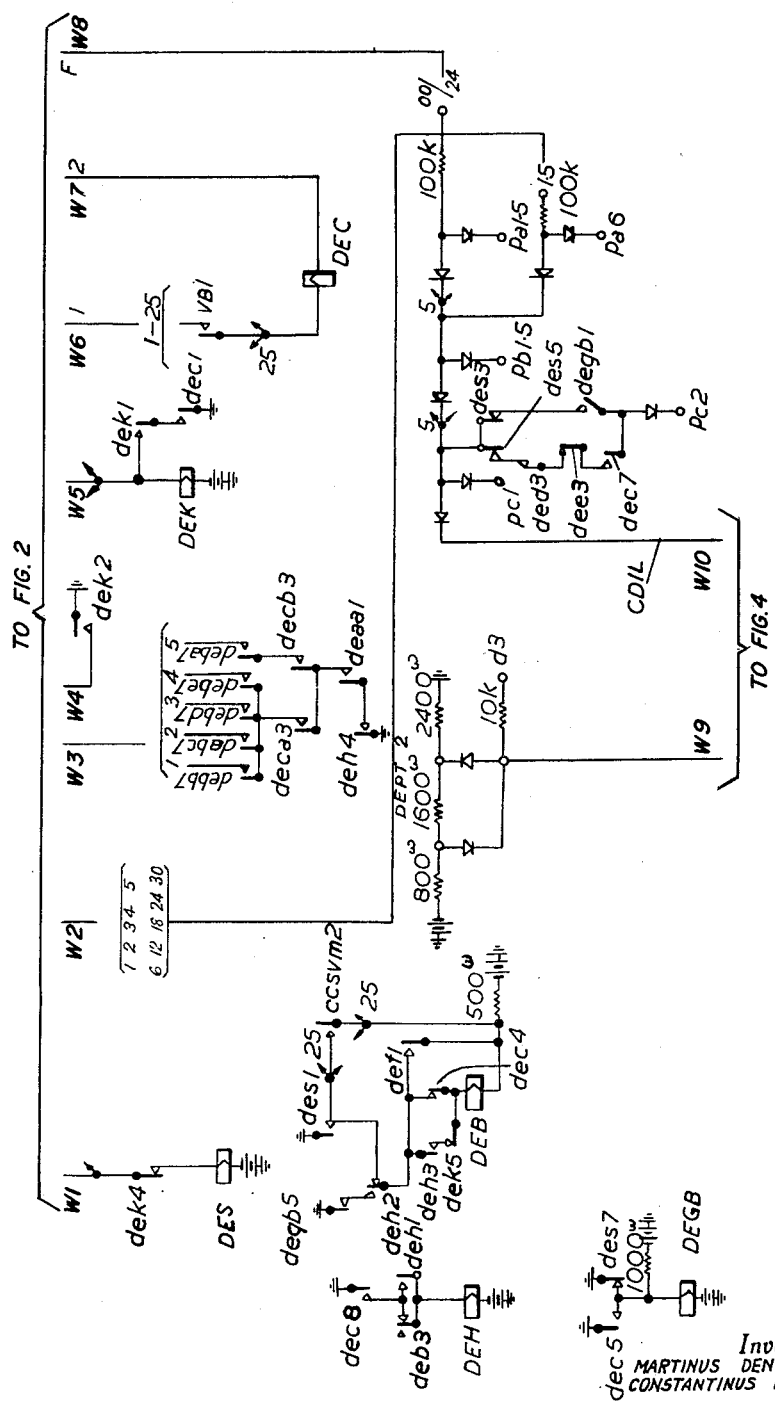
Figs. 3, 4 and 5 show the common control circuit for checking the operation of the multi-switch associated with the call-detector circuits.

The free cord circuits are characterised by the potential of the earth on test wire F, lead W8, which is connected to one of the terminals numbered 00–24 in the common control circuit of the call detector through the following circuit: earth in the register circuit, back contact lb4 (Fig. 13), 10 K resistance in the common control circuit of the register (Fig. 11), wire RSF, back contact rsh6, make contact rsb4 of relay RSB, in the common control circuit of the register, said relay being normally energised by means of a circuit which is easy to follow, back contact ccbc9 in the cord circuit (Fig. 10), to wire F to Fig. 2, lead W8 to Fig. 3, and pin of the common control circuit of the call detector corresponding to the cord circuit.

Terminals numbered 00–24 correspond to the outgoing number of the cord finder CCS forming part of the call detector circuit. The number 25 is chosen arbitrarily but in practice it depends on the traffic data.

The earth applied to one of the terminal 00–24 indicates a free cord circuit provided to modify the grid potential of the triode DEV2 (Fig. 4) over lead W10, which is normally maintained at —40 v. by the potential divider DEPT1 comprising resistances of 240,000 ohms and 1,200,000 ohms, said potential divider being connected to the grid through another resistance of 200,000 ohms.

Owing to the insertion of three stages of rectifier systems between each of the terminals 00–24 and the grid, an earth applied to any one of these terminals can only influence the grid potential during the corresponding time unit, out of the 120 time units, owing to the fact of the presence of impulse sources connected to the rectifier systems, as has previously been described.

A group of 25 outlets of this kind can be individually identified by 30 time units of the source Pa, said 30 time units corresponding to one time unit of the source Pc; consequently, a single source Pc1 is employed for the third stage of rectifier cells. The transmission of an impulse under the control of source Pc1 can be prevented by connecting a second source Pc2 in parallel to the first in such a way that one of the two sources Pc is always at —40 v.

When the circuit is in the normal condition, i. e. when the relay DES is idle,, a relay DEGB is energised through back contact des7. Under these conditions an auxiliary rectifier corresponding to the source Pc2 is connected in parallel with the corresponding rectifier to the source Pc1. It will be seen that the rectifier normally used, connected to source Pc1, is short-circuited when the circuit is free, by means of back contact des3 and make contact degb1, by the auxiliary rectifier connected to the source Pc2, so that the potential on the common wire of the outputs 00–24 is accordingly maintained at any instant at —40 v.; by shunting one source Pc1 by another, all the impulses corresponding to the 25 time units are eliminated, so that when the circuit is free the grid potential is not affected by any earth existing on the free outlets.

The relay DES in operating opens the shunt circuit by the back contact des3. Owing to this, the first outlet which, owing to the existence of an earth on its wire F, can signal a free cord circuit, causes the transmission of a positive impulse to the grid circuit of the amplifier tube DEV2 in the time unit which is characteristic of said circuit.

The grid circuit of the tube DEV2 is controlled, in a similar manner to that employed with regard to the circuit of the regenerator amplifier stage of the call detector, by an impulse source d3, (Fig. 3, over lead W9), details of which are shown in Fig. 21.

This source ensures the transmission of a positive impulse at the beginning of each impulse of the basic source; it can only release the amplifier tube and the regenerator tube associated therewith if the 100 pf. condenser, by means of which it is connected to the grid, has been charged during the preceding time unit by an impulse from a free outlet. It will be assumed that in spite of the fact that the impulse has already ended at the moment when d3 transmits a positive impulse, the condenser will not have been substantially discharged at this moment, so that the charge on the condenser obtained from the outlet during the preceding time unit, and from the source d3 at the beginning of the next time unit, are still added to each other.

The impulse regenerator comprising the triode DEV1 and a transformer DET now produces an impulse in accordance with a method identical with that already described in relation to the tube VAD3 (Fig. 2). This impulse begins at the beginning of the impulse transmitted by *d*3 or slightly after and has an approximate duration of 150 microseconds so that it coincides with the greater part of the time unit following that in which the outlet sends it an impulse.

Figure 4:
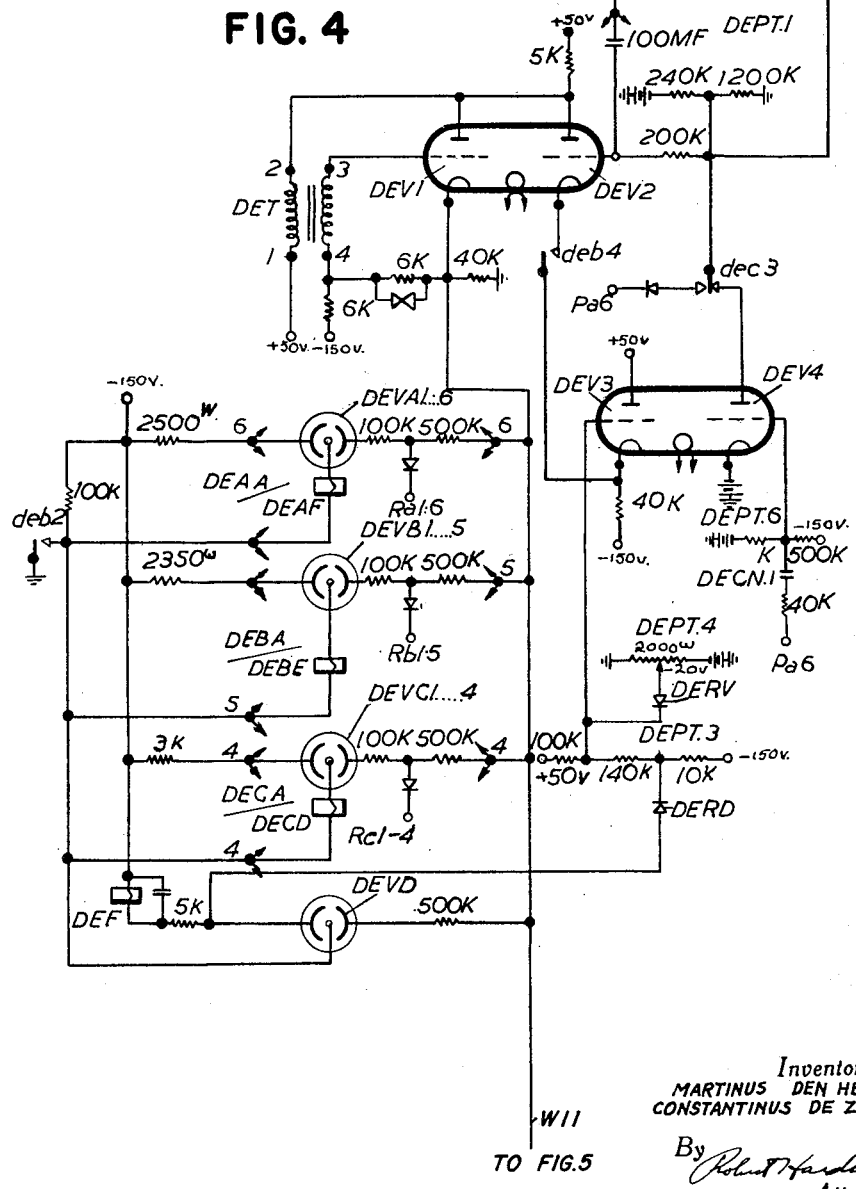
Figure 5:
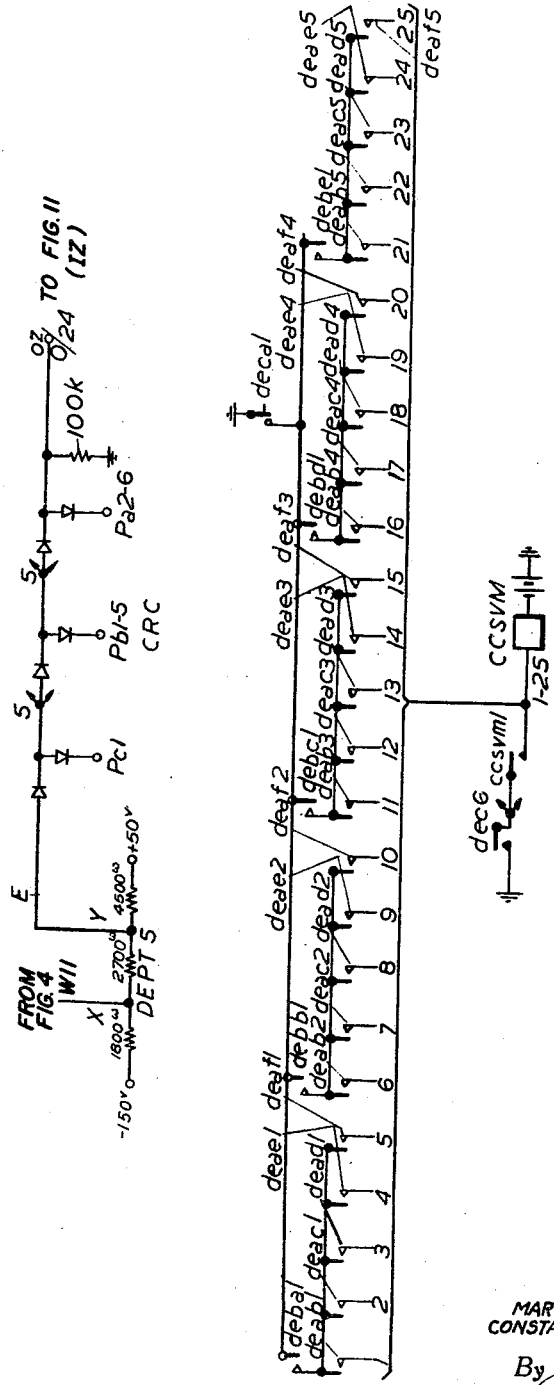

The impulse is seized in the cathode circuit of the regenerator tube DEV1 and sent to an assembly of 16 cold cathode tubes DEVA1 . . . 6, DEVB1 . . . 5, DEVC1 . . . 4, and DEVD. One tube of each of the three groups mentioned and the tube DEVD will be ionised. The tubes DEVA . . . DEVC will be ionised in accordance with a combination indicating that a free outlet has been found (Fig. 4). The tubes DEVC are not necessary for the 25 cord circuits, but would be necessary if the number of cord circuits were increased. The tube DEVD, in being ionised, modifies the potential of its cathode which is normally at —150 v., due to the fact that it is connected to the negative terminal of a 150 v. battery through the winding of relay DEF and a resistance in series. This potential is established at —75 v. and is transmitted through the rectifier cell DERD to a point of a potential divider DEPT3, which is normally at the potential of —142 v. This potential divider is connected at its ends on the one hand to the negative terminal of 150 v. battery and on the other hand to the positive terminal of a 50 v. battery; another point of the potential divider, connected to the grid of suppressor tube DEV3, is normally at a potential in the vicinity of —21.5 v. A second adjustable potential divider DEPT4 connects a negative 20 v. potential by means of another rectifier cell DERV to this grid and thus prevents said grid from being brought to a more negative potential.

As long as the grid of suppressor tube DEV3 is maintained at —21.5 v., its cathode is approximately maintained at the same potential. This potential moreover, is transmitted by the make contact *deb*4 to the cathode of the amplifier tube DEV2, which under these conditions, can respond to the impulses transmitted to its grid by the assembly of gates.

When the cold cathode tube DEVD is ionised, the potential of the point of the potential divider DEPT3 which at the origin was —42 v., is raised to —75 v.

Owing to this, the potential of the point of the potential divider which is applied to the grid of suppressor tube DEV3, is modified so as to be raised to about 0 volt; owing to this, the cathode of this tube is at about the same potential. Moreover, the potential of the cathode of the amplifier tube DEV2 is also brought to 0 volt, which makes it strongly positive with respect to its grid potential; in this way, no impulse can be transmitted by means of tube DEV2 in order to indicate free cord circuits in the following time units. This also applies to any impulse which might arrive in a time unit immediately following that corresponding to the first cord tested, because the tube DEVD is ionised during this moment, sufficiently soon before the next impulse *d*3, to prevent the amplifier tube from being influenced.

Figure 12:
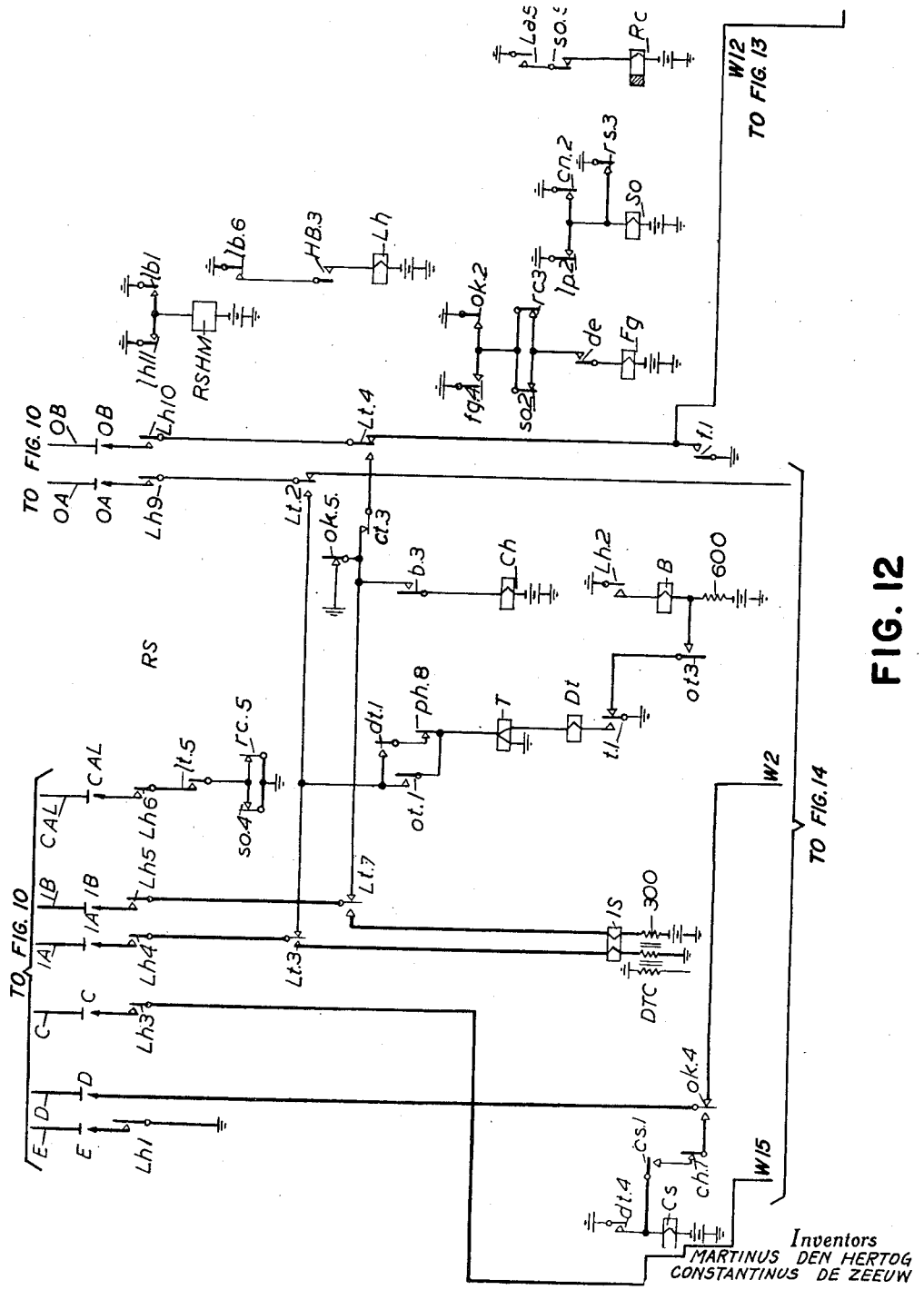

In the circuits described the switches of the call detectors CCS (Fig. 2) give access to the cord circuits which at the same time are connected to the register controllers by means of the switches RS in the register controller (Fig. 12).

It would also be possible for the switches of the call detectors, to give direct access to the register controller, which as already described, would be associated with the cord circuits by means of switch RS. As already stated, a call detector circuit is connected to a cord circuit only if an associated register controller is free. In this latter case, a detector circuit is only connected to a register controller if said register circuit were associated with a free cord circuit.

As soon as a free cord circuit has been determined by the ionisation of a combination of tubes DEVA—DEVC, the vertical bar corresponding to the outlet of the switch CCS is actuated.

This is obtained by the operation of the anode relays DEAA . . . DEAF, DEBA . . . DEBE, DECA . . . DECD in series with the tubes and connected to earth by means of make contact *deb*2. These relays comprise a certain number of make contacts through which one of the 25 vertical magnets CCSVM of the switch CCS is actuated. The assembly of these contacts appears in Fig. 5. Magnet CCSVM in operating is maintained by means of its own make contact *ccsvm*1, make contact *dec*6 and earth.

During the operations described above, the common control circuit serving the group of registers to which the tested cord circuit has access, is seized in order, on the one hand, to prepare the connection of a free register circuit with said cord circuit, and, on the other hand, to render this group of resistances and at the same time, all the free cord circuits which have access thereto, temporarily inaccessible, and thus to prevent other common control circuits of the call detectors from testing one of these free cord circuits in the interval comprised between the moment in which the cord circuit has been tested and the moment in which it seizes and engages a register circuit.

The seizure of the common control register circuit is effected when the impulse energising the combination of tubes and relays of the common control circuit of call detectors (Fig. 4) is also transmitted to the common control circuit of the register (Fig. 11), serving the group of registers to which the tested cord has access.

The impulse transmitted by the impulse regenerator DEV1 is transmitted to the point X between two resistance coils of a potential divider composed of three resistance coils DEPT5 (Fig. 5); this point is normally at the potential —110 v. The potential divider is connected to a signal circuit at a point Y equally situated between two resistances of said potential divider; this point Y is normally at the potential of —50 v. When the impulse regenerator transmits an impulse, the potential of point X is raised to —50 v.; this has the effect of raising the potential of point Y and circuit CRC momentarily to —17.5 v.

If the call detector and register circuits are connected to the cord circuit in the same way, the wire connected to the point Y of potential divider DEPT5 (Fig. 5) is directly connected to the point Z of the potentiometer RSPT (Fig. 11). This will be the case in offices of low capacity. If, however, the call detector circuits and the registers are connected to the cord circuit according to the different groupings, as may happen in larger central offices, it will then be necessary to interconnect the points Y of the call detector circuits to the points Z of the common control circuits of registers so as to permit such a difference.

The comparator circuit CRC (Fig. 5) and the concentration circuit RSCN (Fig. 11) are described in order to illustrate the manner in which such arrangements can be carried out when necessary. The comparator circuit CRC shown comprises three stages of comparison; the wire from the point Y is connected to one comparison device; this device is connected to five comparison devices, which in their turn are each connected to five other comparison devices. It is thus possible to meet the requirements of an exchange with 10,000 lines, for example. A smaller number of comparison stages can of course be employed.

The comparator circuit distributes the impulses which may occur successively at the point Y at the ends of the comparison device CRC, one at each end of the wires OZ. These wires are interconnected with the points IZ (Fig. 11) of the corresponding concentrator circuits RSCN in the common control circuit of the register, each comprising one rectifier cell per wire in each stage, so as to prevent interference between the different wires. The circuit shows, for example, 25 wires on the output of the comparator device, these being connected through a first stage of 5 wires, which themselves are connected to the point Z of the potentiometer RSPT. Such comparators and concentrators are described in the U. S. patent application Serial No. 167,672, filed June 12, 1950.

These systems of rectifier cells are connected in such a way that the impulses of —17.5 v. are only sent to that one of the terminals OZ corresponding to the outlet of the switch CCS to which the tested cord circut is connected. Any number of terminals OZ numbered 00 . . . 24 may be connected to any number of terminals IZ, numbered from 1 . . . 50 (Fig. 11), corresponding to the cord circuits having access to the group of registers served by each register common control circuit. It will consequently be seen that the terminals OZ, on one of which the 17.5 v. impulse is transmitted, are distributed over the common control circuits of the registers like the cord circuits corresponding to these contact-pins on the groups of registers corresponding to these common control circuits; consequently, an impulse arriving on a contact pin corresponding to the tested cord circuit will be transmitted to the particular register common control circuit corresponding to the group of registers to which this cord has access. As has previously been indicated, the terminals IZ corresponding to the cord circuits associated with the registers are, by means of two decoupling stages employing rectifier cells, of the potentiometer RSPT and the coupling condenser RSC, connected to the grid circuit of the triode RSV1 of the double triode RSV1, RSV2 which makes up a double amplifier stage. Each of these amplifiers changes the polarity of the impulse transmitted to it; thus, at the output a positive amplitude impulse is obtained which is sufficient to ionise a cold cathode tube RSCT in the common control circuit of the register.

A potential of about —75 v. is then applied from the anode of this tube and through the contact rsb2 to the test wire RSF, by means of which the availability of the circuit is verified; this immediately prevents other call detector circuits from being able to find the potential of the earth on this wire; thus, all the free cord circuits through which this wire passes will be temporarily rendered inaccessible.

It has been noticed that by a judicious distribution of the cords on the various register groups, arrangements can be provided so that the cords connected to each group of registers may be successively tested by the cord finders with a minimum time between every two tests, and that the operation of the cold cathode tube RSCT, which takes place in the time unit immediately following that in which a free cord has been found, occurs sufficiently long before the time unit in which the following cord can be tested, in order to prevent such a test taking place.

Another consequence of the ionisation of a cold cathode tube RSCT, is that the relay RSE operates in the common control circuit of the register and indicates that the blocking of the other free cord circuits is effective.

The following energisation circuit of relay DEC of the common control circuit of the call detector is completed: earth on make contact rse1 (Fig. 1), (which checks the operation of the cold cathode tube RSCT of the common control circuit of the register), wire 1 of the cord circuit, through Fig. 10 to the call detector circuit (Fig. 2), lead W6 to the common control circuit of call detector (Fig. 3), make contact VB1 of the vertical bar, relay DEC, lead W7 call detector circuit (Fig. 2), lead 2 of the cord circuit to the 500-ohm resistance, and battery (Fig. 10). It may be noted that by means of the circuit described, at the same time both the presence of the battery potential of the central office in the cord circuit tested and the effective seizure of the register common control circuit is checked. The relay DEC (Fig. 3), in energising, produces the following operations:

(1) It recloses by its make contact dec5, the energisation circuit of the slow-acting relay DEGB, which was opened by the contact des7 after the seizure of the call detector common control circuit, in such a way that relay DEGB is not released.

(2) It opens by its back contact dec4 the energisation circuit of the relay DEB, said relay DEB then releasing rapidly. It will be noted that from the moment in which the cold cathode tubes (Fig. 4) are ionised, the relay DEF has been energised in series with the tube DEVD. The winding of relay DEB is short-circuited. Said relay DEB in this way is made slow-acting and does not release as long as the contact dec4 is not open and has not suppressed the short-circuit.

(3) It applies an earth to the relay DEH through the make contact dec8 and the back contact deb3, in such a way that said relay is energised from the moment in which relay DEB has released. Relay DEH is held by means of contacts deh1 and dec8.

(4) It prepares by the make contact dec7 a circuit in which an auxiliary rectifier cell can be connected as will subsequently be explained.

The relay DEB in releasing, by means of its contact deb2, removes earth from the anode circuit of all the cold cathode tubes of the call detector common control circuit; said tubes are deionised and the anode relays released, including those which caused by their contact the energisation of the vertical magnet CCSVM.

The relay DEF being idle, and the relay DEH being operative, a circuit is again closed, by means of contacts deh2, deh3, in order to energise relay DEB which is again energised with a retardation caused by the time of release of the relay DEF, so as to check that all the cold cathode tubes are deionised and their anode relays have released.

Owing to the operation of the relay DEB, a second hunt will be made to find, not a free cord circuit, but the call detector or one of the call detectors which may be connected to the selected cord circuit.

The wires passing through the make contact dt1 and the back contact DHB1, in each of the call detector circuits (Fig. 2) associated with the same common control circuit, are each connected by means of gates, during each impulse Pa6, to the identification wire CDIL. Five of these wires passing through dt1 are shown among the 20 wires which may be provided owing to the presence of the sources Pa, Pb, Pc.

It will be understood from the following description that the impulses coming from the call detectors through the wires CDIL will only act on the tube DEV2 if the relay DEC is operative.

An explanation will first of all be given of the functions of the right hand triode DEV4, which forms part of the double triode DEV3, DEV4. During the first hunting, that is to say, while the relay DEC was idle, the anode of this tube DEV4 was connected by means of back contact dec3, to the grid of the amplifier tube DEV2. The grid of tube DEV4, is connected to the impulse source Pa6 by a potentiometer DEPT6 and a small condenser DECN1; said grid is then rendered positive only during every sixth time unit of group of 6. Consequently, during these time units the tube will become conductive and the anode relatively negative so that it will absorb any impulse which might arrive during any one of these time units, while the impulses corresponding to sources Pa1 . . . 5, that is to say, those employed for hunting free cord circuits are not affected.

The impulses transmitted by the call detector through the wire CDIL are thus present during the first hunting (that of a free cord circuit) but their effect is cancelled, as has previously been described, by the action of suppressor tube DEV4. During the second hunting which must follow, the suppressor tube DEV4 is disconnected from the back contact dec3 which now connects the source Pa6, by means of a gate, to the grid circuit of amplifier tube DEV2. Consequently, any impulse whatsoever, whatever its origin, transmitted on the grid of the tube DEV2 during the time units Pa1 . . . 5 will now be absorbed, and only those impulses, which arrive during the time units in which the source Pa6 transmits positive impulses, can act on the amplifier regenerator stage.

When such an impulse is detected by the tube DEV2, the corresponding impulse transmitted by the tube DEV1 ionises a combination of cold cathode tubes DEVA, DEVB, DEVC and the tube DEVD, according to the time unit in which the impulse is received. In all cases however, in the group of tubes DEVA, only DEVA1 can be ionised, causing the energisation of the relay DEAA, since an impulse sent during the sixth time unit of a group of 6 time units is received during the first time unit of the next group of 6 time units.

It will now be seen that owing to this, no circuit will be closed for any one of the vertical magnets CCSVM, because the energisation circuits do not comprise contacts of the relay DEAA.

Moreover, by means of the make contacts deh4, deaa1 (Fig. 3), and combinations of contacts of the anode relays DEBA . . . DEBE, DECA . . . DECD, of the cold cathode tubes, an operative circuit is completed for a relay HR (Fig. 2) in one of the call detector circuits, that is to say, that one from which the impulses have been detected. This relay completes a holding circuit for itself through the make contact hr1, back contact ccshm2, made contact dt3 and earth. The change of position of contact hr3 then removes the earth from the starting relay DES, which releases, in order to connect it to the back contact DHB2, in order to energise relay DEK in the common control circuit. This latter relay completes a holding circuit for itself through the make contact dek1, make contact dec1 and earth, and opens at a second point the energising circuit of the relay DES through its back contact dek4. Moreover, through its make contact dek2, it closes an operative circuit for the horizontal magnet CCSHM of the call detector of which the relay HR is energised. In all the other call detectors of the group, the relay HR is not energised, so that the corresponding horizontal magnets of these call detectors are not actuated. The horizontal magnet completes a holding circuit for itself through make contact ccshm2, make contact dt3 and earth; through its back contact ccshm2, it removes earth from relay HR, which can then release its armature. The operation of relay DEK has also caused the opening of relay DEB through its back contact dek5, so that said relay DEB, falling back rapidly, opens the anode circuit of all the cold cathode tubes; the anode relays release and open the operative circuit of relay HR.

It will be noted that before the opening of contact dek5, which caused the rapid release of relay DEB, this relay was already short-circuited by means of contact def1, and owing to this, said relay DEB begins to fall back slowly, after the energisation of the anode relay. The time of release of DEB under these conditions was sufficient to guarantee the operation of relay HR by the anode relays.

The magnet CCSHM now displaces the horizontal bar of the call detector circuit and this closes the contacts A . . . E in such a way that a call detector circuit with a call in hand is now connected to the selected cord circuit.

By the displacement of the horizontal bar of the switch CCS, the contacts DHB1, DHB2 of the call-detector circuit (Fig. 2) disconnect the earths respectively connected by the contacts dt1, dt3, to the common control circuit of the call detector. This circuit now remains under the control of the relay DEC and of the contact rse1, of the relay RSE in the common control circuit of the register (Fig. 11), until it has been effectively checked that the cord circuit has been connected to the call detector circuit and that the register common control circuit has received the indication to make the connection of a free register circuit.

This is due to the fact that when a circuit is established through the switch CCS to energise the vertical magnet RSVM (Fig. 11) of the switch RS corresponding to the selected cord circuit (Figs. 9, 10, 11), the selected vertical magnet RSVM operates by means of the following circuit: call detector circuit, earth on make contact dt5, contact D and lead d of the switch CCS (Fig. 2), cord circuit (Fig. 10), back contact ccbc7, and lead d to Fig. 11, vertical magnet RSVM of the register common control circuit (Fig. 11).

The operation of magnet RSVM closes the corresponding make contact rsvm1 which energises relay RSH. By means of the following circuit: make contact rsvm1, make contact rsh1, make contact rse2, relay RSD is energised and is held by means of make contacts rsd3 and rsvm1. The contact rsh6 opens the test circuit of the registers. When relay RSE is energised, the closing of contact rse3 short-circuits the winding of relay RSB, thus making it slow-acting. Relay RSB has not yet released, but the opening of contact rsd5 suppresses the short circuit and relay RSB releases immediately.

By the opening of contact rsb2, the cold cathode tube RSCT is deionised and relay RSE releases. The busy condition on the test wire is maintained, despite the deionisation of the cold cathode tube, because contacts rsb4, rsh6 are open in this test wire RSF.

The release of the relay RSE indicates to the call detector that the common control circuit can be released, which is done by opening make contact rse1 of the circuit in which relay DEC (Fig. 3) is energised. The release of relay DEC opens through contact dec8 the energising circuit of relay DEH, and by its contact dec1 the energising circuit of relay DEK; the vertical magnet actuated (Fig. 5) releases its armature owing to the opening of contact dec6. The vertical bar of switch CCS returns to normal. The horizontal bar is maintained by the horizontal magnet CCSHM (Fig. 2) of the call detector circuit. Relay DEB (Fig. 3) has been released by the opening of contact dek5, from the moment in which relay DEK has been energised; by means of contact deb2, the cold cathode tubes have been deionised, releasing their anode relays.

The release of relay DEK again prepares through contact dek4 the energising circuit of relay DES, so that from this moment this relay can operate to handle the next call. Relay DEB cannot be re-energised until the make contact def1 has suppressed the short-circuit on its winding, by means of which it is made certain that relay DEB remains idle for a sufficient time for the release of the anode relays of the cold cathode tubes.

Vertical magnet CCSVM has been held in the operative position after the time unit in which the cold cathode tubes have been extinguished for the first time (i. e. after the release of relay DEB, which takes place on account of the opening of contact dec4 at the moment when the relay DEC operates). The extinction of the tubes caused the opening of the operative circuit of the vertical magnet on account of the release of the corresponding anode relays, the holding circuit passing through a make contact ccsvm1 of vertical magnet CCSVM, a contact dec6 of relay DEC, and earth. This holding circuit is opened by the contact dec6 at the moment in which relay DEC releases, which takes place before the release of relay DEK because the latter is held through a make contact of DEC. The starting relay DES can only operate for a new call if relay DEK has released, because a back contact dek4 is inserted in the operative circuit of this relay. At this moment, it is not certain that the vertical magnet has already returned to normal; but, as long as this has not happened, a make contact ccsvm2, associated with any one of these magnets which may have been energised, holds DEB short-circuited, thus preventing DEB from operating for a fresh call as long as any vertical bar is raised.

The release of relay RSE of the common control circuit of the register (Fig. 11) starts the hunting for a free register circuit by the operation of the common starting relay RSST which is energised through back contact rse4 and the make contact rsd4. On the individual make contact for each group register, one of which is shown at rrst1, a circuit is completed by which the individual starting relay St of each free register circuit (Fig. 13) can operate through back contact HB2 of the horizontal bar of the switch RS. By the operation of individual relay St, it is made certain that the potential of the battery is connected to the register concerned, and this relay by its two make contacts st1 and st2 prepares the operative circuits of cold cathode tube HV in the register circuit. The cathodes of all the tubes of the free registers of a group are connected to the negative terminal of a 150 v. battery (Fig. 11) by the make contact st2, through a common 3,000 ohm resistance, of which the purpose is to prevent the ionisation of more than one tube at a time in one group. The make contact st1 applies earth to the control electrode through two 500,0000 ohm resistances in series; one of the sources Ra1 . . . 6 (a different source for each register of a group) is connected to the common point of the two 500,000 ohm resistances through a rectifier cell TG. Consequently, the control electrodes of the different tubes of a register group are only brought to a relatively positive potential when the source Ra connected to them is relatively positive, which happens for the various tubes of a group at different moments: in this way it is avoided that more than one tube at a time receives a sufficient potential on its ionisation path, thus causing its ionisation. The first tube ionised will determine the use of the associated register and by the ionisation of its discharge gap, reduces the potential on the cathode of the other tubes of the group which thus cannot be ionised, even if their control electrode becomes relatively positive.

The register circuit of which the tube HV is ionised will now be considered; relay F operates in series with the discharge gap and by its make contact f1 (Fig. 12) closes the energisation circuit of the relay Lb over lead w12. This has the effect of making the register busy by suppressing the earth on the test wire RSF (Fig. 11) through back contact lb4 (Fig. 13) and causes the connection of the cord to the register by closing the energisation circuit of the horizontal magnet RSHM (Fig. 12) of the switch RS corresponding to the register, by means of the following circuit: earth, make contact lb1. The closing of contact f2 completes the energisation circuit of the relay Fl (Fig. 13) which is locked by means of make contact f14 and back contact si6. Moreover, in the common control circuit (Fig. 11) relay RSB is again energised by the release of relay RSE. The horizontal bar is displaced and two sets of 5 contacts are closed, thus establishing the connection between the register of which the horizontal magnet RSHM (Fig. 12) has been energised, and the cord of which the vertical bar was raised. The horizontal bar now opens back contact HB2 causing the release of individual starting relay St (Fig. 13) of the register.

The release of relay St extinguishes tube HV of the register, releasing relay F; slow-acting relay Lb begins to release slowly.

The closing of contact lb6 (Fig. 12) and contact HB3 of the horizontal bar has actuated relay Lh. The closing of contact *lh*2 closes the energising circuit of relay B. Relay C*h* operates by means of a circuit containing contact *b*3 in the operative position and contact *ok*5 in the normal position.

Moreover, by the closing of the contacts of the switch RS and by the energisation of the relay L*h* of the register circuit, the energisation circuit of the relay LFA of the line finder circuit (Fig. 6) has been completed. This relay operates by means of earth connected in the register circuit by the following circuit: back contacts *ok*5, *lt*7, make contact *lh*5, wire IB of the cord circuit (Figs. 10, 9) wire B to the line finder circuit (Fig. 6), back contact *lfhm*2, winding of relay LFA, battery.

By the make contact *lfa*9 (Fig. 6), earth is applied by the wire F for the operation of the relay CCBC (Fig. 9) of the cord circuit, and this has the effect, by means of back contact *ccbc*7, 3, 9 (Fig. 10) of suppressing the connection between the call detector circuit and the register common control circuit. Owing to this, vertical magnet RSVM of the latter circuit (Fig. 11) releases, and by the opening of its make contact *rsvm*1 disconnects earth from the energisation circuit of the relays RSD, RSH, which release. By the contact *rsd*4, the common starting relay RSST releases; the vertical bar returns to normal. By the contact *rsd*5, the energisation circuit of relay RSB is closed, this relay already being energised by the back contact *rse*5. The register common control circuit is now in the normal condition, and the test circuit is again established by make contact *rsb*4 and back contact *rsh*6 to the remaining free cord circuits, so that these circuits are again available, provided that one or more registers are free.

Relay CCBC (Fig. 9) of the cord circuit, by its operation establishes a circuit by which the relay L*b* (Fig. 13) of the register circuit is maintained operative under the control of the call detector until the connection between the register and the calling line has been established. The holding circuit for relay L*b* is as follows: earth, make contact *dt*5 (Fig. 2), contact D of switch CCS, make contact *ccbc*2 (Fig. 10), back contact *ccda*4 of the cord circuit (Fig. 10), contact OB of switch RS, make contact *lh*10 (Fig. 12), back contact *lt*4, lead *w*12, winding of relay L*b* (Fig. 13), battery.

By the contact A of the switch CCS of the call detector circuit a connection may be established from one of the sources P*d*1 . . . 10 to the register circuit; this connection would be used to indicate to the register circuit the number of the 100's of the group in which the calling line is connected, in the event that the requirements of the exchange make this necessary. This indication would be used to control the selection of a first finder circuit for free lines in the group concerned by a second line finder circuit, which would operate in the same manner as the group selector, under identical conditions, and would use the same common control switch. Under the conditions described, all the circuits seized are maintained under the control of relay DT of the call detector circuit. This relay, through its make contact *dt*3, maintains the horizontal magnet CCSHM of the switch CCS, by which the call detector has reached a cord circuit, and, by its make contact *dt*5, maintains the relay L*b* of the register as has been described. The relay L*b* in turn maintains on the one hand horizontal magnet RSHM (Fig. 12) of the switch RS by its make contact *lb*1, and on the other hand relay L*h* by its make contact *lb*6, said relay L*h* by its contacts connecting the register to the cord circuit.

Figure 6:
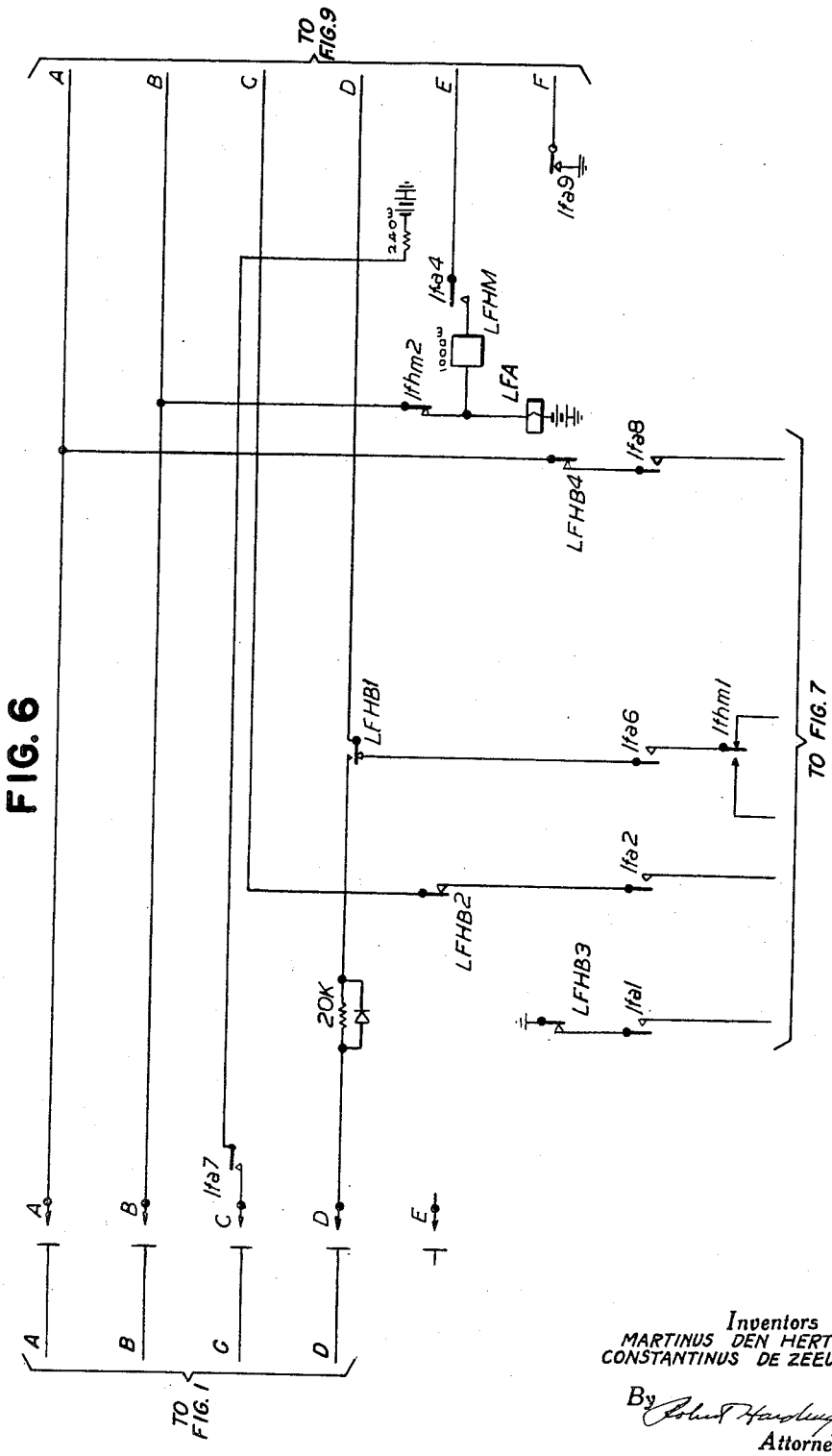
Fig. 6 shows a line finder circuit composed of the individual switches of a multi-switch of which the operation will be described later.

The register circuit, as has been previously described, applies earth to the wire B so as to energise relay LFA in Fig. 6 by means of back contact *lfhm*2 of horizontal magnet LFHM.

The operation of relay LFA (Fig. 6) immediately causes the connection of the line finder circuit to its common control circuit by connecting the wires A, C and D of the cord circuit by means of make contacts *lfa*8, *lfa*2, *lfa*6, respectively, the common control circuit is rendered operative by an earth applied to it through back contact LFHB3, and make contact *lfa*1.

Relay LFA moreover, prepares its holding circuit by means of the wire E in series with the winding of horizontal magnet LFHM and make contact *lfa*4, but the magnet LFHM cannot operate in the time unit concerned, because an earth is applied to the two ends of its winding; a direct earth is in fact connected by means of the following circuit: wire E, contact E of switch RS in the register (via Fig. 10), contact *lh*1 (Fig. 12), earth. Earth is applied through contact *lfa*9 to the energisation circuit of relay CCBC in the cord circuit (Fig. 9); the relay CCBC is thus energised, as has already been indicated.

The earth applied through the make contact *lfa*1 and the back contacts *lfsh*1, *lfsc*3, causes the energisation of relay LFSB (Fig. 7) in series with a resistance connected to the feed battery of the common control circuit; this relay in closing its contacts *lfsb*1, 2, 3, 4 prepares the circuits permitting the control of selection by the line finder of the calling line. As has previously been described, the call detector circuit (Fig. 2) comprises a regenerator tube VAD4 which transmits impulses in its cathode circuit and in its grid circuit in coincidence with the impulses coming from the calling line or lines connected thereto.

The impulses obtained in the cathode circuit are transmitted through the wire III from Fig. 2 to the common control circuit of the line finder (Fig. 7). An impulse is sent for one time unit every 120 time units, said impulse being characteristic of the tens and units digits of the calling line number; by closing its make contact *lfsb*3, this impulse will be transmitted through back contact *lfhm*1 (Fig. 6), make contact *lfa*6, and back contact LFHB1 to the wire D, which is connected through the cord circuit to the register circuit.

It will be noted that in the register controller the contact *fl*3 has connected the grid of tube V*a*2 (Fig. 15) to earth by means of the following circuit: make contact *ch*2, make contact *fl*3, and back contact *la*7. The grid of the tube V*a*4 is also earthed through back contact *fs*4. Neither of the tubes V*a*2, V*a*4 can thus interfere with the impulses amplified by the tube V*a*1. The grid of the tube V*a*3 is connected by means of the back contacts O*t*4, *si*5, *fs*2 to the impulse sources P*a*2 . . . 6, connected in parallel by means of rectifier cells. The tube V*a*3 thus permits the reception of impulses by the tube V*a*1 at any moment except during the time units of transmission of the source P*a*1, that is, during 5 time units out of 6 of each cycle P*a* which is allocated to the selection control.

During each of the impulses from the sources P*a*2 . . . 6, the current flows from the negative battery of the exchange to the point of −16 v. potential supplied by one of said sources, through the grid resistance of V*a*3 and the rectifier corresponding to the source concerned; the grid will be brought to the potential of −16 v. during the duration of the impulses P*a*2 . . . 6, the tube V*a*3 then being conductive. However, during each of the impulses supplied by the source P*a*1, a potential of −40 v. will be applied to the grid of V*a*3, and said tube will no longer be conductive. There is therefore a negative potential on the cathode of V*a*3 during the impulses P*a*1, the impulse generator not being able to be actuated by impulses coming from a common control circuit through the wire D during the impulses P*a*1.

Impulses from a source *d*3 are continuously applied to the grid of the tube V*o*2 (Fig. 14), which forms part of a double triode V*o*1, V*o*2 provided to produce impulses. When one or more of the cathodes V*a*1, V*a*2, V*a*3, V*a*4 are negative, each of the impulses *d*3 is absorbed in a 20,000 ohm resistance on account of the flow of current through said 20,000 ohm resistance and the rectifiers R*c*1, R*c*2, R*c*3, R*c*4 and the negative cathode or cathodes of the tubes. When the impulses are simultaneously applied to the grids of the tubes V*a*1, V*a*3 by the line finder and by the sources P*a*2 . . . 6, all cathodes are simultaneously positive; the corresponding impulse *d*3 renders the grid of V*o*2 positive, since there is no current flowing through the 20,000 ohm resistance and one of the rectifiers.

Consequently, the tube V*o*2 causes the operation of the tube V*o*1. The tube V*o*1 forms part of an impulse regenerator which also comprises a transformer TP, TS connecting the anode and grid circuits, a resistance RRS and a varistor or thermistor TH in parallel on the grid bias circuits and the cathode circuit.

In the absence of a trigger impulse, the grid of the generator tube V*o*1 is biassed to a value which does not permit the operation of the tube, and no current flows either in the windings of transformer TP, TS or in the tube. If a negative voltage is suddenly applied to the anode of the tube, this voltage changes sign after having been transmitted to the grid winding of the coupling transformer, said grid then becoming positive. If the amplitude of the voltage applied is sufficient to bring the polarisation of the grid to a suitable value, the generator is fired. The anode current begins to flow through the anode winding; the grid then becomes more positive and in turn produces an increase of the anode current. Almost immediately, the grid becomes more positive than the cathode; a considerable grid current begins to flow, thus restricting any subsequent rise of the grid potential. At this moment the anode and grid currents begin to decrease, the latter more rapidly, so that the difference between the ampere turns of the anode and grid windings rapidly increases.

After a period which depends to a great extent on the self-inductance of the windings of the transformer and of the resistance of the anode circuit of the tube, the grid current is cancelled. From this moment, any decrease of the anode current causes the appearance of a negative voltage in the grid winding, which in turn brings about another decrease of the anode current. The tube is then rapidly extinguished, and ceases to operate until a fresh trigger impulse arrives.

A current impulse of substantially rectangular form is thus produced in the cathode circuit, of which the amplitude and the duration are not dependent either on the amplitude or the form of the trigger impulse.

The loading resistance RRS placed in the cathode circuit of the generator makes it possible to transform the current impulse into a voltage impulse, the said voltage being maintained substantially at the same value for the whole period of the impulse.

One impulse will be produced for each trigger impulse applied to the anode, after which the tube returns to normal.

When a selection impulse from the call detector is received by the register through the wire D, via $ok4$ back (Fig. 12), on the grid of the tube $Va1$, an amplified impulse will be applied to the grid of the tube $Vo2$. When the amplified impulse and a short impulse $d3$ coincide on the grid of the tube $Vo2$, an impulse is transmitted by the tube $Vo1$ and is applied to the cold cathode tubes $Vabu$, $Via$, $Vib$, $Voa$ ... $Voh$. The tube $Vabu$ is the tube which by its condition characterises the busy state; it is only used in the case of final selectors and its circuit is opened by the contact $fs5$.

The tube $Via$ is connected, and receives any control impulses, so that it operates and energises its anode relay $Si$. The tube $Vib$ is isolated by the contact $ph5$ and cannot operate.

The tubes $Voa$ ... $Voh$ are each controlled by individual sources of cycles of impulses $Ra$, $Rb$, $Rc$, each associated with the source $Ra1$, so that none of the tubes corresponding to class of outlets will operate under the influence of the selective impulses, because these selective impulses occur only at times corresponding to impulses $Pa2$ to $Pa6$.

Relay $Si$ at $si6$ causes the release of relay $Fl$ (Fig. 13) so that the earth applied to the tube $Va2$ will be suppressed.

The operation of contact $si4$ applies an earth through back contacts $cs5$ and $or1$, which operates the relay $Ot$; relay $Ot$ is held through its contact $Ot2$. The regenerated impulse, which, by reason of the relative position of the impulse $d1$ applied to the grid of tube VAD2 in Fig. 2 is located in the time unit immediately following the time unit in which it had been sent to the call detector, is returned to the cold cathode tubes, LFSVA1 ... 6, LFSVB1 ... 5, LFSVC1 ... 4, and LFSVD, in the common control circuit (Fig. 7) through the following circuit: lead W15 to Fig. 12, make contact $lh3$, wire C through Fig. 10 to Fig. 9, back contact $ccda3$ of the cord circuit (Fig. 9), wire C to Fig. 6, back contact LFHB2 in the line finder circuit (Fig. 6) and make contact $lfa2$.

The tubes will operate in accordance with a characteristic combination of the tens and units digits of the calling subscriber's number, while the tube LFSVD operates for any impulse.

Each of these 15 tubes is controlled by a system of gates connected to one of the impulse sources (of which the diagram and arrangement have been shown in Fig. 21), in such a way that these tubes can only be ionised in specific time units.

For example, each of the tubes LFSVA1 ... 6 is controlled through a gate device, by one of the sources $Ra1$ ... 6 so that the tube LFSVA1 can only be ionised in one of the time units in which the source $Ra1$ transmits a relatively positive impulse, that is to say, during the time units 1, 7, 13, etc.

Moreover, the tubes LFSVB1 ... 5 are connected, each through a gate, to one of the sources $Rb1$ ... 5, so that the tube LFSVB1 can only be ionised during one of the time units in which the source $Rb1$ is transmitting relatively positive impulses, that is to say, during time units 1 ... 6, 31 ... 36, 61 ... 66, etc.

The tubes LFSVC1 ... 4 are controlled in a similar manner by the sources $Rc1$ ... 4, of which it is easy to find in Fig. 21 the time units during which the sources are transmitting positive impulses.

Finally, there is a tube LFSVD, which is not controlled by gates and consequently will be ionised under the influence of an impulse arriving in any time unit from the register through wire C (as described above). It is easy to see that an impulse arriving during any time unit will always cause the ionisation of a tube in each of the three groups LFSVA, LFSVB, LFSVC, so that a combination of a tube of each of the three groups is characteristic of each time unit or again characteristic of the calling line.

For example, in accordance with the table in Fig. 22, the time unit No. 1 is employed to send an impulse characteristic of the line "00" and this impulse will be sent from the register during time unit No. 2. At the moment when the sources $Ra2$, $Rb1$, $Rc1$ are relatively positive, the tubes LFSVA2, LFSVB1 and LFSVC1 are ionised.

Similarly, an impulse sent during the time unit No. 119 to characterise a call from line 99 arrives on the cold cathode tubes during the time unit No. 120, that is to say, the moment in which only the sources $Ra6$, $Rb5$, $Rc4$ alone are relatively positive, so that the tubes LFSVA6, LFSVB5, LFSVC4 are ionised.

Each of the ionised tubes causes the operation of its anode relay (LFSAA–F, LFSBA–E, LFSCA–B); and through the make contacts of these three relays, the circuits are closed so as to determine the outlet to which the individual finder circuit must be connected.

First of all, the energisation circuit of one of the vertical magnets LFVM of the multi-switch is closed by the circuits controlled by the anode relays LFSAB ... LFSAF, LFSBA ... LFSBE, LFSCA ... LFSCD as subsequently will be described in relation to the final selector.

One of the relays LFSD, LFSE (Fig. 8) is energised owing to the fact that one of the relays LFSCA ... LFSCD associated with the tubes LFSVC1 ... 4 is operative. Relay LFSD operates under the control of one of the relays LFSCA or LFSCB by means of an energisation circuit comprising contact $lfsca2$ or $lfscb2$; the relay LFSE operates, its energisation circuit being closed by contact $lfscc2$ or $lfscd2$ of the relays LFSCC or LFSCD.

The operation of vertical magnet LFVM causes the displacement upwards of the vertical bar controlled thereby.

In the interval, two other operations take place. On the one hand, the register circuit, after receiving the indication that selection information has arrived as previously described, closes the circuit of test relay T; earth, relay T (Fig. 12), make contact $ot1$, back contact $lt3$, make contact $lh4$, wire IA to Fig. 10 and Fig. 9, wire A (Fig. 9) of a cord circuit, and in the line finder (Fig. 6), back contact LFHB4 (still Fig 6), make contact $lfa8$, relay LFSC (Fig. 7). Relay T is energised, and at $tl$ connects the double test relay $Dt$; only one of these relays can operate, so that only one register can be connected with the same line. The energisation circuit of relay $Cs$ is closed by the contact $dt4$. The opening of the two contacts $Ot6$ and $dt3$ (Fig. 14) extinguishes the tubes $Voa$ ... $Voh$ which were fired, and releases the associated relays, so that by the set of contacts $oa3$ ... $oh3$ and the make contact $cs2$, the relay $Or$ is energised and releases relay $Ot$. In any register controller which has not been able to be connected, the relay T, which was operative, releases owing to the operations of relay $Dt$ in the register which has been able to connect. The relays $Cs$ ... $Or$ in the registers which are not connected to a line, do not operate, and the relay B (Fig. 12) is short-circuited by the earth applied to one end of its winding by means of back contact $t1$ and make contact $ot3$. Relay B is released, and releases relays $Si$ (Fig. 14), $Ot$ (Fig.

13), Ch (Fig. 12). Relay B reoperates on the release of Ot through contact lh2, and the register is ready again to receive impulses from a calling line. In the common control circuit of the line finder the relay LFSC (Fig. 7), of which the winding is low resistance, operates owing to the presence of the test potential and closes a holding circuit for one of the relays LFSD, or LFSE (Fig. 8) which are operative, so that this relay is then rendered independent of the anode relays of the register tubes.

Moreover, the relay LFSF operates in series with the tube LFSVD and at lfsf1 short-circuits the winding of the relay LFSB, which then begins to release slowly. Before the relay LFSB has released, the relay LFSC can operate, and by its contact lfsc3 open the energisation circuit of relay LSFB which then releases immediately. By its release, the relay LFSB opens its contacts lfsb1 and lfsb2, thus opening the anode circuits of all the tubes, so that those which are ionised are extinguished, causing the release of their anode relays.

The energisation circuit of the vertical magnet LFVM is then opened, but this magnet remains operative by means of the following circuit: make contact lfvm1, contact lfsd5 or lfse5. A relay LFSH which is energised in this circuit opens the circuit of relay LFSB on the contact lfsh1.

After having thus determined the identity of the calling line, a check is first of all made to determine the class of line. For this purpose, the terminals respectively numbered 00 . . . 49 and 50 . . . 99, that is one terminal per line, are connected in accordance with any desired method of grouping, to 20 class-of-line wires COL (Fig. 8), according to the class to which each of the lines belongs.

Fig. 8 shows, under the title "Distributor connections for class of lines" a table indicating the wires COL1–20 to which the various lines must be connected according to their class.

When the vertical magnet of a pair of outlets is actuated, earth is applied to a particular wire COL through a common make contact lfsd2 or lfse3 and one of the 50 multipled contacts LFVB1, LFVB2 associated with the vertical bars.

As shown in the drawing, the 20 terminals are each connected through a high value resistance COR, to three successive stages of gates CORCS, CORCP, BRCS, BRCP, CRCS, CRCP, controlled by the sources of impulses, so that the application of earth to any one of these wires produces an impulse in a corresponding time unit, said impulse being applied to the grid circuit of the amplifier tube SVA3. The time unit in which this impulse is applied has been indicated, for a certain number of 20 terminals in the table given in Fig. 8.

It will be seen that all these time units correspond to the last time unit of the 20 consecutive groups of 6 time units in a group of 120 time units defined by the sources Pa, Pb, Pc. The first stage of gates, controlling all the connections of the 20 classes of lines, is connected in each class to the source Pa6.

The relay LFSC being operative, the source Pa6 is also connected through a gate to the grid circuit of the amplifier tube, by means of the make contact lfsc1, so that under these conditions, those impulses will be suppressed which might arrive in any of the time units other than those associated with the 20 COL wires already mentioned.

An earth is then connected, through one of the contacts of the vertical bar corresponding to the selected line, to one of the twenty terminals according to the class of line. An impulse will then be transmitted, in the corresponding time unit, to the amplifier tube SVA3, which is then made conductive by the fact that a battery is connected to its cathode by the make contact lfsc4; the potential of the cathode then being such that the tube can respond to the impulses. These impulses are combined with a short impulse transmitted by the source d2 which is connected through a small condenser Gc1, to the grid of the tube SVA3, said tube being released once every 120 time units. The exact moment of this release is determined by the impulse transmitted by the source d2, which, as may be seen in Fig. 21, is situated towards the end of the time unit in which an impulse is transmitted from the gates.

By means of a second double triode SVA1, 2, of which the anodes, cathodes and grids are connected in parallel, and in combination with a two-winding transformer, LFST, an impulse is retransmitted, said impulse beginning at the moment when the source d2 is transmitting in short impulse and having a duration corresponding approximately to half a time unit of the source Pa1. It will then be understood that this impulse begins slightly before the end of the time unit in which a time impulse is produced by the rectifier cell system and that it is prolonged during the following time unit.

This impulse is now transmitted, by the back contact lfsb3 of the relay LFSB (which in the meantime has released) to the wire D of the line finder circuit, and then to the grid of the tube Va1 of the register circuit through the following circuit: contact lfhm1 at normal (Fig. 6), make contact lfa6, back contact LFHB1, wire D, cord to the register via ccda6 back (Fig. 9, lead D via Fig. 10 to Fig. 12, ok4 back to Fig. 15 via Fig. 14); the register responds to this impulse by identifying the time unit during which said impulse arrives, thus determining the class of calling line. The register records the class of line in the following manner:

The grid of tube Va2 is applied to earth through make contact ch2 and make contact or2. The grid of tube Va4 is still applied to earth through back contact fs4. The grid of tube Va3 is applied to the source Pa1 through back contact ot4, make contact si3 (contact si5 being open), so that the tube Va3 is blocked during all the impulses transmitted by the sources Pa2 . . . 6; said tube Va3 can only respond to the impulses during the transmission of impulses by the source Pa1, which only permits the detection of the impulses characteristic of the class of line.

When an impulse of this kind is detected, the tube Va1 operates and applies an amplified impulse to the grid of tube Vo2 (via lead W16) so that the tube Vo1 and the transformer TP, TS transmit an impulse via lead W15 on the wire V under the control of the detector source d3, at the beginning of the impulse immediately following that in which the impulse has been transmitted. The impulse sent has no effect on the line finder common control circuit, but causes in the register the operation of a combination of tubes and relays characteristic of the class of line Voa . . . Voh, Oa . . . Oh, which for a normal line are the relays Oa, Oe. Relay Or (Fig. 13) is released.

Relay OK (Fig. 13) now operates through the following circuit: back contact ot5, back contact bu3, make contact dt2, back contact ph6, make contact oe4, make contact oa1. The opening of contact ok5 (Fig. 12) removes earth from the wire 1B.

The horizontal magnet LFHM of the line finder operates in series with relay LFA (Fig. 6) by means of the earth applied through the following circuit: wire E, make contact lh1 (Fig. 12), in the register circuit. Contact lfhm2 is opened, and disconnects the relay LFA and the magnet LFHM from the wire B and at the same time signals to the register that magnet LFHM is energised. Relay Ch (Fig. 13) of the register is released and the register then applies earth to the wire D in Fig. 9 via Fig. 10 by means of the following circuit: make contact dt4, (Fig. 12), make contact cs1, back contact ch1, make contact ok4. This earth is applied from the D wire through back contact LFHB1, make contact lfa6, and make contact lfhm1, to the common control circuit (Fig. 7), thus causing the operation of one of the two horizontal servo-magnets LFSHMA or LFSHMB according to whether contact lfsd2 or lfse2 is closed. In the example of a call transmitted by the line "00," the relay LFSD was energised and thus electro-magnet LFSHMA operates; in the case of a call sent by the line "99," the relay LFSE was energised, and thus it is magnet LFSHMB which operates. Consequently, a horizontal bar of the finder (Fig. 6) of which the horizontal magnet LFHM was energised in advance, is displaced to the left or to the right; in the first example, the line finder connects the line "00" and in the second example, the line "99."

When the five contacts A . . . E connected to the calling line have been closed, the back contacts LFHB1, LFHB2, LFHB3 and LFHB4 are opened by the displacement of the horizontal bar, which at the same time closes the make contact LFHB1. This places the line finder circuit in the talking condition, and at the same time disconnects it from the common control circuit.

Figure 13:
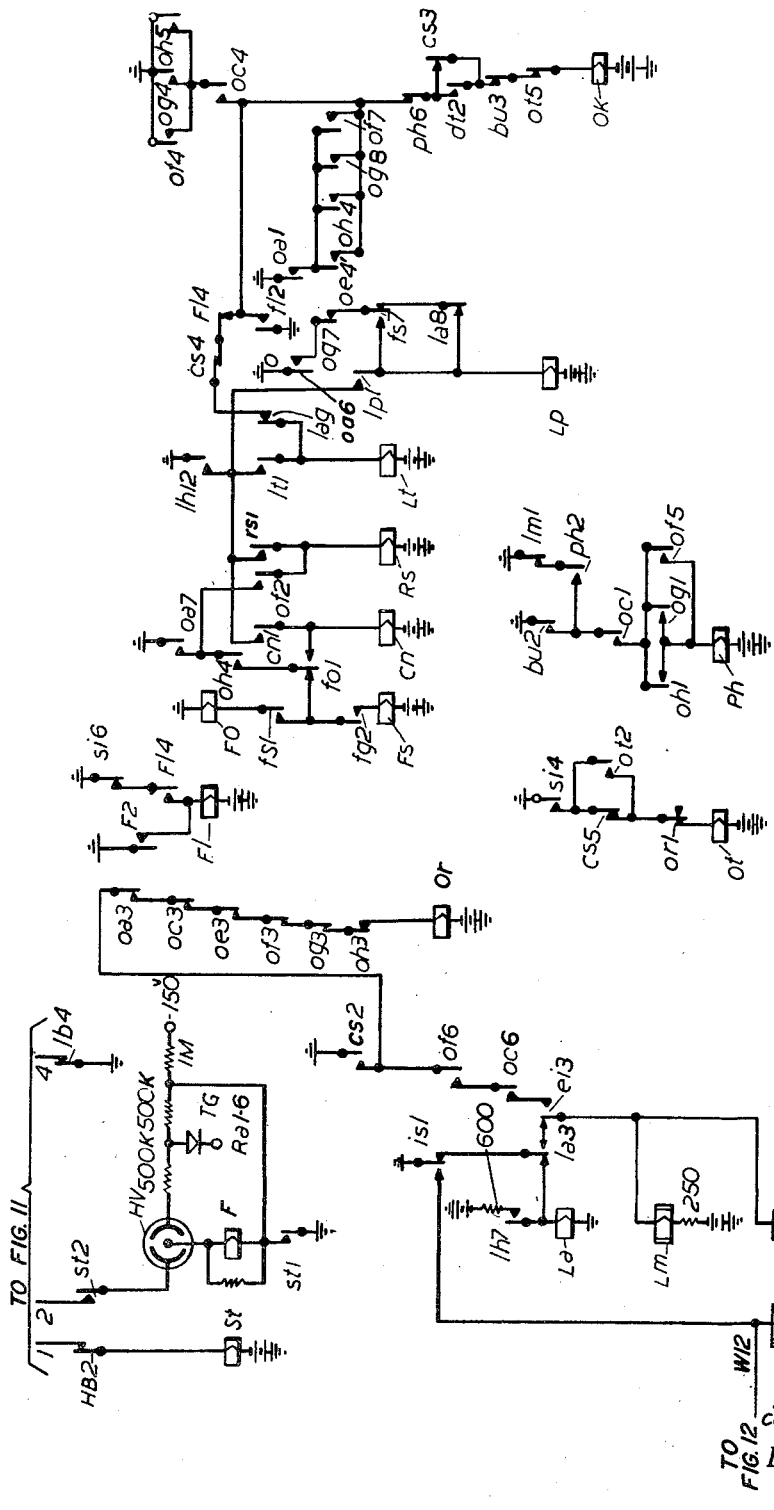

It will be noted that one of the magnets LFSHMA or LFSHMB (Fig. 7) according to the particular case, closes its holding circuit; make contact of magnet lfshma1 or *lfshmb*1, and contact of one of the relays LFSD or LFSE which was operative, so that the horizontal servomagnet does not release immediately when the back contact LFHB1 is opened in the line circuit. Moreover, and on account of the opening of back contact LFHB4, the relay LFSC is released in the common control circuit, as also the test relays T, D$t$ (Fig. 12) connected in the register by the wire A; contact *dt*4 is open and releases the relay C$s$. The release of relay C$s$ causes at *cs*3 the release of the relay OK (Fig. 13). The relay D$t$, through its contact *dt*4, suppresses the earth on the wire D.

The release of the relay LFSC causes that of the relay LFSD or LFSE, which is released in its turn, which has the effect of setting the vertical bar in the normal position, as also the horizontal magnet LFSHMA or LFSHMB. The common control circuit is now released and can handle another call owing to the fact that the relay IFSB is able to function. It will be noted that the release of the horizontal servo-magnet LFSHMA or LFSHMB does not return the horizontal bar of the finder to normal, because it is also maintained operative by the horizontal magnet LFHM which is peculiar to the line finder circuit (Fig. 6).

In the register, the release of relay C$s$ (Fig. 12) and the operation of the relays corresponding to an ordinary line causes the operation of relay L$t$ (Fig. 13) by means of the following circuit: back contact *la*9, back contact *cs*4, back contact *fl*4, make contact *oe*4, make contact *oa*1. Relay L$t$ is locked by the set of contacts: *lt*1, operative, and *lh*12 operative.

The relay CCDA operates in the cord circuit under the control of the register circuit when the latter has established the connection with the calling line. The operative circuit of the relay CCDA will be given later.

The common control circuit of the line finder and of the final selector can simultaneously handle any number of individual line finders and/or final selectors, so that it effects its selective operations for several calling lines and/or several wanted lines at a time, the selection of each line being controlled by a register which handles each call. Consequently, it will be seen that the individual line finder circuits and final selector circuits are not busy when one of them is seized to make the selection of a line by means of the common control circuit, so that any line finder or final selector can be seized for other calls in the time unit under consideration; when this happens these line finder and final selector circuits will all be connected in parallel to the common control circuit on account of the operation of their respective relays LFA, FA. The common control circuit then sends the indication coming from the scanning circuit simultaneously through all the line finders and all the final selectors connected to the corresponding registers. When one or more of said registers responds to the impulse received from the scanning device, and returns an impulse through the wire C, the cold cathode tubes operate in the same manner as that already described.

Relay S$i$ operates, in the manner already indicated, in two or more registers which have simultaneously responded to the impulses from the scanning device; each of said registers then connects the two test relays T and D$t$ (Fig. 12) to the wire A. These test relays effect a double test operation in accordance with a well-known method, so that these relays can operate until any one of these registers close their contacts in order to proceed with the operations already described. In the other register or registers in which the test relays have been unable to operate immediately, a circuit is closed through back contact *t*1 of relay T and make contact *ot*3, which causes the short-circuiting of the winding of relay B; this relay which was energised after the seizure of the register through the contact *lh*2, then releases slowly. In releasing it suppresses the earth on the anode circuit of the tube V*ia*, so that the relay S$i$ falls back. The register is then restored to the selective position, the selective operations then being resumed.

It has been explained that the common control circuit can effect the selection and hunting for several line finders and several final selectors simultaneously. This makes it necessary, as soon as the cold cathode tubes have recorded an indication of selection for a call, for the sending of an indication of selection to the registers serving other calls in the same multi-switch to be stopped; thus, there can be no confusion due to the fact that two or more registers are trying to effect the recording successively by means of the cold cathode tubes of the selective information relating to the call which they are handling, during the time in which the cold cathode tubes are already busy with the recording, or before they are prepared for the next recording. This is done by means of the tube LFSVD (Fig. 7) in co-operation with the triode SVA4, which acts as suppressor tube. When the tube LFSVD is fired at the same time as a combination of tubes LFSVA . . . LFSVC, it modifies the potential of its cathode which was −150 v., being connected to the negative terminal of a 150 v. battery through the winding of relay LFSF and an individual resistance. The potential of the cathode is brought to about −75 v. The cathode of the tube LFSVD is connected to one point of a potential divider LFSPT through a rectifier cell LFSRD. The potential of said point of the potential divider is normally −142 v. The potential divider has on the one hand its two ends respectively connected to the negative terminal of a 150 v. battery and to the positive terminal of a 50 v. battery, and on the other hand another point connected to the grid of the suppressor tube SVA4; this point is normally at the potential of −21.5 v. A second variable potential divider APT applies a potential of 20 v. through the rectifier cell APC to the grid of the tube SVA4, thus preventing this grid from falling to a more negative potential.

When the grid of suppressor tube SVA4 is at −21.5 v. potential, the cathode is maintained at an adjacent potential; this potential moreover is transmitted to the cathode of the amplifier tube SVA3, which, under these conditions, can respond to the impulses sent to its grid through the assembly of rectifier cell systems.

When the tube LFSVD is ionised, the potential of the point of the potential divider LFSPT which was originally −142 v., is raised to −75 v. Owing to this, the potential of the point of the potential divider connected to the grid of the suppressor tube SVA4 is modified so as to be raised to about 0 volt; owing to this, the cathode of this tube is at about the same potential. Moreover, the cathode of the amplifier tube SVA3 has its potential raised to about 0 volt, and owing to this is rendered strongly positive with respect to the grid. The said tube then stops transmitting any impulse which might then arrive from the final selector in hunting for a wanted line. At the same moment, the cathode of suppressor tube SVA4 is connected through the wire I to the call detector (Fig. 2), where it acts in an identical manner on the cathode of suppressor tube VAD2, then preventing the transmission of impulses by the impulse regenerator tube VAD4, on to the wire III. Consequently, if other lines in the same group of 100 lines were calling, they could not send their selective information, that is to say, the impulse characteristic of the tens digit and the units digit of their number, to the other line finders or other registers.

It will be noted that the tube LFSVD is extinguished at the same time as the other cold cathode tubes when the relay LFSC operates, and the relay LFSB releases. The transmission of impulses to the final selectors is then prevented owing to the fact that the contact *lfscl* (Fig. 8), through a gate, connects the impulse source P*a*6 to the grid circuit of the amplifier tube SVA3, so that from this moment, only those impulses which arrive during the time unit characteristic of the class of line can be transmitted.

Moreover, the transmission of selective impulses in the line finders is then prevented because the wire III is disconnected by the contact *lfsb*3 at normal.

Tube LFSVD can, moreover, be extinguished at the moment when relay LFSB releases owing to the fact that its function has been transmitted to another tube as previously explained.

When a call appears on a line, impulses are sent by the call detector on the wire II and impulses are simultaneously sent on the wire III. These impulses are characteristic of the whole of the tens and units digits of the number of the calling line. The impulses transmitted on the wire II, are sent by the impulse generator tube VAD4 and are placed in the call detector circuit (Fig. 2) under the control of a short impulse *d*1 which is applied to the potentiometer CDT and which is so situated in time that the impulse begins a little earlier than the impulses regenerated by the tube SVA3 in the common control circuit of the final selector, under the control of the short impulses $d2$ (Fig. 7). Moreover, the impulses regenerated on the wire II are also a little longer than the impulse regenerated by the tube SVA3, so that they end a little later. The impulses on the wire II are transmitted through a rectifier cell to a point of the potential divider LFSPT (Fig. 7) which is normally at the potential $-39$ v.; the potential of this point is modified by the impulses so that the suppressor tube SVA4 modifies the potential of the cathode of the amplifier tube SVA3 in such a way as to render it positive with respect to the grid potential of said tube.

In this way the impulse which is produced in the common control circuit during the time unit characteristic of the calling line is completely suppressed. Consequently, a register which controls the hunting by a final selector of a line which is already calling, will not receive impulses during the time unit characteristic of this line, and it therefore will not be able to complete its selection as long as the calling line has not been selected by a line finder. From this moment the line will be busy in the normal manner and a register controlling the hunting for such a line will receive the busy indication, as will be described for the final selector.

The release of the connection is indicated at any moment by disconnecting earth from the wire E, which causes the release of relay LFA and of magnet LFHM if the latter is operative. The release of the latter causes the return of the horizontal bars to normal, thus opening the contacts A ... E and re-establishing the back contacts LFHB1 ... 4.

When the line finder finds the calling line, the potential of the battery is transmitted to the wire C of the subscriber's line owing to the fact that the battery is applied through make contact $lfa7$ and a 240-ohm resistance to the wire C of the line finder. The line then ceases to be calling and no impulse will be sent from that moment onwards, from this line to the call detector, consequently the impulse regenerator ceases to operate and relay DT (Fig. 2) is released.

However, it may happen that another subscriber's line is transmitting a call at this moment and this line will continue to send its impulses to the call detector, and the regenerators will continue to operate.

In this case, in order to obtain the momentary release of relay DT so as to release the switch CCS, earth is applied from make contact $ccda8$, of the cord circuit (Fig. 10), through contact E of switch CCS and make contact $dt2$ (Fig. 2), to the cathode circuit of the left hand amplifier tube VAD1 of the call detector circuit.

Amplifier tube VAD1 then ceases to operate, so that the regenerator acting on the relay DT is also stopped and the relay DT releases.

The opening of contact $dt3$ causes the release of horizontal magnet CCSHM and the return of its horizontal bar to normal; contacts A ... E are opened and the connection between the call detector and the cord circuit is broken.

The earth applied to the cathode circuit of the amplifier tube VAD1 is disconnected by the contact $dt2$, from the moment when relay DT releases, but at the same moment contact $dt4$ has opened the energisation circuit of the relay DT, said circuit is only closed by the back contact DHB3, when the horizontal bar has returned to normal, so that the relay DT cannot be again energised for the next call until this has happened.

The maintenance of the connection is now entirely under the control of the relay Lb (Fig. 13) in the register circuit. Said relay is no longer energised by the call detector circuit, but is then maintained operated by means of contact $is1$, under the control of relay Is (Fig. 12) of the register circuit. The relay Is is energised in series with the loop of the calling subscriber's line, as soon as the relay Lt (Fig. 13) is energised and has closed its contact $lt3$ and $lt7$.

When relay Is has operated the tone indicating that the register is ready to receive dialling information is sent to the calling subscriber by means of transformer DTC, said tone being suppressed when the first dialling impulse is received, as is well known in the art.

The calling line is always free, and can send any one of the class-of-line indications which are mentioned on the table on the left of Fig. 8. If the class-of-line indication which is sent characterises an ordinary line, the register controller, as has previously been stated, will be set in the position to receive impulses from the group selector in reply to this information.

If the class-of-line indication received corresponds to time unit No. 12, and indicates a line with restricted service, relay Oa and Of are actuated. The earth applied through the make contacts $oa7$ and $of2$ cause the operation of relay Rs, which is held through make contact $rs1$ and make contact $lh12$. The operation of relay Rs causes in the well known manner a control operation on the number dialled by the calling subscriber and received in the register; said relay then causes the transmission of a busy tone to the calling line, or causes a signal to be sent to an operator, if the restricted service subscriber has made a call to which he is not entitled.

If an indication is received from the line of a subscriber who is absent for a long period, an impulse at time position 18 is transmitted from the line finder common control circuit and relays Oa and Og are actuated. The earth applied through the make contact $oa6$ and make contact $og7$ energises the relay Lp which is held through make contact $lp1$ and make contact $lh12$. The operation of Lp immediately gives a signal to an operator in the well known manner.

If a second line finder were employed, the register would be placed from the beginning in a position to control the second line finder in accordance with a time impulse, characterising the hundreds digit, and sent by the call detector circuit. The class-of-line indication coming from a second line finder would cause the operation of relays Oc and Oe, and in this case the operating circuit of relay F1 would depend on the make contacts of the relays Oc and Oe and not on the make contact of relay F, as has been described; the contact $f13$ applies the grid of tube Va2 to earth and prepares the control operations of the first line finder in the manner previously described.

The dialling impulses, characteristic of the wanted subscriber's number, are received and start in any well known manner.

When relay Lt (Fig. 13) is energised, an earth, connected by means of the make contact $lt5$ (Fig. 12), make contact $lh6$ and wire CAL, permits the energisation of relay CCDA of the cord circuit (Fig. 10). Relay CCDA makes it possible to connect the wires C and D of the register to the outgoing C and D wires by means of contacts $ccda3$ and $ccda2$.

The object of a group selector circuit is to effect the selection of a free outlet within a group chosen from several groups, under the control of a register, in accordance with the corresponding digit of the wanted subscriber's number.

This circuit is based on the use of a multiswitch which comprises a certain number of horizontal bars each of which may be regarded as representing a switch or an individual switch capable of handling a call in a manner similar to that of a switch of the well known single-motion type. By way of example, 100 outlets have been provided, common to all the individual switches and accessible to said switches. Vertical bars have also been provided which cross all the horizontal bars and control the selection of a particular outlet which has to be connected to an individual switch by the action of a horizontal bar associated therewith. The operation of the multi-switch will subsequently be described in a more detailed manner.

A multi-switch of this type is employed in the case of 100 outlets; a certain number of individual switches are provided, which varies with the traffic requirements, each of them being usable individually to establish a connection to a free outlet.

Each of the switches has an individual selector circuit comprising a "horizontal magnet" HM (Fig. 16), which forms part of the multi-switch, and a relay GA.

A common control circuit has been provided for all the individual group selectors of a multi-switch. This circuit, by employing electronic means and a certain number of periodic cycles of electrical impulses, and under the control of a register, can carry out hunting and/or selection operations in one of the individual selectors, and control the operation of a vertical bar and horizontal bar of the multi-switch in order to complete the connection employed by the call, when the outlet has been seized. The selection of a free outlet in a particular group is carried out under the control of the first digit of the wanted subscriber's number. A free final selector is chosen from ten different groups of selectors, for example, each of said selectors handling 100 lines. This selection is made under the control of the hundreds digit of the desired subscriber's number, as it has been stored in the register controlling the selection.

In accordance with another method, the selection can be made under the control of the register without direct relation to a particular digit, but as one of a variable number of selections determined by a combination of digits in accordance with a well known method.

The 100 outlets may be divided up in any conceivable way, into any number of groups, usually 10. This number is in no way limited.

The number of groups of outlets may be modified as desired, according to requirements; the number of outlets allocated to each group may be modified as desired according to the traffic requirements, and the outlets of each of the groups may be taken haphazard from one of the 100 available outlets.

The equipment and circuits of the common control switch are always the same, and are not dependent on the manner in which the outlets are divided up in the different groups.

In the group selector common control switch, arrangements have been provided, so that a class indication taken from several indications may be allocated to each of the outlets by means of a connection which can easily be displaced. The common control circuit is provided to transmit this indication to the register which is handling the call.

The earth applied through contact $ok5$ of the register (Fig. 12) causes the energisation of relay GA of the group selector through the following circuit: earth, back contact $ok5$, back contact $ct3$, make contact $lt4$, make contact $lh10$, in contact OB of the multi-switch RS, wire OB, and in the cord circuit (Fig. 10), make contact $ccda4$, wire B (Fig. 9) and, in the group selector (Fig. 16) wire B, back contact $hm2$, associated with a horizontal magnet HM, relay GA, battery.

The relay GA, in operating, immediately causes the connection of the group selector circuit to the corresponding common control circuit, by respectively connecting the wires A, C and D to said common control circuit through the front contacts $ga8$, $ga2$ and $ga6$.

Moreover, the relay GA prepares for itself a holding circuit through the wire E, in series with the winding of the horizontal electromagnet HM and the make contact $ga4$; the said electromagnet cannot operate at the moment under consideration owing to the fact that earth is directly connected to the two ends of this winding, the wire E being in fact directly earthed through contact $ccda5$ (Fig. 9).

The common control circuit is set in the operative position, earth being sent in said common control circuit through the following circuit; back contact HB1, associated with the horizontal bar, front contact $ga1$, back contact $gh1$, back contact $gc3$, relay GB, resistance and battery. The relay GB of the common control circuit operates, and through its contact $gb1$, applies earth to the anodes of the cold cathode tubes VRA, VRB, VRC, V$d$; through its contact $gb3$, it applies a potential of —150 v. to the cathode of the left hand portion SVA3 of the double triode SVA3/SVA4; it thus prepares the selection control circuit, through the group selector, of an outlet in the desired group.

A resistance R$g$ (Fig. 17) of 100,000 ohms has been provided in the common control circuit for each of the 100 outlets which can be reached through a group of selectors, this resistance being connected at one of its ends to the next selection stage through the wire F. If the outlet is free, the wire F is directly earthed through the back contact $fa3$, associated with the final selector (Fig. 19).

When the resistance R$g$ (Fig. 17) associated with an outlet is earthed, a current flow tends to be established from this earth towards a point of —40 v. potential, through three successive rectifier stages (Fig. 18), placed in series ARCS, BRCS, CRCS, and rectifiers placed in shunt ARCP . . . DRCP. The said potential of —40 v. is supplied by a potentiometer OPT placed in common control circuit; this potential is moreover applied through a high resistance DRH to the grid of an amplifier tube SVA3 which forms one of the elements of a double triode SVA3, SVA4. The rectifiers placed in shunt ARCP . . . DRCP are connected to sources of current which have already been described.

The current can only flow from earth on wire F to the potentiometer OPT and from that to the grid of tube SVA3, when this potential of —16 v. is present simultaneously on the three rectifiers ARCP, BRCP, CRCP . . . connected to the scanning circuit coming from the wire F of an outlet. When the potential of said sources or one of them, is —40 v., said potential is present in effect on the circuit which connects the resistance R$g$ of the common control circuit of the group selector to the potentiometer OPT, since said potential can be transmitted through one of the branch rectifiers, for example, ARCP, which then offers a low resistance, the difference of potential between the earth on wire F and the source connected to the branch rectifier (—40 v.) is absorbed in the resistance R$g$ and no current passes to the potentiometer. The branch rectifiers thus act as gates which can open or close the circuit to the potentiometer OPT; only when these devices are closed by the application of a potential of —16 v. by the associated sources, can current flow to the potentiometer. The result of this is that only when all the gates controlling the circuit connecting the resistance R$g$ of a particular outlet to the potentiometer OPT are closed, can current flow from earth to the potentiometer. It is thus only at this moment that the potential of the potentiometer and consequently of the grid of tube SVA3 will be brought to —16 v. by reason of the respective values of the various resistances inserted in the circuit, provided that the outlet is free and thus has an earth potential.

It will now be seen that the three sets of sources P$a$, P$b$ and P$c$ are connected to the gates in such a way that said systems pass the current in different time units for each of the 100 outlets; when a circuit is free it sends impulses to the grid circuit of the tube SVA3 for a time unit which characterises this outlet. The manner of connecting the various gates, which makes it possible to obtain this result for the various outlets numbers "00" to "99," is shown on the table in Fig. 22, which also shows the time units corresponding to the impulses transmitted by each of the outlets. It will be noted that this table refers to time units numbered in series from 1–120, arrangements being made so that the sixth unit of each group of six does not correspond to any transmission, 100 units out of 120 being employed for the 100 outlets. Each outlet of a group selector is connected in the common control circuit (Fig. 18) with an individual gate which itself is connected to one of the sources P$a1$ . . . 5. Each of the successive groups of five outlets corresponding to the time units 1 . . . 5, 7 . . . 11, and connected to the various sources P$a$, is associated with a second common stage of gates constituted by the rectifiers BRCS, BRCP. Thus in all there are $$\frac{100}{5}=20 \text{ gates}$$

in the second stage which are divided in turn into four groups of 5. The gates of each of these groups are respectively connected to the five sources P$b1$ . . . 5. The gates corresponding to one of these groups are connected to a third stage of gates CRCS—CRCP common to said group. Four gates CRCS and CRCP have thus been provided, each of which is connected to one of the sources P$c1$ . . . 4.

Each of the outlets connected to a gate associated with one of the sources P$a1$ . . . 5 is also connected to a second gate DRCP, which may be connected to one of the ten sources P$d1$ to P$d10$ by connections which can be displaced as desired.

This connection characterises the group to which the outlet belongs, a connection terminating in a source P$d1$ or P$d2$ indicating that the outlet belongs to group No. 1 or group No. 2.

It is obvious that the ground potential supplied by wire F will be absorbed in the resistance R$g$ and the potential of the lower terminal of this resistance will be maintained at —40 v. except when the source P$d$ connected to the particular gate to the circuit concerned supplies a potential of —16 v., the potential of the lower terminal of resistance R$g$ then being brought to this value of —16 v. In other words, the potential on the lower terminal of R$g$, for each of the outlets of group No. 1, may be brought to such a value that the grid of the amplifier tube is only influenced during the time unit when the source P$d1$ is sending an impulse, that is to say, during the time units 1–120. Similarly the outlets forming part of the second group can only influence the grid potential in the time units 121 . . . 240. etc.

The result of this is that for each outlet an impulse from the wire F can only be sent to the grid circuit in one of the 1200 time units, which characterises both the number of the outlet and the group to which said circuit belongs.

For example, the outlet No. 25, according to the table in Fig. 22, would send an impulse in time unit No. 31 under the control of sources $Pa1$, $Pb1$ and $Pc2$. When this outlet is connected for example, to group No. 5, source $Pd5$ at any moment will absorb the impulses transmitted by said circuit, except in the period corresponding to the fifth group of 120 time units, so that in these conditions an impulse is only sent in the 31st time unit of the fifth period, that is to say, in time unit No. 511 (that is, time unit No. 120×4+31).

The cathode circuit of amplifier tube $SVA3$ is normally connected to earth through a resistance $GRS1$; under these conditions, the grid is sufficiently negative with respect to the cathode for impulses transmitted to the grid circuit through the gates not to cause the operation of the tube. When the common control circuit is seized, the relay GB through its make contact $gb3$ applies a potential approximately equal to $-20$ v., owing to the fact that a circuit is completed from the cathode of the suppressor tube $SVA4$ to the cathode of $SVA3$, the tube $SVA4$ forming the right hand part of the double triode of which the amplifier tube $SVA3$ forms a part. The suppressor tube is so arranged that its cathode is normally at a potential of $-20$ v., its grid being normally maintained at $-21.5$ v. Consequently, when the contact $gb3$ is closed, the cathode of the amplifier tube $SVA3$ is brought to $-20$ v. Under these conditions, the respective potentials of the cathode and the grid are such that the impulses transmitted by the gates alone do not influence the tube, but only have the object of charging a small condenser $GC1$ which connects the grid to an impulse source $d2$. The characteristics of source $d2$ are also indicated on Fig. 21. When this source sends a short positive impulse at the moment when the condenser is already charged by an impulse from the gates, the potential of the grid is momentarily brought to such a value that current flows in the anode circuit. A short impulse is transmitted to the anode circuit of the two triodes $SVA1$, $SVA2$ forming another double triode, and acts in such a way on these triodes, through a transformer $TP$–$TS$ connected to said double triode, that said triodes generate an impulse which is transmitted from their cathode circuit to the associated selector.

The beginning of this impulse coincides with that of impulse $d2$, as may be seen in Fig. 21, this coincidence occurring towards the end of the time unit allocated to the impulse produced by a particular circuit. The length of the impulse regenerated in this way approximately corresponds to half the length of a time unit, so that it is still being transmitted during a part of the next time unit.

The short impulse is transmitted to the anode of the regenerator tubes and causes current to flow in the primary winding of the transformer $TP$–$TS$ connected to said anodes. This has the effect that the potential induced in the secondary $TS$ of the transformer, renders the potential of the grids of the regenerator tubes more positive. If the amplitude of the potential applied is sufficient to bring the potential of the grid to a suitable value, taking the bias into account, the generator is started. The anode current begins to flow through the winding $TP$ of the transformer, the grids then becoming more positive and thus causing a fresh increase of the anode current. The potential of the grid is very rapidly brought to a value higher than that of the cathodes; a strong grid current begins to flow, thus limiting any subsequent increase of the grid potential. At this moment, anode and grid currents begin to decrease, the latter decreasing more rapidly than the former, so that the difference between the ampere-turns of the anode and grid windings increases rapidly.

After a certain time, which depends to a great extent on the self-inductance of the windings of the transformer and of the anode resistance of the tubes, the grid current is cancelled. From now on any reduction in the anode current causes, by induction, the appearance of a negative potential in the grid winding, which in turn causes another reduction of the anode current. The tube is thus rapidly de-energised and remains idle until the arrival of a fresh trigger impulse.

In this way, the appearance of an impulse of nearly rectangular form is produced, the amplitude and duration of which depend neither on the amplitude nor the form of the trigger impulse.

It is clear that such an impulse is generated for each of the free circuits, and that all these impulses are transmitted to the register, through the group selector, through the following circuit: back contact $hm1$ (Fig. 16), make contact $ga6$, back contact $HB3$ and wire D.

The positive return impulses sent on the wire D are transmitted in the register through the following circuit: wire D in the cord circuit (Fig. 9), make contact $ccda2$, wire D (Fig. 10), and in the register (Fig. 12): wire D, contact D of multi-switch RS, back contact $ok4$ (Fig. 12), lead W2 to Fig. 14, and via Fig. 14 to Fig. 15 and grid of tube $Va1$ (Figs. 14 and 15). The grid of $Va1$ is normally very negative, owing to the fact that the resistance inserted between earth and the grid is 4 megohms, while the resistance inserted between the 48 v. battery and the grid is only 1 megohm. Similarly, the grid of the twin tube $Va2$ is normally negative, a negative battery being connected permanently to said grid through 500,000 ohms. The device which stores the first digit in the register connects one of the $Pd$ sources in any suitable manner (not shown) to the grid of the tube $Va2$, through back contact $so3$, back contact $fg3$, back contact $fs6$, back contact $or2$, and the make contact $ch2$. Each impulse received on the grid of $Va1$ renders the tube conductive, and the cathode, which is normally negative, becomes positive by reason of the high resistance of the cathode circuit with respect to that of the anode cathode path. Each time an impulse $Pd$ is applied to the grid of $Va2$, the tube becomes conductive and its cathode is brought to a positive potential.

Two other twin triodes $Va3$, $Va4$, have their cathodes mounted in the same manner as those of $Va1$, $Va2$ through rectifiers $Rc3$, $Rc4$; the said cathodes are connected in parallel with the common wire which terminates on the cathodes of $Va1$, $Va2$, and on the grid of tube $Vo2$ (Fig. 14).

An earth potential is applied normally to the tube $Va4$, through back contact $fs4$ so that said tube $Va4$ is normally conductive.

The grid of tube $Va3$ is connected to all the sources $Pa2$ . . . 6 through the back contact $ot4$, back contact $si5$, back contact $fs2$, and the rectifiers respectively connected to said sources. During each of the impulses supplied by one of the sources $Pa2$ . . . 6, current flows from the negative battery of the exchange to the point of potential $-16$ v. supplied by one of the sources $Pa2$ . . . 6 through the grid resistance of $Va3$ and the rectifier corresponding to the source concerned; the grid will be brought to the potential of $-16$ v. during all the periods of the impulses $Pa2$ . . . 6, the tube $Va3$ then being conductive. However, during the period of each of the impulses supplied by the source $Pa1$, a potential of $-40$ v. will be applied to the grid of $Va3$, and said tube will not be conductive. A negative potential thus prevails on the cathode of $Va3$ during the period of the impulses $Pa1$ and the impulse generator is therefore not actuated by the impulses coming from the common control circuit through the wire D, during the period of the impulses $Pa1$.

Impulses coming from source $d3$ are continuously applied to the grid of the tube $Vo2$, which forms part of a double triode $Vo1$, $Vo2$ adapted to produce impulses. When one or more of the cathodes $Va1$, $Va2$, $Va3$, $Va4$ are negative, each of the impulses $d3$ is absorbed by a 20,000 ohm resistance, by reason of the flow of current which is produced through said 20,000 ohm resistance, the rectifiers $Rc1$, $Rc2$, $Rc3$ or $Rc4$, and the negative cathode or cathodes of the tubes. When impulses are simultaneously applied to the grids of the tubes $Va1$, $Va2$, $Va3$, by the group selector, by the source $Pd$ corresponding to the registered digit, and by the sources $Pa2$ . . . 6, all the cathodes are simultaneously positive; the corresponding impulse $d3$ renders the grid of $Vo2$ positive, since there is no current flowing through the 20,000 ohm resistance and one of the rectifiers.

Consequently, the tube $Vo2$ causes the operation of tube $Vo1$. Tube $Vo1$ forms a part of an impulse regenerator which also comprises a transformer TP, TS, connecting the anode and grid circuits, a resistance RRS, and a varistor or thermistor TH in parallel on the grid bias and cathode circuits.

In the absence of a trigger impulse, the grid of the generator tube Vo1 is polarised at a value which does not permit the tube to operate, and no current flows either in the windings of transformer TP, TS, or in the tube. If a negative potential is suddenly applied to the anode of the tube, this potential changes sign after having been transmitted to the grid winding of the coupling transformer, said grid then becoming positive. If the amplitude of the potential applied is sufficient to bring the potential of the grid to a suitable value taking into consideration the grid bias, the generator is triggered off. The anode current begins to flow through the anode winding; the grid then becomes more positive and in turn produces an increase in the anode current. Almost immediately, the grid becomes more positive than the cathode; a considerable grid current begins to circulate, thus restricting any subsequent rise in the grid potential. At this moment, the anode current and the grid current begin to decrease, the latter decreasing more rapidly, so that the difference between the ampere-turns of the anode windings and grid windings rapidly increases.

After a time, which will depend to a great extent on the self-inductance of the windings of the transformer, and on the value of the resistance of the anode circuit of the tube, the grid current is cancelled. From this moment, any decrease of the anode current causes the appearance of a negative potential in the grid winding, which in turn causes another decrease of the anode current. The tube is then rapidly shut off, and remains inoperative until a fresh trigger impulse arrives.

A current impulse of substantially rectangular form is thus produced in the cathode circuit, of which the amplitude and duration are not dependent either on the amplitude or form of the trigger impulse.

The loading resistance RRS, placed in the cathode circuit of the generator, makes it possible to transform the current impulse into a voltage impulse, said voltage being maintained at substantially the same value for the whole duration of the impulse.

One impulse will be generated for each trigger impulse applied to the anode, after which the tube returns to normal. The voltage impulse produced on the terminals of the cathode load resistance of Vo1 is applied to the group selector through the rectifier Rcp and lead W15 to the wire C.

The impulse sent on the wire C also fires cold cathode tube Via (Fig. 14), of which the cathode is at the potential of —150 v.; the relay Si is energised through the following circuit: cathode and anode of Via, back contact ph5 relay Si, back contact ok6, make contact b1 earth. The tubes Voa . . . Voh, which are extinguished do not fire at the instant under consideration, on account of the action exerted by the gates on their control electrode.

The relay Ot is energised through the following circuit: back contact or1, back contact cs5, front contact si4. Owing to the closing of contact ot1, the test relay T (Fig. 12) is connected to the wire OA.

The impulse retransmitted by the register from tube Vo1 over wire W15 to the common control circuit is sent through the group selector by the following circuit: make contact lh3, contact C of multi-switch RS, wire C, and, in the cord circuit (Figs. 10 and 9), make contact ccda3; wire C, and in the group selector (Fig. 16) wire C, back contact HB2, make contact ga2. This impulse is received on a plurality of cold cathode tubes VRA1 . . . 6, VRB1 . . . 5, VRC1 . . . 4 (Fig. 17) placed in the common control circuit and arrives in the time unit following that in which the impulse from the wire F reaches the tube SVA3.

These 15 tubes are each controlled by a rectifier connected to one of the time-pulse sources, of which the impulse curve and the assignment have been shown in Fig. 21, said tubes only being ionizable at specific times. Thus the tube VRA1 is controlled by the source of impulses Ra1, the tube VRA2, by the source Ra2, and so on, so that a tube such as VRA1 can only be ionised in one of the time units in which the source Ra1 is transmitting an impulse, i. e. according to Fig. 21, in time units 1, 7, 13 etc.

Similarly, the tubes VRB1 . . . 5 are each connected to one of the sources Rb1 . . . 5, through a rectifier, so that a tube such as VRB1, for example, can only be ionised during one of the groups of time units in which the source Rb1 is transmitting an impulse, viz. in time units 1 . . . 6, 31 . . . 36, 61 . . . 66, etc.

The tubes VRC1 . . . 4 are also controlled by sources Rc1 . . . 4, of which the respective transmission time units may be found in Fig. 21.

Finally, there is a further last tube Vd which is not controlled by rectifiers and thus can be ionised when it receives an impulse arriving from the register through the wire C in any time unit.

It is clear from the above that an impulse arriving in any time unit will always ionise one tube of each of the three groups VRA, VRB, VRC, in the same way as that of the tube Vd, so that a combination of tubes from each group is characteristic of each of the time units.

In the case, for example, of an impulse from outlet No. 25 in group No. 5, an impulse is produced in time unit No. 511 (i. e. in time unit 120×4+31) as has already been indicated, and is received on the cold cathode tubes of the common control circuit in the time unit No. 512.

This impulse is received at the moment when only the sources Ra2, Rb1 and Rc2 are transmitting an impulse; the tubes VRA2, VRB1 and VRC2 are ionised, and operate relays Ab, Ba and Cb inserted in the anode circuits.

Similarly, an impulse sent in time unit No. 89, which characterises the outlet No. 74 connected to group No. 1, is received on the cold cathode tubes in time unit No. 90, during which the sources Ra6, Rb5 and Rc3 are transmitting an impulse; the tubes VRA6, VRB5 and VRC3 are ionised and produce the operation of the anode relays Af, Be and Cc.

The make contacts of the three anode relays which are energised close circuits which characterise the outlet to which the group selector engaged for the call has to be connected.

It will be seen that the 50 time units taken in each of the two series of 60 (1 to 60 and 61 to 120) in a cycle of 120 time positions, are allocated to each of the two groups of 50 outlets of the switch. Each of the two groups of 60 time units comprises 6×5×2 combinations of the Pa×Pb×Pc sources. If we refer to the common control circuit, it will be seen that the relays Ca . . . Cd correspond to the four time positions of the cycle Pc, Ca, Cb and Cc, Cd characterising respectively the two groups of 50 outlets, 00 to 49 and 50 to 99, Ca, Cc and Cb, Cd each respectively characterising the two groups of 25 series of contacts, 00 to 24, 50 to 74 and 25 to 49, 75 to 99 which are controlled by vertical electro-magnets 1 to 25 and 26 to 50. The first group of outlets 00 . . . 49 is connected by a selective operation by one of the horizontal servo-magnets SHMA; the second group of outlets 50–99 is connected by a selective operation by the other horizontal servo-magnet SHMB. The relays GD and GE are respectively actuated, when the relays Ca, Cb and Cc, Cd have operated, to control the operation of the switch. The table in Fig. 22 shows the numbers of the impulse sources Pa, Pb, Pc corresponding to the outlets. As has been indicated, the sources Ra, Rb, Rc are used in such a way with respect to the sources Pa, Pb and Pc, that the outlet marked by the number 25 on the said table, which is characterised by the impulse sources Pa1, Pb1 and Pc2, will correspond to the sources Ra2, Rb1 and Rc2, so that the register tubes VRA2, VRB1, VRC2, as also the corresponding relays Ab, Ba and Cb, will operate for the outlet 25.

In the first place, the circuit of one of the 50 vertical magnets VM of the multi-switch is completed; for the outlet No. 25, for example, this circuit is as follows; make contacts cb1, ab6, ba2 of the relays actuated by the tubes VRA2, VRB1 and VRC2, vertical magnet No. 26; for the outlet number 74, for example, this circuit is as follows: make contacts cc1, be1, af5 of the relays respectively operated by the tubes VRA6, VRB5 and VRC3, vertical magnet No. 25.

Secondly, one of the relays GD or GE is energised, owing to the energisation of one of the relays Ca . . . Cd in series with one of the tubes VRC1 . . . 4. Thus, the relay GD is energised under the control of one of the relays Ca or Cb through the contacts ca2 or cb2; the relay GE is energised under the control of one of the relays Cc or Cd through the contacts cc2 or cd2. The vertical magnet which has operated completes the following holding circuit for itself: make contact vm1, associated with said magnet, make contact gd5 or ge5, relay GH, earth. Relay GH, however, does not operate at this time because it has earth on each terminal. At the same time, the vertical magnet VM, which has been energised, actuates the vertical bar associated with it upwards; the vertical bar No. 26 is actuated in the case of a call intended for outlet No. 25; the vertical bar No. 25 is actuated in the case of a call intended for outlet No. 74. These two bars respectively control the contacts connected to the outlets 25 and 75 and to the outlets 24 and 74 of the group selector.

Each of the vertical bars closes two pairs of contacts, i. e. the contacts VB1 and VB3 (Fig. 17) associated with that one of the two outlets which it controls (in the group 00–49), and two other contacts Vb2 and VB4 associated with the second circuit. Contacts VB3 and VB4 are shown in Fig. 18.

One of the contacts closed in each pair is connected in series with the test circuit in which the winding of relay GC is included, so that this circuit is prepared by the closing of contact gd3 of relay GD through one of the contacts associated with the group of outlets 00 . . . 49; the closing of contact ge3 of relay GE prepares a test circuit through one of the contacts in the group 50–99. The result of this is, that the selected outlet can be tested, through two possible circuits, to the corresponding contact of the selected circuit only. Thus, in the case of a call to outlet No. 25, the test circuit passes through gd3 and the contact VB1, corresponding to outlet No. 25; in the case of a call to outlet No. 74, this circuit passes through ge3 and the contact VB2, corresponding to outlet No. 74.

Similarly, circuits are completed through contacts gd4 and ge4, to the contacts of each pair associated with the vertical bars, so that a second circuit peculiar to the selected circuit can be completed; the purpose of said circuit will be indicated further on.

As has been indicated, the register has caused the connection of this relay T to the wire OA (Fig. 12). The relay T is then energised through the following circuit; make contact ot1, make contact lt2, make contact lh9, contact OA of the multiswitch RS, wire OA, and, in the cord circuit (Fig. 10), make contact ccda1, wire A (Figs. 9 and 16), back contact HB4, in the group selector, make contact ga8, via lead W23 to Fig. 17, relay GC in the common control switch, which is energised, make contact gd3 or ge3, one of the make contacts associated with the vertical bars VB1, VB2, wire E of the selected circuit and battery. The closing of contact t1, completes the double test circuit through the relays Dt and T in accordance with a well known method, and provided that the outlet concerned has only been selected by the call in question, the relay Dt will also operate. The contacts ot6 and dt3 are now both open which causes the release of all the class-of-outlet relay Oa . . . Oh which are in operation. Contact dt4 is closed and causes the operation of relay Cs. The closing of contacts os2 energises relay Or, provided that all the class-of-outlet relays have released their armatures on account of the opening of contact ot6, dt3. Contact or1 is opened and causes the release of relay Ot which opens its make contacts; back contact ot6 again applies earth to the relays and tubes Oa . . . Oh, Voa . . . Voh which characterise the outlets. The operation of relay GC in the common control circuit causes the closing of a holding circuit for that one of the relays GD or GE which is operative, so that this relay, like the actuated magnet VM controlled by GD or GE, is no longer dependent upon the position of the anode relays Ca . . . Cd.

As has been stated, the return impulse from the register through the wire C causes the operation of the tube Vd. The relay GF (Fig. 17) is energised in series with the tube Vd; this relay short circuits the winding of relay GB which begins to fall back slowly. Before the relay GB is able to release fully, relay GC can operate; the contact gc3 opens the circuit of relay GB, which falls back immediately. Relay GB, in releasing, opens the contact gb1, which in turn opens the anode circuit of all the cold cathode tubes; those tubes which have been ionised are extinguished, thus causing the release of the corresponding anode relays. The opening of contact gb3 does not put the tube SVA3 out of action, since the contact gc4 is closed.

The release of the anode relays causes the operation of relay GH1 which opens the energizing circuit of relay GB.

After having determined the identity of the selected outlet, first of all a check must be made to determine the class of this outlet. For this purpose, the second contact VB3 or VB4 (Fig. 18) associated with each of the outlets accessible through the make contacts associated with the vertical bars is connected by jumpering to one of the 20 class-of-line wires COL, according to the class to which the outlet belongs.

These 20 wires COL are each connected through a high resistance COR, to three successive stages of gates, controlled by impulse sources, in such a way that the application of earth to one of these wires produces an impulse in a time unit which characterises the circuit corresponding to this wire, this impulse being transmitted to the grid circuit of the amplifier tube SVA3. The time unit in which this impulse is transmitted is indicated in the table of Fig. 18 for each of the 20 wires. It will be seen that all these time units, or time positions, correspond to the last position of each of the 20 successive groups of six time units Pa, in a group of 120 time units defined by the sources Pa, Pb and Pc. The first stage of gates controlling 20 class-of-outlet wires COL is connected in every case to the source Pa6. These time units are thus the 20 time units which are not associated with outlets 00 . . . 99, according to the table in Fig. 22. The second and third stages of gates are controlled by the sources Pb and Pc, and are the same as those controlling the scanning of the 100 test wires.

When relay GC has operated, the source Pa6 is also connected, through a make contact gc1 and a rectifier, to the potentiometer OPT connected to the grid circuit of the amplifier tube SVA3; under these conditions, impulses are eliminated which might arrive in other time units than those corresponding to the 20 classes of outlets.

According to the class of outlet, an earth will be applied, through the contact associated with the vertical bar corresponding to the selected circuit, to one of the 20 class-of-outlet wires; impulses are sent in the corresponding time units to the amplifier tube SVA3, which is maintained in working condition owing to the fact that the battery is maintained on the cathode through the make contact gc4, before the contact gb3 has been able to open, so that it may operate under the effect of the impulses received. These impulses are sent once in a cycle of 120 time units; this tube is triggered once during said cycle, on account of the detector impulse supplied by the source d2, which is connected to the grid of the tube SVA3 through a small condenser GC1. This happens at the exact moment when the impulse is sent by the source d2, which, as may be seen in Fig. 21, transmits exactly at the end of the time unit in which an impulse arrives from the wire COL.

This impulse is then regenerated in accordance with the method previously described for the selective impulses.

The regenerated impulse is then transmitted via Fig. 16 to the register through the wire "D." In the register, the operation of contact or2 (Fig. 15) has disconnected the grid of Va2 from the sources Pd, in order to connect it to earth through a 50,000 ohm resistance, during the checking of the release of the class relays Oa . . . Oh. This renders the cathode of tube Va2 positive, so that from this moment onwards the rectifier Rc2 is nonconductive, and unable to absorb the impulses from the source d3 which is connected to the grid circuit of the tube Vo2 (Fig. 14). At the same moment, the tube Va3, due to the release of relay Ot, is connected to the impulse source Pa1 through back contact ot4 and make contact si3. The sources Pa2 . . . 6 are isolated on account of the opening of contact si5.

We will now explain the operation of tube Va3. It will be seen that, during the selection period, the grid of this tube is connected to the impulse sources Pa2 . . . Pa6, through the back contact ot4, the back contact si5 and back contact fs2, each of the sources being connected through a rectifier in order to avoid any interference between said sources. The result of this is, that while these impulse sources are positive, the grid of Va3 is also positive; this tube, in becoming conductive, causes the application of a positive potential to its cathode; owing to this, the rectifier Rc3, which is connected between the cathode of said tube and the 20,000 ohms resistance connected to the source d3, is no longer conductive. Consequently, during the time units in which a selected impulse may arrive, the impulses from the source d3 cannot be absorbed by the rectifier Rc3, the tube Va3 and the rectifier Rc3 having no influence on the selective operations as described above. However, during the period corresponding to the emission of a positive potential by the isolated source Pa1, the grid of tube Va3 becomes negative; its cathode is brought to a negative potential and the rectifier Rc2 becomes conductive. The result of this is that the impulses which may arrive on the wire D during selection, in the period corresponding to the emission of a positive potential by source Pa1, may not be effective, because the impulses d3 arriving in the same time unit would be absorbed. The object of this arrangement is to prevent the register from responding inopportunely to the impulses arriving in the period corresponding to the impulses of the source Pa1, during the selection period. These impulses are employed to give a register information as to the class of circuit selected, and a register must only respond to impulses in one of the time units corresponding to the transmissions Pa1 when it is in a condition permitting it to receive this information.

We will now assume that the register is in a position permitting it to receive information as to the class of outlet. The grid of the tube Va3 is connected to the source Pa1 only, as has been indicated above, the rectifier Rc2 then absorbing all the impulses from the source d3 corresponding to the transmission of positive impulses by the sources Pa2 ... Pa6. It will not absorb the impulses corresponding to the periods of transmission of a positive potential by the source Pa1. Consequently, the register may respond now to impulses arriving in one of the time units exclusively corresponding to the impulses of the source Pa1 and will not be influenced by any impulse which might arrive in any other time unit. The grid of tube Va4 is still connected to earth and the corresponding rectifier is not conductive.

When the impulse of the class chosen for the outlet is applied to the wire D, during a transmission period corresponding to the source Pa1, the tubes Va1 and Va3 are simultaneously conductive and an impulse is sent to the tube Vo2. The impulse generator constituted by the tube Vo1 produces a regenerated impulse which begins at the moment when the source d3 is positive, and which is transmitted to the wire C via lead 15. This impulse has no effect on the common control circuit since its contact gb1 is open, but it is applied to the tubes Voa ... Voh (Fig. 14) of the register. According to its time position the impulse will coincide with the impulses Rb, Rc and Ra1 applied through rectifiers to the resistances associated with the control electrodes of a particular pair of tubes Voa ... Voh; in the case of a normal circuit to a second group selector, it is the tube Voa, Voe which operate, and control the energisation of relays Oa, Oe. In the case of an outlet to a final selector, it is the tubes Voa, Voh and relays Oa, Oh which operate.

The relay Ok (Fig. 13) is energised through the following circuit: back contact ot5, back contact bu3, make contact dt2, back contact ph6, make contact oh4, make contact oa1, earth.

The operation of relays Oa and Oh causes in oa3 and oh3 the release of the relay Or, and the relay Si (Fig. 14) falls back on account of the opening of contact ok6. Earth is eliminated on the wire OB on account of the opening of contact ok5 (Fig. 12), so that the relay GA of the selector can be held through the magnet HM, contact ga4 and earth on the incoming wire E, by the contact ccda5 (Fig. 9).

As soon as the magnet HM has operated, it opens its back contact hm2, thus eliminating the earth on the wire B of the selector. Relay Ch has remained momentarily operated, after the removal of earth on the wire B at ok5 (Fig. 12), through the earth from the selector via the following circuit: wire E, in the cord circuit through ga4 (Fig.16), magnet HM of the selector and contact hm2, wire B; but it now falls back, thus giving complete control of the operation of the selector magnet HM.

The earth applied through make contact dt4 (Fig. 12), make contact cs1, back contact ch1, make contact ok4 in the register and the wire D, now causes the operation of the horizontal servo-magnet SHMA or SHMB in the common control circuit of the selector, said magnet having been connected to the wire D as a result of the operation of one of the relays GD or GE (Fig. 18).

In the example of a call to the outlet No. 25, the relay GD is energised; magnet SHMA (Fig. 17) then pulls up. In the case of a call to outlet No. 74, relay GE is energised, magnet SHMB then pulls up. The result of this is that magnet SHMA, if pulled up, actuates to the left the horizontal bar of the individual selector by which horizontal magnet HM had previously been energised, as has been indicated in the patent application Serial No. 146,211, filed February 25, 1950; on the other hand, if the magnet SHMB is pulled up, it actuates this bar to the right, so that, in the first example, the group selector is connected to outlet No. 25 and, in the second example, it is connected to outlet No. 74.

In the group selector, the contacts HB1 ... 4 associated with the horizontal bar, completely isolate the individual circuit of said selector from the corresponding common control circuit and the test relays T, Dt of the register return to normal. The relay Dt causes the release of relay Cs at dt4 and the relay Ok falls back owing to the opening of the contacts dt2 and cs3. The wire B is again earthed through back contact ok5 in order to energise relay FA in the selector circuit which has been seized, as will be explained later.

When the five contacts A ... E connected to the desired circuit have been closed, the back contacts HB1, HB2, HB3 and HB4 are opened on account of the movement of the horizontal bars.

This puts the group selector in the desired condition for talking and disconnects it at the same time from the corresponding common control circuit.

The contact E of the switch is closed before the back contact HB4 associated with the horizontal bar is open. This connects ground on the wire E of the outlet through the make contact ga7 before the test circuit is opened, which holds the outlet busy by short-circuiting the test potential applied to the wire E of the outlet. This short-circuit may also cause the release of relay GC of the common control circuit and the test relays of the register, before the opening of contact HB4. The release of the test relays of the register connected to the wire A causes the register to suppress the earth which had been applied to the wire D to operate electromagnets SHMA or SHMB. It will be noted that the magnet SHMA or SHMB, as the case may be, has closed a holding circuit for itself through earth, make contact shma1 or shmb1 associated with the magnet SHMA or SHMB, make contact gd2 or ge2 according to whether relay GD or GE has been energized. Owing to this fact, the horizontal servo-magnet does not release immediately when the back contact HB3 is opened in the group selector. However, as has previously been indicated, the relay GC is released in the common control circuit which causes relay GD or GE to fall back. The vertical magnet VM is released in turn, on account of the release of said relays GD or GE, which causes the return to normal of the vertical bar which has been energised; the horizontal servo-magnet SHMA or SHMB also releases on account of the relays GD or GE. The relay GB of the common control circuit is now connected to the individual selector circuit through the back contacts gc3 and gh1; the common control circuit is completely released and ready to route a fresh call.

It will be noted that the release of the horizontal servo-magnet does not cause the return to normal of the horizontal bars of the selector, as these are held in the operative position by the horizontal magnet HM individual to the group selector.

In the embodiment previously described, the case has been considered in which the selector comprised 100 outlets, 10 time units being allocated to each of the 10 outlets. To each of these 10 time units a potential impulse has been made to correspond, in order to characterise the group to which an outlet belongs. Three other potential impulses of different lengths characterise one outlet, and their coincidence supplies means for identifying this particular outlet. If we consider the 100 outlets, the coincidences of the impulses respectively allocated to them will appear successively in a cycle of 1000 time units. Provision has been made for the impulse coincidences successively to actuate devices, which are normally gates, in the circuit connecting the selector with the register controller, so that a test circuit placed in said register can successively scan the electrical condition of all the outlets. The register controller hunts for an outlet belonging to a particular group. When the impulse marking the desired group has been received in the register, the identity of the chosen outlet, characterised by its time unit, is immediately signalled to the selector, and stored by a tube device placed in said selector. The outlet is then marked busy. As also indicated in the preceding description the group marking impulses are obtained from sources $Pd1 \ldots Pd10$. The three other impulses characterising the number of the outlet on the banks of the multiswitch come from the sources $Pa1 \ldots 5$, $Pb1 \ldots 5$, $Pc1 \ldots 4$. The coincidence of a particular combination of the impulses $Pa$, $Pb$, $Pc$ actuates a device which is normally a gate placed between a particular outlet and the register controller, the outlet thus being identified.

Of course, the 100 outlets may be grouped in any desired manner. The 100 outlets may all be marked by impulses having a common time characteristic, so that they all belong to the same group; thus, they may all correspond to the same group of 100 time units characterised by the source $Pd1$, or any one of the other sources $Pd1 \ldots 10$. In accordance with another method, two outlets may be allocated to the first group, three outlets may be allocated to the second group, the remaining outlets may be allocated to the third group; in this case the impulses characterising the two first outlets are sent during the first 100 time units of the cycle of 1000 time units, the impulses characterising the three next outlets are sent through the second period of 100 time units, the impulses characterising the 95 other outlets being sent during the third period of 100 time units. If in all there are 1000 time units and 100 outlets, it is possible to provide up to 10 groups of outlets, but the selection of a group to which an outlet belongs is not limited in any other way. There may be any number of groups comprised between 1 and 10 and the number of outlets per group may vary to a great extent. It is thus possible to obtain a high degree of flexibility as the outlets may be grouped or allocated to a particular number according to very varied arrangements. Thus, although it is necessary to have 1000 time units per 100 outlets, instead of 100 time units, in accordance with simpler methods of marking, the arrangement under consideration thus does not constitute a step backwards, but on the contrary, provides unexpected advantages from the standpoint of flexibility and renders it more easy to identify the outlets.

The fact has already been briefly emphasised that the distribution of 100 outlets into 10 groups has only been indicated as an example. It is not necessary to number the outlets on a decimal basis, and generally speaking, $n$ outlets may be considered individually or distributed in groups in any suitable manner.

In the example under consideration, 10 groups of 10 outlets have been provided, but one could equally well provide five groups of 20 outlets or four groups of 25 outlets. It is possible to choose a particular method of dividing the $n$ circuits in groups, for example, because it ensures better utilisation of the existing equipment. $m$ Test factors have been assigned to each of the $n$ outlets, whatever the method of distribution of the outlets; as has been indicated, said test factors are made up of cycles each comprising 10 time units, a source of potential impulse, such as $Pd1$, corresponding to each of said units. If we apply to a certain number of outlets one of the $m$ test factors, respectively allocated to them, we thus form a definite group of outlets among the assembly of $n$ outlets of the selector. If we refer to the second example mentioned, in which three groups of outlets respectively comprise 2, 3 and 95 outlets, it will be seen that this result can be obtained by using $m=3$ test factors $Pd1$, $Pd2$, $Pd3$ and by applying $Pd1$ to the two circuits of the first group, $Pd2$ to the three circuits of the second group, and $Pd3$ to the 95 circuits of the third group. However, as has been previously indicated it is possible to obtain up to 10 groups with $m=10$ and generally speaking there may be any number of groups between 1 and $m$.

If we compart the circuit of the selector and that of the register controller, as they have been described for a particular application, with the general case relating to $n$ outlets each having $m$ test factors, it is clear that 100 outlets and 10 test factors require 1000 time units, so that generally speaking there must be a cycle comprising $m \times n$ time units. For each of said time units, a circuit is established between the outlet of the selector and the test device of the register controller. It is possible to obtain $m$ groups of outlets in the general case, while in the example described only 10 can be obtained. In order to enable the register controller to select an outlet belonging to a particular group, its test device comprises an impulse source such as $Pd1$, which sends impulses in time units which characterise the corresponding group. When a circuit is established between a selector and the test device, the outlet sends an impulse of the same phase and the test device operates. Said device is only influenced by an impulse of this kind, the impulses from the outlets belonging to other groups remaining ineffective.

It will be noted that there are $m$ groups of $n$ time units for $m$ possible groups of outlets. Each assembly comprises one time unit individual to each outlet and the $m$ time units allocated to an outlet are so arranged that there is one of these time units in a group of $n$ positions. The time units of each group must be characterised by a common test factor, two sets of time units never having the same test factor. Thus, in the example shown, the common test factors of the groups of 100 time units appear respectively in different groups each comprising 120 time units in a total cycle of 1200 time units. Each outlet corresponds to 10 time units which are individually allocated to it, one in each of the 10 successive sets of 120 time units of the cycle and each outlet may be associated with one of the 10 time units individually allocated to it for the purpose of grouping.

It will be noted that the complete cycle comprises 1200 time units and that in each group of 120 time units there are 20 available, since only 100 are used for identification purposes. These additional time units are employed to transmit additional indications relating to the 100 outlets, said indications meeting the normal requirements of telephone exchanges. Arrangements have thus been provided so that, at the time of sending these additional signals, the difference existing between 10 consecutive groups of 120 time units, which makes it possible to obtain a cycle of 1200 time units, is not utilised because the system does not require it, and the cycle of 120 time units is employed. Of course, if a larger number of additional signals were desired, the $Pa6$ sources might be used in conjunction with more than one of the $Pd$ sources. Since one $Pd$ source used with the $Pa6$ sources gives 20 additional time units, the use of $Pd$ sources 1 to 10 would given 200 additional time units.

In the case of a telephone exchange, only 20 additional signals are used, said signals being used to indicate the classes of outlets, such, for example, as a line connecting two group selectors, line connecting a group selector to the final selector. It will be seen that any additional signal must be able to be associated with several outlets, so that said signals may be employed in common for all the outlets and that one or more outlets may be associated with any additional signal.

Arrangements have been provided so that two separate test operations are made successively by the register controller, the first among the time units special to the outlets, in order to select a free circuit in the desired group, and the second among the additional time units allocated in common to the outlets.

It would be possible to have a common source of 1200 successive electrical impulses situated in time, but it is preferable to employ several cycles of impulses of different duration, but having a predetermined relation between them, so as to produce locally the required test characteristics for each of the particular operations.

1200 test characteristics must be produced in the selector circuit itself, starting from a continuous electrical condition, one for each outlet or class of outlet. In order to do this, an electronic system is provided comprising an assembly of gates which produce cycles of 1200 or 120 time units as desired, in which 100, or up to 20 time units, as the case may be, can be used for continuously applying electrical marking conditions to the test wires of the outlets or classes of outlets. It would be possible to ensure this operation by employing a stage comprising respectively 1200 or 120 gates, but this method is expensive. It is more economical to provide several stages of gates. The stages of gates are not necessarily arranged on a decimal basis, even in decimal selecting systems; thus in the case of 100 electrical conditions, it is possible to employ three stages respectively comprising 5, 5, 4 gates instead of 2 stages each comprising 10 gates. In fact, experience has shown that it is possible to save material by varying the arrangements of the gate stages.

In the example described, three or four different impulse cycles situated in time have been used in combination to obtain cycles of 120 or 1200 time units.

Whatever the number of time units per cycle in the cycles employed, the relation between the said cycles is always based on the principle of Fig. 21; in other words, a first cycle is provided comprising impulses of which the duration is taken as a time unit, a second cycle comprising impulses each having a duration equal to that of the first cycle, a third cycle comprising impulses, each having a duration equal to that of a second complete cycle and so on. In the example shown, there is no interval between the successive time units of any complete cycle. However, in the case in which intervals have been arranged, the duration of an impulse of the second cycle added to the corresponding interval would be equal to the duration of the first complete cycle. In the example shown, the cycles Pa, Pb, Pc, Pd respectively comprise 6, 5, 4 and 10 impulses situated in time. There are thus 6 different series of impulses Pa, each comprising one impulse per cycle, said impulse being differently situated in time for each of the series. There are five different series of impulses Pb.

Each of these different cycles of impulses Pa appears once during the transmission of the different impulses Pb, 5 times during the transmission of the different impulses Pc, 20 times during the transmission of the different impulses Pd, 200 times in the whole of the 10 cycles of impulses Pd. Consequently, all the cycles of six impulses Pa give 200×6=1200 impulses differently situated in time in a complete cycle Pd, or 20×6 impulses differently situated in time in a complete cycle Pc. Cycles of five individual impulses Pa in a complete cycle Pd are employed to characterise the time units of the outlets, which gives 5×200=1000 individual time units out of a cycle of 1200 time units. A series of individual impulses Pa in a complete cycle Pc is provided to characterise classes of outlets, which gives 1×20=20 time units in a cycle of 120 time units. The various impulse cycles are employed to control several stages of gates arranged in the form of an inverted tree between the test wires of the outlets or classes of outlets and a common testing device, which in the example described, is a return signalling circuit going to the register. The successive gate stages are controlled by sources Pd, Pa, Pb, Pc as shown in Fig. 18, each stage being controlled by sources of the same period.

With regard to the individual test characteristics indicating whether the line is free or busy, the presence of a test characteristic is used to indicate that the corresponding outlet is free, while its absence indicates that said outlet is busy. It is obvious that these two indications can be reversed.

It will be seen that the application of individual characteristics common to the common test device is made by static electrical devices comprising gates. No moving portion has been provided in the devices successively effecting the testing operations in the selector circuit.

It may happen that the first digit has to be used for two successive stages of group selectors. In this case, the class-of-line signal operates the relays Oa and Og (Fig. 14). At the end of the dialling, a relay (not shown) operates in the well known manner in the register, and causes the closing of contact de inserted in the circuit of relay Fg; said relay Fg is then energised through the following circuit: make contact de, back contact so2, make contact ok2. The relay OM (not shown) is energized when the double test operation on a group selector is completed, and the relays T, Dt have become operative. The contact fg3 disconnects the marking sources Pd1 . . . 10 of the thousands digit and prepares the connection of the marking sources Pd1 . . . 10 for the hundreds digit. In the case under consideration, in which the selection by the thousands digit is repeated on the next selector the marking circuit for selection by the hundreds digit is, however, not completed, this only being the case when the relays Oa and Oe have operated, that is to say, when a second normal group selector has been seized. When a group selector, on which selection by the thousands digit has to be repeated, is seized, the class-of-outlet indication given from said group selector causes the operation of relays Oa and Og; consequently, the marking circuit is again completed in accordance with the thousands digit dialled, through the make contacts oa4 and og5.

In the case in which the relays Oa and Oe have operated, the marking circuit for the thousands digit will not have been completed, and the marking circuit by the hundreds digit would have been closed through the make contacts fg3, oa2 and oe2.

When the outlet selected by a group selector is a final selector, the class-of-line signal causes the operation of relays Oa and Oh and relay Fs pulls up through the make contact fg2, back contact fo1, make contact oh4 and make contact oa7. By actuating its contact fs6, the relay Fs disconnects the marking conductor associated with the grid of tube Va2, of the marking circuits of the thousands and of the hundreds and connects it through the back contact ph3 to one of the sources Pc selected by the tens digit by means of distribution blocks; in the same time unit, the contact fs4 disconnects the grid of tube Va4 from ground in order to connect it through back contact ph1 and back contact or3 to one of the sources Pb selected by the tens and units digit by means of distribution block arrangements.

The grid of tube Va3 is connected through back contact ot4, back contact si5, make contact fs2, back contact ph6, to one of the sources Pa2 . . . 6, which has also been selected by the units digit by means of well known arrangements composed of distribution blocks.

The register is now in a position to control the selection of a line desired by final selector circuits as will be described. It will be noted that the class-of-line relays which were energised return to normal through the selection of the desired line; the opening of contacts oa7, oh4 then makes it possible for relay Fs to complete a holding circuit for itself through the make contact fg2, make contact fs1 and relay FO which is energised.

The object of a final selector circuit is to select a subscriber's line under the control of a register, in accordance with the tens and units digit of said subscriber's number.

The circuit is based on the use of a multiswitch, which comprises a certain number of horizontal bars, each of which can be regarded as representing an individual switch capable of handling a call like a switch of the well known single-motion type. 100 outlets have been provided, which may be reached through all the individual switches. Vertical bars cross all the horizontal bars and control the selection of a particular outlet which has to be connected by an individual switch by means of the horizontal bar. A multiswitch of this type is employed to serve 100 subscribers' lines and comprises a certain number of individual final selectors.

Each individual final selector circuit comprises a so-called "horizontal magnet" which forms part of the multi switch and a relay FA.

The common control switch, shown in Figs. 7 and 8, has also been provided in common for all the individual final selectors serving a group of 100 lines. This circuit also controls the operation of a vertical bar and of a horizontal bar of the final selector multiswitch to complete a connection for a single call at a time, under the control of the register which controls the selection operations by the final selector and after the seizure of the desired outlet. The operation of the final selector circuit will be described at the same time as that of the common control switch.

The selections by the tens and units digits are not carried out separately; one selection operation is carried out at a time under the control of the tens and units digits of a wanted subscriber's number, transmitted and stored in the register in order to select a particular line from the 100 lines which may be reached through a multiswitch.

The selective operations cannot therefore begin as long as the wanted subscriber's number has not been completely dialled.

Arrangements have been provided in the common control circuit of the final selector so that a class indication chosen from several such indications may be allocated to each line by means of jumpering. The common control circuit is arranged to transmit this condition to the register which is handling the call, in such a way that the latter can, if necessary, modify or prevent the operations relating to the establishment of the communication, according to the class of line.

Two different methods have been provided for handling the calls to groups (P. B. X), these two methods of procedure may be used separately or in accordance with any suitable combination.

The method of handling calls to groups (P. B. X) will now be explained. Firstly, each group of 100 lines may comprise any number of small groups (P. B. X), each of the lines of said groups having consecutive numbers, preferably in the same decade, that is to say, having the same tens digit.

The common calling number of such groups is that of the line having the lowest number. The other lines of the group may be called individually by their own number. If busy, the selection of any line of a group except the last, causes the hunting among the remaining lines of the group.

This is interesting when a large number of small groups (P. B. X) is employed only comprising two or three city lines and equally distributed over all the groups of 100 lines to equalise the traffic.

Secondly, a limited number of groups (P. B. X) can be formed in each of the groups of 100 lines by combining any assembly of lines in one group. Thus, for example, it is possible to form an assembly of six groups (P. B. X) of this type, with the arrangements indicated in the common control circuit. The common calling number of the group which causes hunting in the other lines of the group when busy, may be that of any one of the group; in other words, this common calling number is not necessarily the lowest or the highest number of the lines of the group. The other lines of the group may be called individually by their number, but do not cause any hunting if they are busy.

This possibility is interesting when a single line has to be transformed into a group (P. B. X) or when the number of lines in a group of the type previously mentioned has to be increased, in the particular case in which no lines are available, making it possible to form or to increase a group of consecutive lines, but in which it is possible to employ other lines in the group of 100 lines, and when at the same time it is desired to reach such lines by a hunting operation without changing the call number of the existing line or group.

When the final selector has been seized by the group selector, the relay FA (Fig. 16) of said final selector is energised through the following circuit: earth, back contact $ok5$ in the register (Fig. 12), back contact $ct3$, make contact $lt4$, make contact $lh10$, contact OB of multiswitch RS, wire OB, and, in the cord circuit (Figs 10 and 9), make contact $ccda4$, wire B through the group selector circuit (Fig. 16), and, in the final selector (Fig. 19) back contact $hm2$ associated with the horizontal magnet HM, relay FA, battery; the earth of contact $ok5$ (Fig. 12) also causes the operation of the relay Ch (Fig. 12) in the register.

The operation of relay FA immediately connects the final selector circuit to the corresponding common control circuit respectively connecting the wires A, C and D to the common control circuit through the make contacts $fa5$, $fa2$, $fa6$, over wires W20, W21 and W22.

Moreover, relay FA prepares a holding circuit for itself through the E-wire, in series with the winding of the horizontal magnet HM and the make contact $fa4$, but the magnet HM cannot operate at that particular moment, because direct earth is connected to both ends of its winding; the E-wire is in fact directly connected to earth through make contact $ga7$ associated with the group selector (Fig. 16).

The common control circuit is brought into operative condition, earth being transmitted in said common control circuit through the following circuit: back contact HB3 of the horizontal bar (Fig. 19), make contact $fa1$, via lead W23 to Fig. 7, back contact $lfsh1$, back contact $lfsc3$. This earth energises relay LFSB in series with the resistance to the battery. Through its contact $lfsb1$, relay LFSB applies earth to the anodes of the cold cathode tubes LFSVA, LFSVB, LFSVC, LFSVD; through its contact $lfsb4$, it applies a —150 v. potential to the cathode of the triode SVA3, thus preparing the common control circuit to control the selection of the wanted line by the final selector.

A 100,000 ohm resistance $Rg$ (Fig. 8) is provided in the common control circuit for each of the 100 lines accessible to one group of final selectors; one end of said resistance is connected to one of the 100 terminals each of which is connected, as desired, to one of the seven electric impulse sources $Pd4 \ldots Pd10$. There is one terminal to each line.

The other end of each resistance $Rg$ is connected through a rectifier $Rcs$ to its associated line and also with the three successive stages of rectifiers in series, ARCS, BRCS, CRCS, and of rectifiers in shunt ARCP ... CRCP, and thence to the —40 v. potential supplied by the potentiometer OPT located in the common control switch; this potential, as already explained, is applied through a high resistance ORH (Fig. 7) to the grid of the amplifier tube SVA3. The branch rectifiers ARCP ... CRCP are connected to the current sources, as has already been described.

It will be assumed that the one resistance $Rg$ (Fig. 8) shown is connected to one of the sources $Pd4 \ldots 10$ and that at a particular moment said source has a potential of —16 v. No current can flow from this source to the potentiometer OPT, and, thence to the grid circuit of tube SVA3, except when this potential of —16 v. exists simultaneously on the three rectifiers ARCP, BRCP, CRCP connected to the scanning circuit. When the potential supplied by the three sources or by any one of them connected to ARCP, BRCP, CRCP is —40 v., and when the potential applied to $Rg$ is —16 v., there is in effect a potential of —40 v. on the circuit connecting the resistance $Rg$ to the common control circuit of the final selector and to the potentiometer OPT, because said —40 v. potential can be transmitted through a branch rectifier, such as ARCP, which then has a low resistance; the difference of potential between the lower terminal of $Rg$ and the source connected to the branch rectifier is then absorbed in the resistance $Rg$ and no current flows to the potentiometer. As has already been described, the branch rectifiers act as gates which may open or close the circuit terminating in potentiometer OPT. Current can only flow to the potentiometer when the gate device is closed by application of —16 v. potential by the associated sources. It will be clear from this that current will only flow from one of the sources $Pd$ to the potentiometer when all the gates controlling the circuit connecting resistance $Rg$ of an individual line to the common potentiometer OPT are closed simultaneously. Consequently it is only at this moment that the potential of the potentiometer, and consequently that of the tube SVA3, is brought to about —16 v., due to the relative values of the various resistances placed in the circuit.

It will now be seen that the three sets of sources $Pa$, $Pb$ and $Pc$ are connected to the gates in such a way that the moment at which these three gates are closed differs for each of the 100 lines; each of the lines, will thus supply an impulse to the grid circuit of tube SVA3 for a single time unit which characterises this line. The method of connecting the various gates which enables this result to be obtained for the various outlets numbered "00" to "99" is shown in Fig. 22; this figure also shows the time unit in which each of the outlets supplies an impulse. It will be noted that this table mentions time units numbered from 1 to 120, arrangements being provided so that the sixth unit of each group of six is not used for sending impulses, 100 units out of 120 being used for the 100 lines. Each outlet of a final selector is connected in the common control circuit (Fig. 8) to an individual rectifier ARCP connected to one of the sources $Pa1 \ldots 5$. Each group of five outlets connected to different sources $Pa$ is associated with a second common stage made up of the gate BRCS and BRCP; thus in all in the second stage there are 20 gates which in turn are divided up into four groups of five. In each second stage group the five gates are each connected to one of the five different sources $Pb1 \ldots 5$. The gates of one group are connected to a third stage of gates made up of rectifiers CRCS and CRCP; four gates, such as the foregoing are provided, each being connected to one of the sources $Pc1 \ldots 4$.

As indicated, each of the lines is connected to an individual rectifier associated with one of the sources $Pa1 \ldots 5$; but it is also connected to one of the sources $Pd4$ to $Pd10$ through rectifier $Rcs$, resistance $Rg$ and a jumpering connection.

This connection characterises one class to which the line belongs; a connection to a particular source $Pd$, for example, indicates that said line is a single line or that it is the first line of a group (P. B. X).

It is obvious that the —16 v. potential supplied by the source $Pd$ connected to the line will be absorbed in resistance $Rg$ and that the potential on the upper terminal of this resistance will be kept at —40 v., unless the sources $Pa$, $Pb$ and $Pc$ to which the individual test wire is connected, are supplying a −16 v. potential. Consequently, for each individual line of class No. 4 the potential on the upper terminal of Rg must be brought to a value which can influence the grid of SVA3 during the period in which source Pd4 is relatively positive, i. e, in the time units No. 361 . . . 480. Similarly, a line or lines connected to Pd5, for example a first line (P. B. X), can only affect the potential of the grid circuit in the time units 481 . . . 600.

It is clear from the above that, for each individual line, a −16 v. impulse will only be applied to the grid circuit of tube SVA3 for one only of the 1200 time units characterising the line concerned.

For example, line 25 will send an impulse, according to the table of Fig. 22, in time unit No. 31, under the control of sources Pa1, Pb1 and Pc2. When this line is connected, for example, to source Pd5, said source suppresses the impulses in all time units except the fifth period of 120 time units, so that under these conditions, an impulse is only sent in the 31st time unit of the fifth period, i. e. in time unit No. 511.

The cathode circuit of amplifier tube SVA3 is normally connected to earth through a resistance GRS; under these conditions the grid is sufficiently negative with respect to the cathode so that the impulses sent through the gates to the grid circuit do not fire the tube. When the common control circuit is seized, the relay LFSB, through its make contact lfsb4, applies a potential of about −20 v. to the cathode of tube SVA3; due to the fact that a circuit is completed from the cathode of a suppressor tube SVA4 to the cathode of SVA3. Tube SVA4 is made up of the right hand triode of the double triode of which amplifier tube SVA3 forms part. The suppressor tube circuit is so arranged that its cathode is normally at a potential of about 20 v., due to the fact that its grid is normally kept at −21.5 v. Consequently, when contact lfsb4 is closed, the cathode of amplifier tube SVA3 is also brought to a potential of −20 v. In these conditions the relative potentials of cathode and grid are such, that, in fact, the impulses from the gates cannot alone influence the tube; they are only intended to charge the small condenser GC1 which directly connects the grid to impulse source d2, the characteristics of which are also shown in Fig. 21. When this impulse source d2 supplies a short impulse at a moment when the condenser is already charged by an impulse from the gates, the potential of the grid is momentarily brought to such a value that current begins to flow in the anode circuit. A short impulse is then sent to the anode circuit of the two triodes SVA1, SVA2, forming the other double triode, and acts in such a way on these triodes, via a transformer connected to said double triode, that said triodes generate an impulse which is transmitted from their cathode circuit to the associated final selector circuit. This impulse thus begins at the same time as impulse d2, i. e. towards the end of the time unit in which an impulse is sent by a particular line, as can be seen in Fig. 21. The length of the regenerated impulse is approximately equal to one time unit of source Pa, so that it is still sent during the next time unit in which said source Pa sends an impulse.

As the isolated lines are connected to the impulse source Pd4, it is clear that all the isolated lines which are available for sending an impulse are those which occur in a series of time units numbered 361 to 480. All these impulses are sent to the final selector over wire W22 and through the final selector to the register circuit through the back contact hm1 (Fig. 19), make contact fa6, back contact HB1 and the wire D to the register.

The positive impulses sent back on the D wire are sent to the grid of the thermionic tube Va1 (Fig. 15) through the back contact ok4 (Fig. 12), lead W2 to Fig. 14, and via Fig. 14 to Fig. 15. Normally, the grid of Va1 is very negative, owing to the fact that the resistance inserted between the positive earth and the grid is of 4 megohms, while the resistance inserted between the negative battery of 48 v. and the grid is only of 1 megohm. The grid of the twin tube Va2 and that of each of the two other twin tubes Va3, Va4 are also very negative, owing to the fact that they are connected permanently to a negative battery through 500,000 ohms.

It will be assumed that the register controller has recorded the two digits on a decimal basis in accordance with a well known method, and that the said digits have been translated in accordance with a system on a 4, 5, 6, basis, as was necessary for the control of the selection in a system like that under consideration. The translating means provided may be of a well known type, and have been employed in register controllers for some years. Switching devices, such as weak current electromagnetic relays of the telephone type, then effect the connection of one source in each of the groups of sources Pc, Pb, Pa in accordance with the translation that has just been made; said sources are connected through the following circuits: back contact ph3, make contact fs6, back contact or2, make contact ch2, and grid of the tube Va2; back contact or3, back contact ph1, make contact fs4, and grid of the tube Va4; back contact ph6, make contact fs2, back contact si5, back contact ot4, and grid of the tube Va3.

The circuit arrangements previously described have been provided in accordance with switching system practice, which has been in use for a number of years, and are within the competence of any switching circuit engineer; it is therefore considered that the insertion of detailed circuits and the description of such arrangements would uselessly prolong the specification and would be liable to make the invention less clear.

Each of the impulses received on the grids renders the corresponding tube conductive and the cathode, which is normally negative, becomes positive by reason of the high resistance of the cathode compared with that of the anode and cathode path.

As has been explained, the two twin triodes Va1, Va2, and Va3, Va4, have their cathodes interconnected through the rectifiers Rc1, Rc2, Rc3, Rc4, and all connected in parallel to the grid of the tube Vo2 (Fig. 14) through a wire common to all the Va1–4 cathodes.

When each impulse is received on a grid, current will flow from the exchange battery to the impulse source of −16 v. through the grid-resistance; the grid will be brought to −16 v. potential during the period of said impulses; the corresponding tube then becoming conductive. At any other time, a −40 v. potential will be applied to the grid of the corresponding tube and said tube will not be conductive.

Impulses from a source d3 are applied regularly to the grid of a tube Vo2, forming part of a twin triode Vo1, Vo2 adapted to produce impulses. As long as one or more of the cathodes of the tubes Va1, Va2, Va3, Va4, are negative, each impulse d3 is absorbed in the 20,000 ohm resistance, owing to the flow of the current through said resistance, one or more of the rectifiers Rc1, Rc2, Rc3, Rc4, and the negative cathode or cathodes. However, when impulses are simultaneously applied to the grids of the tubes Va1, Va2, Va3, Va4 by the final selector, and by the sources Pc, Pd, Pa, selected by the digits which have been recorded, all the cathodes become simultaneously positive and the corresponding impulse d3 renders the grid of Vo2 positive, since there is no flow of current through the 20,000 ohm resistance and either of the rectifiers.

Consequently, tube Vo2 energises tube Vo1. As already explained, tube Vo1 forms part of an impulse regenerator circuit which also comprises a transformer TP, TS connecting the anode and grid circuits, a resistance RRS, and a varistor or thermistor TH in parallel between the grid bias and cathode circuits. When a trigger impulse is applied to the grid of tube Vo2, the tubes produce an impulse in the manner described which occurs in the next Pa time position from that transmitted by the scanning circuit of Fig. 8.

One impulse will be produced for each trigger impulse applied to the anode. The voltage impulse produced on the terminals of the load resistance of Vo1 is applied to the final selector through the rectifier Rcp and lead w15 to the wire C.

The impulse sent on the C wire will also cause the firing of the cold cathode tube Via (Fig. 14), of which the cathode is at the potential of −150 v., which causes the energisation of relay Si through the following circuit: cathode and anode of tube Via, back contact ph5, relay Si, back contact ok6, make contact b1, earth. The tubes Vabu, Voa . . . Voh which are shut off are not fired at the moment concerned, on account of the control exerted on their control electrode by the associated rectifier systems.

Relay Ot is energised through the following circuit: back contact or1, back contact cs5, make contact si4;

the closing of contact ot1 causes the connection of the test relay T (Fig. 12) to the wire OA.

The impulse is retransmitted by the register to the common control circuit of the final selector (Fig. 7) through the following circuit: wire C (Figs. 12, 10, 9), make contact ccda3, wire C (Fig. 16), wire C (Fig. 19), back contact HB2 in the final selector, make contact fa2, and lead W21 to cold cathode tubes LFSVA1 . . . 6, LFSVB1 . . . 5, LFSVC1 . . . 4; it arrives in the time unit following the one in which the tubes SVA3 have received an impulse.

As has already been described, these 15 tubes are each controlled by a gate connected with one of the time impulse sources of which the diagram and the assignment have been indicated in Figs. 21 and 22, said tubes only being ionizable at specific times.

The additional tube LFSVD, which is not controlled by gates and, is ionised, for this reason, when it receives an impulse from the register through the C wire in any time unit.

It will be clear from the foregoing that an impulse arriving in any time unit will always cause the ionisation of one tube in each of the three groups LFSVA, LFSVB and LFSVC, so that a combination of three tubes taken from each of the three groups, characterises each of the time units.

For example, in the case of an impulse from outlet No. 25 during a period of transmission of the source Pd5, an impulse is produced in time unit No. 511, that is, in time unit 120×4+31, as has previously been explained, and will arrive on the cold cathode tubes of the common control circuit in time unit No. 512.

This impulse is received in a time unit in which only the sources Ra2, Rb1 and Rc2 are at relatively positive potential, so that the tubes LFSVA2, LFSVB1 and LFSVC2 are ionised and cause the operation of their anode relays LFSAB, LFSBA and LFSCB.

It will be seen that each of the two groups of outlets of the switch correspond to 60 time units taken in the cycle of 120 time units. Each of the two sets of 60 time units comprises 6×5×2 combinations of the sources Pa, Pb, Pc. Referring to the common control circuit, it will be seen that the relays LFSCA . . . LFSCD correspond to the four time units Pc, LFSCA, LFSCB and LFSCC, LFSCD, characterising respectively the two groups of 50 outlets, 00-49, and 50-99, LFSCA, LFSCC, and LFSCB, LFSCD each respectively characterising the two groups of 25 series of contacts 00-24, 50-74; and 25-49, 75-99 which are controlled by the vertical magnets 1-25 and 26-50. The first group of outlets is connected by a selection operation by one of the horizontal servo-magnets LFSHMA; the second group of outlets is connected by a selection operation by the other horizontal servo-magnet LFSHMB. The relays LFSD and LFSE (Fig. 8) respectively are actuated to control the selection operations under the control of the relays LFSCA, LFSCB and the relays LFSCC and LFSCD.

If we refer to the table in Fig. 22, we find the impulse sources Pa, Pb and Pc for each of the outlets. As has been indicated, the sources Ra, Rb and Rc are used in relation to the sources Pa, Pb and Pc in such a way that outlet No. 25 which corresponds in said table to the sources Pa1, Pb1 and Pc2, also correspond to the sources Ra2, Rb1 and Rc2, the register tubes LFSVA2, LFSVB1 and LFSVC2 and the associated relays LFSAB, LFSBA and LFSCB operating for outlet No. 25. This is in accordance with the combination of contacts making it possible to actuate the vertical magnets shown in Fig. 8, the contacts lfsab6, lfsba2 and lfscb1 causing the operation of the vertical magnet LFVM No. 26. Similarly, for outlet No. 74, the sources Ra6, Rb5 and Rc3 will cause the energization of relays LFSAF, LFSBE, LFSCC, and magnet LFVM No. 25 will be energised through the contacts lfsaf5, lfsbe1, and lfscc1.

First of all, a circuit is completed for one of the 50 vertical magnets LFVM; thus, for example, this circuit is as follows for outlet No. 25: make contacts of relays LFSAB, LFSBA and LFSCB actuated by the tubes LFSVA2, LFSVB1 and LFSVC2, and vertical magnet No. 26.

Secondly, one of the relays LFSD and LFSE pulls up, on account of the operation of one of the relays LFSCA . . . LFSCD in series with one of the tubes LFSVC1 . . . 4; the relay LFSD operates under the control of one of the relays LFSCA or LFSCB through contacts lfsca2 or lfscb2; relay LFSE operates under the control of one of the relays LFSCC or LFSCD through the contacts lfscc2 or lfscd2. The vertical magnet which has operated completes a holding circuit for itself through its own make contact lfvm1, one of the make contacts lfsd5 or lfse5, relays LFSH and earth. Relay LFSH does not operate at this time because it has earth on both terminals thereof.

At the same time, the vertical magnet LFVM, which has been energised, actuates the associated vertical bar upwards; the vertical bar No. 26 is actuated in the case of a call to outlet No. 25, and vertical bar No. 25 is actuated in the case of the outlet No. 74. These two bars control contacts which are respectively connected to outlets No. 25 and 75 and the outlets No. 24 and 74.

A circuit is closed by one of the contacts lfsd3 or lfse3 to connect earth to the contact LFB1 or LFB2 associated with each vertical bar actuated, so that a special circuit can be completed controlled by the selected outlet.

As has been indicated, the register circuit has caused the connection of the test relay T on the wire OA (Fig. 12). Relay T is then energised through the following circuit; earth, relay T, make contact ot1 and circuit already described as far as wire A in the final selector (Fig. 19), back contact HB4, make contact fa5, via lead w2 to Fig. 7, relay LFSC in the common control circuit, 240-ohm resistance, battery. The relay LFSC pulls up. The closing of contact t1 completes a double test circuit through relays Dt, T in accordance with a well known method; the relay Dt is energised also, provided that the line concerned has only been selected by the register controller concerned. The contacts ot6 and dt3 are both maintained open, so that all the class-of-line relays Oa . . . Oh, which are in the operative position, fall back. Contact dt4 is closed and energises relay Cs (Fig. 12). The closing of contact cs2 causes the energisation of relay Or (Fig. 13) provided that all the relays of outlets Oa . . . Oh have returned to normal, due to the opening of contacts ot6 and dt3. The contact or1 is opened and restores relay Ot and its associated contacts, to normal, so that earth is again applied to the relays and class-of-outlet tubes Oa . . . Oh, Voa . . . Voh. The operation of relay LFSC in the common control circuit completes a holding circuit for that one of the relays LFSD or LFSE which has operated, so that this relay, like the magnet LFVM which has operated and is controlled by LFSD or LFSE, is rendered independent of the position of the anode relays LFSCA . . . LFSCD.

As has been indicated, the return impulse transmitted by the register through the wire C has energised the tube LFSVD. The relay LFSF (Fig. 7) is energised in series with the tube LFSVD and short-circuits the winding of relay LFSB, so that said relay begins to release slowly. Before the relay LFSB can release completely, relay LFSC can operate, so that the circuit of the relay LFSB is opened by the back contact lfsc3, relay LFSB then releasing immediately. In releasing it opens its contact lfsb1, which in turns opens the anode circuits of all the cold cathode tubes, so that the tubes which were ionised are extinguished, thus causing the release of the corresponding anode relays. The opening of contact lfsb4 does not put the tube SVA3 out of action, since contact lfsc4 is closed.

After having thus determined the identity of the line selected, a control operation will be effected in order to determine the class-of-outlet, which operation will be the same as already described in connection with the selection of the calling line, and utilizes the 20 class-of-outlet wires COL (Fig. 8), according to the class to which the outlet belongs.

Consequently, according to the class of line, earth will be connected to one of the 20 class-of-outlet wires through the contact of the vertical bar which corresponds to the selected line; impulses will be transmitted in the time unit corresponding to the amplifier tube SVA3, which is maintained in working condition due to the fact that the battery is maintained on its cathode through the make contact lfsc4, before the contact lfsb4 has been able to open, said tube then being able to respond to the impulses. These impulses are sent once during each cycle of 120 time units; the tube is "triggered" once through each cycle of 120 time units, by means of a detector impulse supplied by the source d2, which is connected to the grid of the tube SVA3 through a small condenser GC1. This occurs at the exact moment when the impulse is supplied by the source $d2$, that is, exactly at the end of the time unit in which an impulse is supplied through the wire COL.

This impulse is then regenerated in accordance with the method described for the selective impulses.

The regenerated impulse is then transmitted over wire W22 to the final selector, Fig. 19, over $hm1$ back, $fa6$ front, HB1 back, and to register through the wire D. In the register the operation of contacts $or2$, $or3$ (Fig. 15), during the checking of the release of the class of outlet relays $Oa \ldots Oh$, has disconnected the grids of the tubes $Va2$, $Va4$ from the sources $Pc$ and $Pb$ in order to connect them to earth through a 50 K resistance. Owing to this, the cathode of tubes $Va2$ and $Va4$ is positive, so that from this moment, the rectifiers $Rc2$, $Rc4$ are non-conductive and cannot absorb the impulses from the source $d3$ connected to the grid circuit of the tube $Vo2$ (Fig 14). At the same moment, the tube $Va3$, on account of the release of relay $Ot$, is connected to the impulse source $Pa1$ through the back contact $ot4$ and the make contact $si3$. Consequently, rectifier $Rc3$ now absorbs all the impulses coming from the source $d3$ which correspond to the transmission periods of the sources $Pa2$ to $Pa6$. It does not absorb the impulses corresponding to the periods of transmission of the source $Pa1$. Consequently, the register may be influenced by the impulses arriving in one of the time units corresponding exclusively to the periods of transmission of $Pa1$, and will not react to any of the impulses which might arrive during periods corresponding to the control of selection.

When the impulse corresponding to the class selected is applied to the wire D in a time unit of transmission of the source $Pa1$, the tubes $Va1$ and $Va3$ are simultaneously conductive and an impulse is sent to tube $Vo2$. The impulse generator, comprising the tube $Vo1$, then produces a regenerated impulse which begins at the moment when the source $d3$ is positive, this impulse being transmitted via lead W15 on the wire C. This impulse has no effect on the common control circuit of the final selector since its contact $lfsb1$ (Fig. 7) is open, but it is applied to the tubes $Voa \ldots Voh$ (Fig. 14) in the register. According to the time unit in which said impulse is received, it will coincide with the impulses $Rb$, $Rc$ and $Ra1$ applied through rectifiers to the resistances of the control electrodes of a particular pair of tubes $Voa \ldots Voh$. In the case of a call to an isolated line, the tubes $Voa$, $Voe$ controlling the operation of relays $Oa$, $Oe$ are fired, and the corresponding relays pull up.

The relay $Ok$ (Fig. 13) is then energised through back contact $ot5$, back contact $bu3$, make contact $dt2$, back contact $ph6$, make contact $oe4$, make contact $oa1$.

The operation of relays $Oa$ and $Oe$ releases the relay $Or$ on account of the opening of the contacts $Oa3$, and $oe3$, and relay $Si$ (Fig. 14) is released on account of the opening of contact $ok6$. The opening of contact $ok5$ (Fig. 12) removes ground from the wire B, so that relay FA (Fig. 16) in the final selector completes the following holding circuit for itself; magnet HM, make contact $fa4$ and inlet wire E earthed.

As soon as the magnet HM has operated, it opens its back contact $hm2$, thus removing ground from the wire B of the final selector. The relay $Ch$ had momentarily remained held, after the removal of earth at $ok5$ from the wire B, by the earth coming from the selector through said wire B, back contact $hm2$ (Fig. 19), magnet HM, make contact $fa4$, wire E and earth; it now releases, thus checking the complete operation of the magnet HM and the final selector.

The earth through the make contact $dt4$ (Fig. 12), make contact $cs1$, back contact $ch1$, make contact $ok4$, in the register and the wire D, now causes the energisation of the horizontal servo-magnet LFSHMA or LFSHMB (Fig. 7) in the common control circuit of the final selector, which has been connected to the wire D on account of the operation of one of the relays LFSD or LFSE (Fig. 8). The horizontal servo-magnet operates the horizontal bar.

If the magnet LFSHMA has been energised, the horizontal bar of the final selector in which the horizontal magnet HM has been previously energised, is actuated in a certain direction, towards the left, for example, while if the magnet LFSHMB has operated, the horizontal bar is actuated in the other direction, for example to the right.

The contacts A ... E are actuated in order to make the connection to the desired line, and back contacts HB1 ... 4 of the selector circuit disconnecting said selector from the associated common control circuit.

The test relays T, $Dt$ (Fig. 12) in the register return to normal. The relay $Cs$ releases due to the opening of contact $dt4$ and that of contact HB1 (Fig. 16) in the final selector circuit, since the relay $Cs$ is held through the following circuit: wire D, back contact HB1, make contact $fa6$, make contact $hm1$, make contact $lfshma1$ or $lfshmb1$, earth.

The relay $Cs$ produces at $cs3$ the release of the relay OK. The register controller is then completely released in the well known manner, the connection then being completed between the calling and desired lines in a manner which is equally well known.

When a line is engaged, the electrical condition characterising the availability of said line is replaced by an electrical condition characteristic of the busy condition. This is done by preventing the line-identifying, time-unit impulses, which, in the case of a free line, are supplied by one of sources $Pd4$ to $Pd10$, connected to the individual resistance $Rg$ (Fig. 8), and occur during the time of that source, from reaching the amplifier tube SVA3 (Fig. 7), and by replacing these impulses by others also identifying the line but supplied by one of the sources $Pd1$ or $Pd2$ according to whether the line is engaged by a local call or by a toll call. In this case, the source $Pd1$ is connected (at a point not shown), to the D wire of the desired line by the cord circuit used in the existing connection, while the source $Pd2$ is connected (at a point not shown) to the D wire of the desired line by the inlet circuit employed in the toll connection. A resistance $Rhp$ in parallel with a rectifier $Rcp'$ (Fig. 16) is inserted on the wire D of the final selector in series with this connection, as has been shown. Consequently, when the source $Pd4$ is relatively positive ($-16$ v.), the wire coming from the resistance $Rg$ is maintained at a potential of $-40$ v., because this wire is connected through the wire D of the subscriber over another final selector circuit which has engaged the line to the source $Pd1$ or $Pd2$ which at this moment is at the potential of $-40$ v. While the rectifier $Rcp'$ inserted on the wire D in the final selector circuit has a low resistance under these conditions, the difference of potential existing between this wire ($-40$ v.) and the source $Pd4$ ($-16$ v.) is absorbed in the resistance $Rg$. In this way the line-identifying impulses during the time of the impulses from the sources $Pd4$ to $Pd10$ will no longer be transmitted to the amplifier tube SVA3. Instead, a line-identifying impulse will be sent during the time unit in which one of the two sources $Pd1$ or $Pd2$ is positive, according to whether it is the source $Pd1$ or $Pd2$ which is connected over the other circuit to the wire D of the subscriber. When this source is positive (that is in the time units 1 ... 120 for the source $Pd1$ and in the time units 121 ... 240 for the source $Pd2$), current will flow from this source connected to the other circuit through the resistance $Rhp$ (Fig. 19) inserted in the D-wire of the other final selector circuit (rectifier $Rcp'$ which is in parallel with resistance $Rhp$ is not conductive under these conditions) and, thence to the subscriber's D-wire and to the rectifiers ARCS, BRCS, CRCS of the common control circuit. When the gates associated with the line are all three conductive, which happens in one of the 120 time units characterising this line, the potential of the D wire and consequently that of the grid circuit of the amplifier tube, is modified, the tube SVA3 then causing the transmission of one impulse through the regenerator circuit which comprises the tubes SVA1 and SVA2.

It will be noticed that, although the subscriber's D wire may now be at a potential of $-16$ v. during a period in which the source $Pd4$ is at $-40$ v., this source cannot influence the potential of the D wire owing to the fact that the rectifier $Rcs$ in series with the resistance $Rg$ is not conductive under these conditions.

When a busy single line is wanted, it is clear from the foregoing that no impulse will be transmitted for this line during the time unit in which $Pd4$ is at $-16$ v., but that an impulse will be sent while $Pd1$ or $Pd2$ is at $-16$ v.; when the line is engaged in a local call, the impulse will be sent while $Pd1$ is at $-16$ v., and when the line is toll busy, the impulse is sent while $Pd2$ is at $-16$ v. The impulse will be received in the register in the time unit following that in which the impulse is transmitted by the gate for the line concerned, according to the table of Fig. 22. The connections of the register are so arranged that the tube V$o$2 (Fig. 14) is influenced by an impulse in a time unit determined among the 100 possible time units, independently of the periods 1 ... 120, 121 ... 240, 241 ... 360, 361 ... 480 in which the said time unit may occur. This time unit is determined in the register exclusively by the combination of the tens and units digits of the desired subscriber's number, as has been previously indicated.

Consequently, if the line is locally busy, the tube V$o$2 of the register operates under the action of an impulse produced by the desired line during the period 1 ... 120; if the line is toll busy, the tube will operate when it receives impulses during the period 121 ... 240; in both cases the register, responding to the impulse received, regenerates said impulse and sends it on through the C-wire to the common control circuit in accordance with a method previously described, thus producing the ionisation of the cold cathode tubes in the common control circuit as has been explained; said tubes are in fact controlled by sources characterising the time units 1 ... 120 in an identical manner for any of the successive periods of 120 time units. The tube V$abu$ in the register (Fig. 14) is controlled by a rectifier R$cbu$ connected to the impulse source R$d$1, in such a way that it can be ionised in any one of the 120 time units of the first period; when the register responds to an impulse in any time unit of the first period 1 ... 120, the tube V$abu$ is ionised, thus operating relay B$u$ and recording the local busy condition of the desired line. If an impulse arrives in any one of the time units 121 ... 240, a different tube (not shown), which is controlled by a rectifier connected to the source R$d$2, is ionised and records the toll busy condition of the desired line.

In addition to these tubes, the tube V$ia$ at the register, (Fig. 14), which is not controlled by a rectifier, is ionised in the same manner as for the call to a free line, in order to give the register a signal indicating that the selection is finished.

According to the selective signals which have been received by the cold cathode tubes in the common control circuit, this circuit will now signal to the register the class of the wanted line exactly in accordance with the same method as for a free line. As it has been assumed that the line concerned was a single line, the relays O$a$ and O$e$ are energised.

In the case in which the desired line is a P. B. X line of a group comprising lines with non-consecutive numbers, (a large P. B. X group), the resistance R$g$ (Fig. 8) is connected to one of the sources P$d$5 to P$d$10, as indicated in the table headed "Distributor Connections For Class-of-Lines" (the insert to Fig. 8); this source will be brought to a potential of −16 v. in the corresponding period, so that an impulse will be sent in one of the 100 time units which characterise this line during the period determined by the source P$d$ which has been connected, provided that the line is free. If this is the case, the operation is exactly the same as that described for a free single line; in effect, when the register responds to an impulse during one of the periods corresponding to one of the sources P$d$5 ... P$d$10, it produces in the register the ionisation of a cold cathode tube in order to indicate that the selection is completed exactly as was the impulse which had been received during the period corresponding to the source P$d$4, because the register responds during any one of those periods to an impulse received in a time unit which characterises a combination of tens and units digits, thus causing ionisation of the tube V$ia$ during any one of these periods, this tube not being controlled by any source through a rectifier. Moreover, the cold cathode tubes of the common control circuit may operate exactly in the same manner during any period corresponding to the sources P$d$, owing to the fact that they are controlled by sources which only characterise one individual time unit in a group of 120 time units.

The specific "class-of-line" indication, as it had been given for the lines (P. B. X) has no influence on the operation, inasmuch as the line has been found free.

P. B. X lines of this type, (large group), while having their resistance R$g$ connected to one of the sources P$d$5 ... P$d$10, are engaged or busied exactly according to the method already described for a single line, so that the impulses supplied by the sources connected through R$g$ are suppressed and impulses are supplied in their place by one of the sources P$d$1 or P$d$2 through the desired subscriber's D-wire.

Consequently, when a desired line of this type is busy, the operation is first of all exactly the same as for a busy single line, as has already been described, until the moment when the class-of-line indication is received.

With regard to those lines which do not correspond to the common call number of the group, i. e. lines other than the first line of this large group, the class-of-line indication is given as for a single line and consequently the call is treated in the same way as for a busy single line; that part of the connection which has been completed is released, and a busy tone is sent to the calling subscriber, the common control circuit being restored to normal.

With regard to the line corresponding to the common calling number of the group, i. e. the first line, the class-of-line indication is one of those listed as "first line of the first group" (P. B. X) "first line of the second group" (P. B. X) etc.; in other words, an impulse will be sent in one of the time units 78, 84, 96, 102, 108 or 114 according to the group number (P. B. X).

When the register receives this class-of-line indication, it is set in such a position that it has now to hunt for one of the other lines of the group. This is done in the following way:

Prior to the class-of-line signal the operation of the relay S$i$ (Fig. 14) causes in the register, as before, the operation of the relay O$t$ (Fig. 13) through back contact $or$1, back contact $cs$5, and make contact $si$4. Relay T (Fig. 12) is now connected to the A wire and, through contact HB4 (Fig. 19), make contact $fa$5 in the final selector circuit, causes the operation of relay LFSC (Fig. 7) in the common control circuit. The double-test operation takes place and causes the energization of relay D$t$ followed by that of relay C$s$.

The operation of contact $ot$6 and $dt$3 causes the release of all the class-of-line relays O$a$ ... O$h$. Relay O$r$ (Fig. 13) pulls up, and opens its contact $or$1 in order to release relay O$t$. The circuit of the tubes and relays characterising the classes of lines is also closed by the back contact $ot$6 (Fig. 14).

The control of the impulses received on the grids of tubes V$a$2, V$a$3, and V$a$4 is now modified. The grid of tube V$a$2 is connected to earth through make contact $ch$2 and make contact $or$2. The grid of tube V$a$3 is connected to source P$a$1 through back contact $ot$4; make contact $si$3; and the grid V$a$4 is connected to P$a$2 to P$a$6 through make contact $fs$4, back contact $ph$1, make contact $or$3. Thus, there can be no impulse coincidence except during the transmission periods corresponding to the source P$a$1 which are reserved for the class-of-line signals.

As may be seen on the table of Fig. 8, the impulse (time position No. 78) characterising the first line of the first group (P. B. X) operates relays O$c$, O$g$. Relay B$u$ (Fig. 14) being energized, relay P$h$ (Fig. 13) is energised through make contact $og$1, make contact $oc$1, and make contact $bu$2; a holding circuit is completed through make contact $ph$2 and back contact $lm$1. The operation of contact $ph$5 (Fig. 14) restores tube V$ia$ and relay S$i$ to normal and causes the connection of relay S$i$ to tube V$ib$. Relay B$u$ releases its armatures through the opening of contact $ph$4.

The controls on the grids of tubes V$a$2 ... 4 are again modified. The source P$d$5 is connected to V$a$2 through make contact $og$6, make contact $ph$3, make contact $fs$6, back contact $or$2 and make contact $ch$2. Sources P$a$2 ... 6 are connected in parallel to the tube V$a$3 through rectifiers, make contact $ph$6, make contact $fs$2, back contact $si$5 and back contact $ot$4. Tube V$a$4 is connected to earth through make contact $fs$4 and make contact $ph$1.

The register is now in condition to respond to line identification impulses only during the time units which correspond to periods of emission of the sources P$a$2 ... 6, and to respond to the said impulses only when they occur during the periods of transmission of the sources P$d$5.

The need for two differentiations for the groups (P. B. X) will now be apparent, since small groups with consecutive lines can be connected to P$d$4, as are single lines. The transmission of line identification impulses during the different periods of emission of sources P$d$5, P$d$6, ... at the moment of the first test operations, is of no significance and has not been recorded. The transmission of class-of-line impulses by means of sources P$a$, P$b$, P$c$, through one of the 20 class-of-line wires in the common control circuit has indicated the desired group (P. B. X). The recording of these impulses is employed to control another selection in the final selector for the lines of the desired group (P. B. X), said lines having all their identification impulses in the period P$d$ allocated to the group (P. B. X). Thus, the source P$d$ allocated to the group (P. B. X) is a criterion for the selection of a free line (P. B. X) other than the first. It is clear that during the selecting operation in the group (P. B. X) the register does not respond to the impulses which might arrive from the free single lines or from busy lines, owing to the fact that said impulses arrive during one of the periods respectively corresponding to time units 361–480 and 1 . . . 240; only the impulses coming from the free lines of the desired group (P. B. X) which transmits their impulses during the period in which the register can receive them, can act on this circuit, which occurs during the periods corresponding to time units 481 . . . 600 for the first group (P. B. X), 601 . . . 720 for the second group (P. B. X) etc.

When a revertive impulse arrives from the final selector on the grid of V$a$1 during the period P$d$5, for example, an impulse is produced by V$o$1 and returned to the common control circuit to record the identity of the selected line. The impulse produced also causes the operation of tube V$ib$ and relay S$i$.

It will be seen that when relay P$h$ (Fig. 13) has been energised and has caused the release of relay S$i$, the circuit of the wire A has been opened at $ph$8 and $ot$1 and that consequently the relay LFSC of the common control circuit of the final selector is released.

The release of relay LFSC in the common control circuit then causes the release of relay LFSD or LFSE which in turn releases the vertical magnet LFVM so that the vertical bar which has been actuated returns to normal.

The relay LFSB (Fig. 7) of the common control circuit can then be re-energised through the back contact $lfsc$3, back contact $lfsh$1 via W20, make contact $fa$1 (Fig. 16), back contact HB3, and earth. Battery is connected to the cathode of the tube SVA3 through make contact $lfsb$4, the circuit then again being brought into the condition in which impulses are supplied for each of the lines to the register circuit through the gates and the amplifying-and-regenerating stage.

In the case under consideration, the register will respond to the impulse sent by the common control circuit in any time unit in the period corresponding to the wanted group (P. B. X), that is to say, to the impulses coming from any free line having its resistance R$g$ connected to one of the sources P$d$5 . . . corresponding to the wanted group, said register then being able to send an impulse in the period in which said source is positive.

When the register responds, it acts exactly as described for a call to a single free line, at the moment in which such a line sends an impulse to indicate its free condition, and the subsequent operations to complete the routing of the call are exactly the same as those already described.

It should be mentioned here that the class-of-line indication for the lines of a group (P. B. X) of the type concerned, other than the first, will be that of a single line, that is to say, it will be characterised by the time unit No. 6.

A small group (P. B. X) having consecutive lines may be made up by providing, by means of jumpering, a class-of-line indication for all the lines except the last, the class-of-line wire being connected to the wire COL No. 12; these lines will then send an impulse in time unit No. 72 as class-of-line indication, while the last line of the group will be connected as a single line, that is, to the wire No. 1.

The resistances R$g$ of all the lines of this type of group (P. B. X) must be connected to the source P$d$4, as though they were single lines.

When a call has to be routed to any free line of a group, the call will be completed exactly as indicated for a free single line, since the class-of-line indication has no influence on the routing of such call.

When calling any busy line of the group, except the last, the register receives the indication that said line is busy, exactly as previously described, after which the class-of-line indication will be signalled in the usual way. As this signalling is of the type indicating a small group (P. B. X), thus indicating that the next line in numerical order must be tested, the register, upon receiving this signal, sets itself and the common control circuit in the selecting position, as described for the type of group (P. B. X) comprising lines which are not consecutive, with this difference, however, that the register is now set in a position enabling it to respond to the impulses corresponding to the line having a calling number following that of the previously selected line; consequently, this next line is now selected in accordance with the manner already described for a single line. If it is free, it is seized in a normal way; if it is busy, and if it is not the last line of the group, the operation of selecting the next line is repeated, this process continuing until a free line or the last line of the group is found. This last line is characterised by the fact that its class-of-line indication is that of a single line, so that if it also is busy, it will be treated as a busy single line.

In order to simplify the register circuits, the lines of the group of this type (P. B. X) must have calling numbers only differing in their units digit, so that in order to select a next line, if necessary, it is only required to change the marking corresponding to the units digit.

The detailed operations which take place in the register for this class of P. B. X line will now be explained.

When the indication characterising the condition of the selected line is received, the relay B$u$ (Fig. 14) is energised, as also the relay S$i$ as previously described. The relay O$t$ (Fig. 13) pulls up, as also the test relays, T, D$t$. The operation of D$t$ operates C$s$. The opening of contacts $ot$6 and $dt$3 releases the class-of-line relays which were pulled up. Relay O$r$ is energised, causing the release of relay O$t$.

Contacts $or$2, $or$3, connect the grids of the tubes V$a$2, V$a$4, to earth, and the contact $si$3 connects the grid of the tube V$a$3 to the source P$a$1, so that the register, as before, is in the position for receiving a class-of-line indication. The sources P$a$2 . . . 6 are disconnected at $si$5.

The class-of-line relays which are energised when it is a question of a line (P. B. X) of the type in which the lines are consecutive, are O$c$, O$f$; (see in this connection the line category No. 12 in the table of Fig. 8). The relay P$h$ (Fig. 13) is energised through the following circuit: make contact $of$5, make contact $oc$1, make contact $bu$2. A holding circuit is then completed through make contact $ph$2 and back contact $lm$1.

In the present case, the relay I$a$ is also energised through make contact $ei$3 of a relay E$i$ (not shown) which operates as soon as the last digit has been received in the register, the make contact $oc$6, $of$6, $cs$2 and earth. Relay $im$ is slow-acting and is in parallel on the relay I$a$ and will only be energised shortly after said relay I$a$.

Relay I$a$ causes the device which has recorded the units digit to advance one step. For example, if a single-motion register switch is employed of a well known type having 11 positions, the operation of the relay I$a$ will complete a stepping circuit for the storing switch, said switch advancing one step in the well known manner. The translation of the recorded number, made by well known cross-connecting arrangements, will thus be modified and the source P$a$ previously connected to back contact $ph$6 is disconnected in order to be replaced by the adjacent source. The opening of contact $ph$4 has released relay B$u$ and the opening of contacts $bu$2 and $lm$1, has released relay P$h$.

The simultaneous opening of contact $ot$1 and $ph$8 has released relays T, D$t$ (Fig. 12) in the register and relay LFSC (Fig. 7) in the common control circuit. Relay LFSB in the common control circuit is re-energised and applies battery to the cathode of tube SVA3. Revertive impulses are then sent to the register; in the latter the grids of the tubes V$a$2, V$a$3, V$a$4 are again respectively connected to the source P$c$ through the make contact $ch$2, back contact $or$2, make contact $fs$6, back contact $ph$3; to the source P$a$, through back contact $ot$4, back contact $si$5, make contact $fs$2, back contact $ph$6; to the source P$b$ through make contact $fs$4, back contact $ph$1, back contact $or$3. When the impulse from the next line is received, the same operations take place in the register as before, and the successive lines of the P. B. X group will be tested in the manner previously indicated as far as the last, if necessary, which gives an indication identical with that of a single line, so that if the last line is busy, the register returns to normal and the connection is released.

The transmission of class-of-line signal for an ordinary subscriber's line which is isolated has already been described.

If the desired subscriber is a restricted service subscriber the class-of-line relays which are energised are O$a$ and O$f$ and not O$a$ and O$e$, but the circuits provided in order to complete the connection are adapted to operate in the same manner whether it is the relays O$a$ and O$e$ which are operating or the relays O$a$ and O$f$. In fact, such subscribers are only restricted for the outgoing calls; there is no difference between the calls of ordinary subscribers and of restricted service subscribers where incoming calls are concerned.

If the selected subscriber is absent for a long period and arrangements have been made for the incoming calls to be handled by an operator, the class-of-line signal sent causes the operation of relays O$a$ and O$g$. The relay L$p$ is then energised through make contact $fs7$, make contact $og7$ and make contact $oa6$. The closing of contact $lp2$ causes the operation of relay S$o$, which opens its contact $so2$ and causes the release of relay F$g$. The opening of contact $fg2$ causes the release of relay F$s$. The opening of contact $so4$ removes the earth from the wire CAL so that the relay CCDA of the circuit is released temporarily (Fig. 10). The opening of contact $ccda5$ (Fig. 9) releases the group selector; the final selector is also released owing to the fact that the wires A, B, C, D, E are temporarily disconnected from the register.

The opening of contact $so5$ releases relay Rc which was energised when the relay L$a$ was itself energised through make contact $lh7$. Relay Rc releases slowly and again connects, through its contact $rc5$, an earth to the wire CAL terminating in the cord circuit in such a way that the relay CCDA is re-energised. The opening of contact $so2$ releases relay F$g$, an operating circuit being again prepared for said relay by back contact $rc3$. The opening of contact $fg2$ releases relay F$s$. The grid of the tube VA2 is now connected through back contact $fs6$, back contact $fg3$, make contact $so3$ and back contact $rc4$, to the source P$d$10, which is employed to control the connection to an operator, through a first group selector.

If the wanted line is a line of which the number has been changed, the class-of-line relays O$a$ and O$h$ are energised and the relay C$n$ is energised through the make contact $fo1$, make contact $oh4$, make contact $oa7$; this relay is held through make contact $cn1$ and make contact $lh12$. The closing of contact $cn2$ causes the operation of relay S$o$, which in turn opens its contact $so2$ in order to cause the release of relay F$g$ and its contact $so4$ to remove earth from the wire CAL terminating in the cord circuit. As in the case of absent subscribers previously described, the connection which has already been established is released, and the connection is established to an operator, under the control of the source P$d$10 connected through make contact $so3$, back contact $fg3$, to the grid of tube V$a$2.

The operations which take place in the case of groups of subscribers' lines (P. B. X) of which the lines are consecutive or are not consecutive have already been described.

In considering the complete operation of the system, it will be seen that the register controller is entirely passive; in other words, it never makes an operation on its own initiative but always awaits instructions, in reply to which it modifies its circuits in order to carry out other operations in accordance with the instructions received.

It is not new to give instructions to a register controller to enable it to modify its operation for special purposes, but the fact of providing a register controller which awaits instructions for each operation and is not provided in order to carry out a sequence of predetermined operations, is new.

What is claimed is:

1. An automatic telecommunication exchange having a plurality of line selector stages and register controllers comprising means at each stage for receiving signals from a register controller, registering means connected to said signal means for registering received signals, means controlled by said registering means for preparing a connection to be made by a selector stage, a plurality of signal sources, means operated by said connection-preparing means for connecting certain of said signal sources for signalling to said register controller information regarding the next operation to be performed, means in each register controller for responding to control signals from each selector stage, selective means at each register controller connecting certain of said signal sources for transmitting control signals to a connected selector stage, and means under control of said signal responsive means to modify said selective means for transmitting control signals for handling the succeeding selection, whereby the register controller carries out all operations as a result of instructions received.

2. An automatic telecommunication exchange, as defined in claim 1, in which line finder stages are also provided, and in which means is provided for transmitting control signals to the responding means from each line finder stage as well as each selector stage.

3. An automatic telecommunication exchange, as defined in claim 2, in which the signal sources produce time spaced electrical pulses and each selector stage includes means for connecting said signal sources to the outlets of the stage in such a manner as to identify each outlet with a pulse having a particular time spacing, and in which the signal responding means at each register controller is responsive to the time spaced pulses of said sources.

4. An automatic telecommunication exchange, as defined in claim 3, in which means is included in the selective means at each register controller for transmitting time-spaced selection signals from the sources which form a group having a common time factor, and the signalling means at each selector stage includes means for transmitting time-spaced control signals from said sources which form a group having a common time factor different from the selection signal group for modifying the selective means at the register controller, and in which the selective means at each register controller comprises signal responsive means and time control means associated with said signal responsive means for selectively responding to either the group of selection signals or the group of control signals.

5. An automatic telecommunication exchange, as defined in claim 4, in which the means in each selector or line finder stage for signalling information to the register controller comprises a set of common control or class signal leads, a common connection for said leads, gating means connecting said leads with said common connection, means including the signal sources for causing said gating means to produce a time positioned pulse on said common connection which is characteristic of a particular one of said common control or class signal leads when the circuit of said particular lead is completed, an individual control or class signal lead per outlet or line from the stage, cross connections from said outlet or line leads to said common leads, any one or more individual leads being connected to a common lead for determining the control or class signal to be sent for each outlet or line, and means controlled by the preparing of said selector stage for connection to an outlet for completing the circuit of the common control or class signal lead for that outlet.

6. An automatic telecommunication exchange, as defined in claim 5, in which the line finders and selectors are individual switches in cross-bar multi-switches in which each multi-switch has its own individual common control circuit including means for transmitting outlet-identifying signals and control or class signals for all outlets from the multi-switch.

7. An automatic telecommunication exchange, as defined in claim 6, in which the gating means comprises stages of electrical gates arranged in reverse tree formation between individual outlet or line leads and the common connection, means connected to the signal sources for controlling each stage of gates by time spaced electric pulses in a cycle of time positions per stage, different pulses in a cycle being allocated to different gates in the corresponding stage and the cycles having a relation such that in combination they control the application to said common connection of a cycle of pulses large in number compared with any one of said individual cycles.

8. An automatic telecommunication exchange, comprising line finder and selector stages composed of cross-bar multi-switches, providing decimal finder and selection stages, means for controlling the first group selector by the thousands digit, means for controlling the second group selector by the hundreds digit, and means for controlling the final selector by the tens and units digit, and further comprising a common control circuit for each cross-bar multi-switch, a plurality of register controllers for cooperating in the operation of both line finders and selectors, means for seizing a register controller, a plurality of signal sources, means in each register controller for transmitting controlled signals from said signal sources for controlling both line finders and selectors and means in each common control circuit responsive to said signals for controlling the finder or selector associated therewith.

9. An automatic telecommunication exchange, as defined in claim 8, in which some individual cross-bar switches of a single multi-switch are arranged to act as line finders and other individual cross-bar switches are arranged to act as selectors.

10. An automatic telecommunication exchange, as defined in claim 9, further comprising call detector circuits each common to a number of individual lines, means in each call detector circuit responsive to the initiation of a call from a line associated therewith for seizing a register controller, means in each call detector circuit for transmitting signals from the signal sources for identifying said calling line to a seized register controller, means in each register controller for registering said identifying signals, and means controlled by said registering means for selecting and setting a line finder on the calling line.

11. An automatic telecommiuncation exchange, as defined in claim 10, further comprising a group of cord circuits between the line finders and selectors, a cross-bar multi-switch, means for connecting the outlets of said switch to said cord circuits, means for connecting each of a group of register controllers to an individual switch of said cross-bar multi-switch for making connection to said group of cord circuits between said line finders and said selectors.

12. An automatic telecommunication exchange, as defined in claim 11, further comprising a cross-bar multi-switch between the call detector circuits and the cord circuits, means for connecting each of said call detector circuits to an individual switch of said cross-bar multi-switch, and means for connecting the outlets of said multi-switch to said cord circuits.

13. An automatic telecommunication exchange, as defined in claim 12, further comprising a test circuit connected from a call detector circuit to a group of cord circuits and to their associated register controllers, means for maintaining a predetermined electrical condition on that portion of said test circuit associated with a cord circuit as long as a free register controller is associated with said cord circuit, and means in said call detector circuit responsive to said condition to connect said call detector to said cord circuit, whereby said cord circuit is chosen only if one of its associated circuits is free.

14. An automatic telecommunication exchange, as defined in claim 13, further comprising means to busy all cord circuits which are associated with the selected cord circuit until the selected cord circuit is individually connected to a free register.

15. An automatic telecommunication exchange, as defined in claim 8, in which some individual switches of a multi-switch act as line finders and other individual switches act as selectors, and further comprising call detector circuits each common to a number of incoming lines, means in each call detector circuit under control of a line initiating a call for transmitting line-identifying signals from the signal sources to the connected register controller, means in said register controller for registering said identifying signals, said exchange further comprising electrical time pulse control means controlled by said registering means for the control of the setting of said line finders and selectors.

16. An automatic telecommunication exchange, as defined in claim 15, in which all of the control signal transmitting means for controlling all connecting operations are electrical time pulse control means.

17. An automatic telecommunication exchange, as defined in claim 16, in which the electrical time pulse control means comprises sources of electrical time pulse cycles of different orders.

18. An automatic telecommunication exchange, as defined in claim 1, in which the signal sources produce time-spaced electrical pulses, and further comprising means for controlling the selection by said time spaced electrical pulses, the position of the pulses in time identifying the different outlets or lines, and in which the control signals from the selector stages for modifying the selective means at the register controller also consist of time spaced pulses.

References Cited in the file of this patent

UNITED STATES PATENTS

| Number | Name | Date |
|---|---|---|
| 2,333,039 | Peterson | Oct. 26, 1943 |
| 2,375,514 | Bakker | May 8, 1945 |
| 2,520,170 | Ransom | Aug. 29, 1950 |
| 2,524,774 | Deakin | Oct. 10, 1950 |
| 2,619,548 | Lesti | Nov. 25, 1952 |